(12) United States Patent
Burger et al.

(10) Patent No.: US 10,452,995 B2
(45) Date of Patent: Oct. 22, 2019

(54) MACHINE LEARNING CLASSIFICATION ON HARDWARE ACCELERATORS WITH STACKED MEMORY

(71) Applicant: Microsoft Technology Licensing, LLC, Redmond, WA (US)

(72) Inventors: Douglas C. Burger, Bellevue, WA (US); Derek Chiou, Bellevue, WA (US); Eric Chung, Woodinville, WA (US); Andrew R. Putnam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1137 days.

(21) Appl. No.: 14/754,323

(22) Filed: Jun. 29, 2015

(65) Prior Publication Data

US 2016/0379137 A1    Dec. 29, 2016

(51) Int. Cl.
*G06F 15/18*    (2006.01)
*G06N 20/00*    (2019.01)
(Continued)

(52) U.S. Cl.
CPC ............... *G06N 20/00* (2019.01); *G06F 9/46* (2013.01); *G06F 9/50* (2013.01); *Y02D 10/22* (2018.01)

(58) Field of Classification Search
CPC .. G06F 9/46; G06F 9/50; G06N 20/00; Y02D 10/22
See application file for complete search history.

(56) References Cited

U.S. PATENT DOCUMENTS

| 5,083,285 A | 1/1992 | Shima et al. |
| 5,253,329 A | 10/1993 | Villarreal et al. |

(Continued)

FOREIGN PATENT DOCUMENTS

| CN | 102880587 A | 1/2013 |
| CN | 103117060 A | 5/2013 |

(Continued)

OTHER PUBLICATIONS

"Accelerating a random forest classifier: multi-core, GP-GPU, or FPGA?" Brian Van Essen, Chris Macaraeg, Maya Gokhale and Ryan Prenger (Year: 2012).*

(Continued)

*Primary Examiner* — Luis A Sitiriche
(74) *Attorney, Agent, or Firm* — Watson Patents, PLC; Vladan M. Vasiljevic

(57) ABSTRACT

A method is provided for processing on an acceleration component a machine learning classification model. The machine learning classification model includes a plurality of decision trees, the decision trees including a first amount of decision tree data. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The method includes slicing the model into a plurality of model slices, each of the model slices having a third amount of decision tree data less than or equal to the second amount of memory, storing the plurality of model (Continued)

slices on the memory stack, and for each of the model slices, copying the model slice to the acceleration component memory, and processing the model slice using a set of input data on the acceleration component to produce a slice result.

20 Claims, 48 Drawing Sheets

(51) Int. Cl.
*G06F 9/46* (2006.01)
*G06F 9/50* (2006.01)

(56) References Cited

U.S. PATENT DOCUMENTS

| | | | |
|---|---|---|---|
| 5,638,492 | A | 6/1997 | Maeda et al. |
| 6,289,418 | B1 | 9/2001 | Koppala |
| 7,409,670 | B1 | 8/2008 | Pritchard et al. |
| 7,562,271 | B2 | 7/2009 | Shaeffer et al. |
| 7,646,817 | B2 | 1/2010 | Shen et al. |
| 7,657,706 | B2 | 2/2010 | Iyer et al. |
| 7,685,364 | B2 | 3/2010 | Shaeffer et al. |
| 8,074,022 | B2 | 12/2011 | Okin et al. |
| 8,098,508 | B2 | 1/2012 | Janzen |
| 8,131,659 | B2 | 3/2012 | Xu et al. |
| 8,356,138 | B1 | 1/2013 | Kulkarni et al. |
| 8,370,547 | B2 | 2/2013 | Karamcheti et al. |
| 8,417,654 | B1 | 4/2013 | Cao et al. |
| 8,468,109 | B2 | 6/2013 | Moussa et al. |
| 8,492,886 | B2 | 7/2013 | Or-Bach et al. |
| 8,504,794 | B1 | 8/2013 | Glasco et al. |
| 8,583,569 | B2 | 11/2013 | Xu et al. |
| 8,793,249 | B2 | 7/2014 | Lai et al. |
| 8,918,771 | B2 | 12/2014 | Dunn et al. |
| 2006/0242180 | A1 | 10/2006 | Graf et al. |
| 2009/0304268 | A1 | 12/2009 | Cadambi et al. |
| 2011/0016112 | A1 | 1/2011 | Yu |
| 2011/0179248 | A1 | 7/2011 | Lee |
| 2011/0258150 | A1 | 10/2011 | Neogi et al. |
| 2011/0283059 | A1 | 11/2011 | Govindarajan et al. |
| 2012/0136812 | A1 | 5/2012 | Brdiczka |
| 2012/0154373 | A1 | 6/2012 | Finocchio et al. |
| 2012/0246392 | A1 | 9/2012 | Cheon |
| 2012/0290310 | A1 | 11/2012 | Watson |
| 2012/0323839 | A1 | 12/2012 | Kiciman et al. |
| 2013/0138436 | A1 | 5/2013 | Yu et al. |
| 2013/0160026 | A1 | 6/2013 | Kuesel et al. |
| 2013/0179377 | A1 | 7/2013 | Oberg et al. |
| 2014/0040532 | A1 | 2/2014 | Watanabe et al. |
| 2014/0067735 | A1 | 3/2014 | Yu et al. |
| 2014/0075227 | A1 | 3/2014 | Shirota et al. |
| 2014/0142929 | A1 | 5/2014 | Seide et al. |
| 2014/0143570 | A1 | 5/2014 | Bose et al. |
| 2014/0180989 | A1 | 6/2014 | Krizhevsky et al. |
| 2014/0181415 | A1 | 6/2014 | Loh et al. |
| 2014/0181453 | A1 | 6/2014 | Jayasena et al. |
| 2014/0189312 | A1 | 7/2014 | Tan |
| 2014/0223098 | A1 | 8/2014 | Lee et al. |
| 2014/0281363 | A1 | 9/2014 | Tian et al. |
| 2014/0380003 | A1 | 12/2014 | Hsu et al. |
| 2015/0006805 | A1 | 1/2015 | Feekes et al. |
| 2015/0036942 | A1 | 2/2015 | Smirnov et al. |
| 2015/0046674 | A1 | 2/2015 | Barry et al. |
| 2016/0092396 | A1 | 3/2016 | Rusu |
| 2016/0379137 | A1 | 12/2016 | Burger et al. |
| 2017/0061279 | A1 | 3/2017 | Yang et al. |

FOREIGN PATENT DOCUMENTS

| | | |
|---|---|---|
| CN | 103150596 A | 6/2013 |
| CN | 103680496 A | 3/2014 |
| WO | 2011150762 A1 | 12/2011 |

OTHER PUBLICATIONS

Chen, Fu-Chuang, "Back-Propagation Neural Networks for Non-linear Self-Tuning Adaptive Control", In Journal of IEEE Control Systems Magazine, vol. 10, Issue 3, Apr. 1990, pp. 44-48.

"Nallatech Launches Worlds Fastest PCI Express 2.0 FPGA Accelerator Card—On average 5 times greater host bandwidth than competitive offerings", Retrieved on: Feb. 10, 2015 Available at: http://www.nallatech.com/nallatech-launches-worlds-fastest-pci-express-20-fpga-accelerator-card/.

Yoshimi, et al., "An FPGA-based Tightly Coupled Accelerator for Data-intensive Applications", : In IEEE 8th International Symposium on Embedded Multicore/Manycore SoCs, Sep. 23, 2014, pp. 289-296.

"High Performance Computing", Published on: Oct. 10, 2014 Available at: http://www.tezzaron.com/markets-and-applications/high-performance-computing/.

"Accelize Announces XP5S620LP-40G—The Industry's First Low Profile FPGA Network Accelerator Card TO Feature 40GB Ethernet and Pcie® 3.0", Published on: Jun. 27, 2012 Available at: http://www.accelize.com/about-us/news/53-accelize-announces-xp5s620lp-40g-the-industry-s-first-low-profile-fpga-network-accelerator-card-to-feature-40gb-ethernet-and-pcie-3-0.html.

Kawakami, et al., "A Prototype Chip of Multicontext FPGA with DRAM for Virtual Hardware", In Proceedings of the ASP-DAC 2001. Asia and South Pacific Design Automation Conference, Jan. 30, 2001, pp. 17-18.

Putnam, et al., "A Reconfigurable Fabric for Accelerating Large-Scale Datacenter Services", In Proceeding of the 41st annual international symposium on Computer architecuture, Jun. 14, 2014, 12 pages.

Schmidt, et al., "Efficient Acoustic Feature Extraction for Music Information Retrieval Using Programmable Gate Arrays", In Proceedings of 10th International Society for Music Information Retrieval Conference , Oct. 26, 2009, pp. 273-278.

Saqib, et al., "Pipelined Decision Tree Classification Accelerator Implementation in FPGA (DT-CAIF)", In IEEE Transactions on Computers, vol. 64, No. 1, Jan. 2015, pp. 280-285.

Clarke, "Altera FPGAs Accelerate Microsoft Neural Network Engine", IHS.com, Feb. 23, 2015, 3 pages.

Hemsath, et al., "Implementing a Stack Cache", In Technical report, Jun. 2007, 8 pages.

Sarkar, et al., "Network-on-Chip Hardware Accelerators for Biological Sequence", In Proceedings of IEEE Transactions on Computers, vol. 59, Issue 1, Jan. 2010, pp. 29-41.

"Second Written Opinion Issued in PCT Application No. PCT/US2016/039140", dated Jun. 7, 2017, 9 Pages.

Adler, et al., "Leap Scratchpads: Automatic Memory and Cache Management for Reconfigurable Logic", In Proceedings of 19th ACM/SIGDA International Symposium on Field Programmable Gate Arrays, Feb. 27, 2011, pp. 25-28.

"Nios II Processor Reference Handbook", In Publication of Altera Corporation, Feb. 2014, 288 pages.

"Stratix V Device Handbook", In Publication of Altera Corporation, Jun. 12, 2015, 321 pages.

Baxter, et al., "Maxwell—A 64 FPGA Supercomputer", In Journal of Engineering Letters, vol. 16, Issue 3, Aug. 20, 2008, 8 pages.

"BEE4 Hardware Platform", Retrieved on: Jul. 2, 2015 Available at: http://www.beecube.com/downloads/BEE42pages.pdf.

Blott, et al., "Dataflow Architectures for 10Gbps Line-rate Key-value-Stores", In Proceedings of Hot Chips: A Symposium on High Performance Chips, Aug. 25, 2013, pp. 1-25.

Chung, et al., "CoRAM: An In-Fabric Memory Architecture for FPGA-based Computing", In Proceedings of 19th ACM/SIGDA International Symposium on Field Programmable Gate Arrays, Feb. 27, 2011, pp. 97-106.

"Cray XD1 Datasheet", Retrieved on: Jul. 2, 2015 Available at: http://www.carc.unm.edu/~tithomas/buildout/Cray_XD1_Datasheet.pdf.

Estlick, et al., Algorithmic transformations in the implementation of K– means clustering on reconfigurable hardware, In Proceedings of the ACM/SIGDA ninth international symposium on Field programmable gate arrays, Feb. 1, 2001, pp. 103-110.

(56) References Cited

OTHER PUBLICATIONS

George, et al., "Novo-G: At the Forefront of Scalable Reconfigurable Supercomputing", In Journal of Computing in Science and Engineering, vol. 13, Issue 1, Jan. 2011, pp. 82-86.
Hussain, et al., "Highly Parameterized K-means Clustering on FPGAs: Comparative Results with GPPs and GPUs", In Proceedings of International Conference on Reconfigurable Computing and FPGAS, Nov. 30, 2011, pp. 475-480.
"IBM PureData System for Analytics N2001", Published on: Jan. 2013 Available at: http://www.besmart.company/wp-content/uploads/2014/11/IBM-PureData-System.pdf.
"An Introduction to the Intel® QuickPath Interconnect", In White Paper, Jan. 2009, 22 pages.
Kirchgessner, et al., "VirtualRC: AVirtual FPGA Platform for Applications and Tools Portability", In Proceedings of the ACM/SIGDA 20th International Symposium on Field Programmable Gate Arrays, Feb. 22, 2012, pp. 205-208.
Lavasani, et al., "An FPGA-based In-line Accelerator for Memcached", In Proceedings of Computer Architecture Letters, vol. 13, Issue 2, Jul. 2014, pp. 57-60.
Ling, et al., "High-performance, energy-efficient platforms using in-socket FPGA accelerators", In Proceedings of the ACM/SIGDA international symposium on Field programmable gate arrays, Feb. 24, 2009, pp. 261-264.
Martin, et al., "FPGA-Based Application Acceleration: Case Study with GZIP Compression/Decompression Streaming Engine", In Proceedings of International Conference on Computer Aided Design, Nov. 19, 2013, 1 pages.
"How Microsoft Designs its Cloud-Scale Servers", Retrieved on: Jul. 2, 2015 Available at: https://www.google.co.in/url?sa=t&rct=j&q=&esrc=s&source=web&cd=1&ved=0CB4QFjAA&url=http%3A%2F%2Fdownload.microsoft.com%2Fdownload%2F5%2F7%2F6%2F576F498A-2031-4F35-A156-BF8DB1ED3452%2FHow_MS_designs_its_cloud_scale_servers_strategy_paper.
Pell, et al., "Surviving the End of Frequency Scaling with Reconfigurable Dataflow Computing", In Proceedings of ACM SIGARCH Computer Architecture News, vol. 39 Issue 4, Sep. 2011, pp. 60-65.
Showerman, et al., "QP: A Heterogeneous Multi-Accelerator Cluster", In Proceedings of 10th LCI International Conference on High-Performance Clustered Computing, Mar. 10, 2009, pp. 1-8.
Slogsnat, et al., "An Open-source HyperTransport Core", In Proceedings of Transactions on Reconfigurable Technology and Systems, vol. 1 Issue 3, Sep. 1, 2008, 21 pages.
So, et al., "A Unified Hardware/Software Runtime Environment for FPGA-based Reconfigurable Computers Using BORPH", In Proceedings of Transactions on Embedded Computing Systems, vol. 7, Issue 2, Feb. 1, 2008, 28 pages.
Vanderbauwhede, et al., "FPG-Aaccelerated Information Retrieval: High-efficiency document filtering", In Proceedings of International Conference on Field Programmable Logic and Applications, Aug. 31, 2009, 6 pages.
"MicroBlaze Processor Reference Guide", Retrieved on: Jun. 30, 2015 Available at: http://www.xilinx.cm/support/documentation/sw_manuals/xilinx12_1/mb_ref_guide.pdf.
Chen, et al., "Efficient Query Processing for Web Search Engine with FPGAs", In Proceedings of IEEE 20th International Symposium on Field-Programmable Custom Computing Machines, Jun. 27, 2006, 12 pages.
U.S. Appl. No. 14/754295, Burger, et al., "Server Systems With Hardware Accelerators Including Stacked Memory", filed Jun. 29, 2015.
U.S. Appl. No. 14/754344, Burger, et al., "Deep Neural Network Processing on Hardware Accelerators With Stacked Memory", filed Jun. 29, 2015.
Power, et al., "Implications of Emerging 3D GPU Architectureon the Scan Primitive", In Proceedings of Special Interest Group on Management of Data, vol. 44, Issue 1, Mar. 2015, pp. 18-23.
Zhu, et al., "A 3D-Stacked Logic-in-Memory Accelerator for Application-Specific Data Intensive Computing", In IEEE International 3D Systems Integration Conference, Oct. 2, 2013, 7 pages.

Essen, et al., "Accelerating a Random Forest Classifer: Multi-Core, GP-GPU, or FPGA?", In IEEE 20th Annual International Symposium on Field-Programmable Custom Computing Machines, Apr. 29, 2012, pp. 232-239.
Liu, et al., "A Many-Core Hardware Acceleration Platform for Short Read Mapping Problem Using Distributed", In IEEE International Symposium on System-on-Chip, Oct. 28, 2014, 8 pages.
Weis, et al., "Exploration and Optimization of 3-D Integrated-DRAM Subsystems", In IEEE Transactions on Computer-Aided Design of Integrated Circuits and Systems, vol. 32, Issue 4, Apr. 2013, pp. 597-610.
Akin, et al., "HAMLeT: Hardware Accelerated Memory Layout Transform within 3D-stacked DRAM", In IEEE Conference on High Performance Extreme Computing Conference, Sep. 9, 2014, 6 pages.
Anthony, Sebastian, "Intel Unveils NEW XEON CHIP with Integrated FPGA, touts 20x Performance Boost", Published on: Jun. 19, 2014, Available at: http://www.extremetech.com/extreme/184828-intel-unveils-new-xeon-chip-with-integrated-fpga-touts-20x-performance-boost.
Wang, Wei, "Big Data, Big Challenges", In IEEE International Conference on Semantic Computing, Jun. 16, 2014, 1 page.
Granat, et al., "Hardware Acceleration of AdaBoost Classifier", In In Proceedings of Workshop on Multimodal Interaction and Related Machine Learning Algorithms, Jun. 2007, 12 pages.
Black, Bryan, "Die Stacking is Happening!", Published on: Dec. 9, 2013, Available at: http://www.microarch.org/micro46/files/keynote1.pdf.
Response to International Search Report and Written Opinion filed Oct. 19, 2016 in International Patent Application No. PCT/US2016/039138, 11 pages.
Response to International Search Report and Written Opinion filed Dec. 6, 2016 in International Patent Application No. PCT/US2016/039140, 4 pages.
Office Action dated Nov. 9, 2016 in U.S. Appl. No. 14/754,295, 22 pages.
Office Action dated Aug. 2, 2016 in U.S. Appl. No. 14/754,295, 32 pages.
Response to Office Action filed Sep. 29, 2016 in U.S. Appl. No. 14/754,295, 11 pages.
International Search Report and Written Opinion dated Sep. 8, 2016 in International Patent Application No. PCT/US2016/039138, 10 pages.
International Search Report and Written Opinion dated Sep. 28, 2016 in International Patent Application No. PCT/US2016/039465, 12 pages.
Guo et al., "3D-Stacked Memory-Side Acceleration: Accelerator and System Design", Proceedings of the 2nd MICRO Workshop on Near-Data Processing (WoNDP '14), Dec. 11, 2014, 17 pages.
Belhadj et al., "The Improbable But Highly Appropriate Marriage of 3D Stacking and Neuromorphic Accelerators", Proceedings of the 2014 International Conference on Compilers, Architecture and Synthesis for Embedded Systems (CASES '14), Oct. 12, 2014, 9 pages.
Zhao et al., "Optimizing GPU Energy Efficiency with 3D Die-Stacking Graphics Memory and Reconfigurable Memory Interface", ACM Transactions on Architecture and Code Optimization, vol. 10, No. 4, Dec. 24, 2013, 25 pages.
Esmaeilzadeh et al., "Neural Acceleration for General-Purpose Approximate Programs", Proceedings of the 45th Annual IEEE/ACM International Symposium on Microarchitecture (MICRO '12), Dec. 1, 2012, 12 pages.
International Search Report and Written Opinion dated Oct. 6, 2016 in International Patent Application No. PCT/US2016/039140, 12 pages.
"The Convey HC-2 Computer", Retrieved From: https://www.micron.com/resource-details/c803edd0-ff6a-4807-b08c-boa2d75e7156, Oct. 29, 2015, 10 Pages.
"Non Final Office Action Issued in U.S. Appl. No. 14/754,344", dated Sep. 27, 2018, 16 Pages.

(56) References Cited

OTHER PUBLICATIONS

Dimond, et al., "Custard—a customisable threaded FPGA soft processor and tools", In Proceedings of the International Conference on Field Programmable Logic and Applications, Aug. 24, 2005, 6 Pages.

Fleming, et al., "Leveraging latency-insensitivity to ease multiple FPGA design", In Proceedings of the ACM/SIGDA International symposium on Field Programmable Gate Arrays, Feb. 22, 2012, pp. 175-184.

Krasnov, et al., "RAMP Blue: A Message-Passing Manycore System in FPGAs", In Proceedings of the International conference on Field Programmable Logic and Applications, Aug. 27, 2009, pp. 54-61.

Mencer, et al., "Cube: A 512-FPGA cluster", In Proceedings of the 5th Southern Conference on Programmable Logic, Apr. 1, 2009, pp. 51-57.

Moussali, et al., "Supporting multithreading in configurable soft processor cores", In Proceedings of the International conference on Compilers, architecture, and synthesis for embedded systems, Sep. 30, 2007, 5 Pages.

"International Preliminary Report on Patentability Issued in PCT Application No. PCT/US2016/026288", dated May 23, 2017, 8 Pages.

"International Search Report & Written Opinion Issued in PCT Application No. PCT/US2016/026288", dated Jul. 7, 2016, 15 Pages.

"Second Written Opinion Issued in PCT Application No. PCT/US2016/026288", dated Nov. 22, 2016, 8 Pages.

"International Preliminary Report on Patentability Issued in PCT Application No. PCT/US2016/039138", dated Sep. 18, 2017, 13 Pages.

"International Preliminary Report on Patentability Issued in PCT Application No. PCT/US2016/039140", dated Sep. 22, 2017, 9 Pages.

Stuecheli, Jeff, "Next Generation POWER Microprocessor", In Proceedings of the Hot Chips: A Symposium on High Performance Chips, Aug. 2013, 20 Pages.

"Final Office Action Issued in U.S. Appl. No. 14/754,344", dated Mar. 18, 2019, 12 Pages.

\* cited by examiner

INSTRUCTION TO RECONFIGURE DOMAIN 1,
LEAVING DOMAIN 2 UNDISTURBED

Features:
NumberofOccurences_0 = 7
NumberofOccurences_1 = 4
NumberofTuples_0_1 = 1

FFE #0 = NumberofOccurences_0 + NumberofOccurences_1 = 11

$$\text{FFE \#1} = \frac{(2 \times \text{NumberofOccurences}\_0 + \text{NumberofOccurences}\_1)}{(2 \times \text{NumberofTuples}\_0\_1)} = 9$$

FFE #2 = ln (NumberofOccurences_0/NumberofOccurences_1) = 0.5596157879

$$\text{FFE \#3} = \frac{(\text{NumberofOccurences}\_0^{}(5 \times \text{NumberofTuples}\_0\_1))}{(\text{NumberofOccurences}\_1)^{}0.3} = 11088.4847$$

FIG. 42

MACHINE LEARNING CLASSIFICATION ON HARDWARE ACCELERATORS WITH STACKED MEMORY

BACKGROUND

The computing industry seeks to improve the speed and efficiency of software-driven computing devices. Software-driven computing devices employ one or more central processing units (CPUs) that process machine-readable instructions in a conventional temporal manner. Hardware acceleration components (such as field-programmable gate arrays (FPGAs)) have been used to supplement the processing performed by software-driven computing devices.

SUMMARY

According to a first aspect, a method is provided for processing on an acceleration component a machine learning classification model. The machine learning classification model includes a plurality of decision trees, the decision trees including a first amount of decision tree data. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The method includes slicing the model into a plurality of model slices, each of the model slices having a third amount of decision tree data less than or equal to the second amount of memory, storing the plurality of model slices on the memory stack, and for each of the model slices, copying the model slice to the acceleration component memory, and processing the model slice using a set of input data on the acceleration component to produce a slice result.

According to a second aspect, a system for processing a machine learning classification model is provided. The machine learning classification model includes a plurality of decision trees, the decision trees including a first amount of decision tree data. The system includes an acceleration component and a model slicing component. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The model slicing component is configured to slice the model into a plurality of model slices, each of the model slices having a third amount of decision tree data less than or equal to the second amount of memory, and store the plurality of model slices on the memory stack. For each of the model slices, the acceleration component copies the model slice to the acceleration component memory and processes the model slice using a set of input data on the acceleration component to produce a slice result.

According to a third aspect, a method for processing a machine learning classification model is provided. The machine learning classification model includes a plurality of decision trees, the decision trees including a first amount of decision tree data. The method includes providing an acceleration component including an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The method further includes storing the plurality of decision trees on the memory stack, and for each of the decision trees copying a first portion of the decision tree to the acceleration component memory, processing the first portion using a set of input data on the acceleration component, and copying a second portion of decision tree to the acceleration component memory based on a result of processing the first portion of the decision tree.

The above-summarized functionality can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 42 is a diagram illustrating example feature values and free form expression equations.

Figure 1:
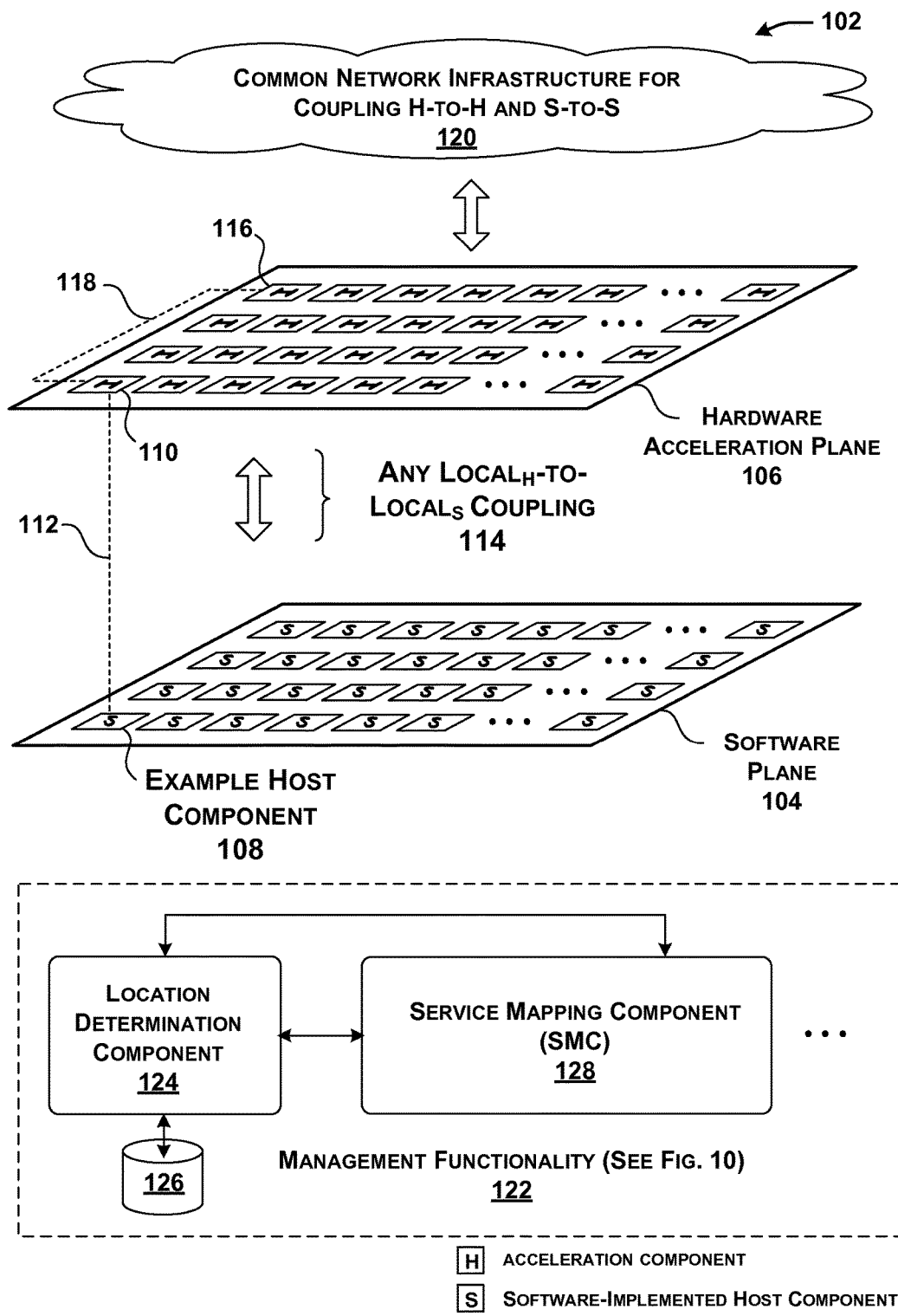
FIG. 1 shows an overview of a data processing system that includes a software plane and a hardware acceleration plane.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure describes an example data processing system that includes a hardware acceleration plane and a software plane. Example hardware acceleration components in the hardware acceleration plane are described. An example hardware acceleration component includes acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. A model slicing component is configured to slice the model into a plurality of model slices, each of the model slices having a third amount of decision tree data less than or equal to the second amount of memory, and store the plurality of model slices on the memory stack. For each of the model slices, the acceleration component copies the model slice to the acceleration component memory and processes the model slice using a set of input data on the acceleration component to produce a slice result.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof.

In one case, the illustrated separation of various components in the figures into distinct units may reflect the use of corresponding distinct physical and tangible components in an actual implementation. Alternatively, or in addition, any single component illustrated in the figures may be implemented by more than one actual physical component. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into multiple component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The following explanation may identify one or more features as "optional." This type of statement is not to be interpreted as an exhaustive indication of features that may be considered optional. That is, other features can be considered as optional, although not explicitly identified in the text. Further, any description of a single entity is not intended to preclude the use of more than one such entity. Similarly, a description of multiple entities is not intended to preclude the use of a single entity. Further, although the description may explain certain features as alternative ways of carrying out identified functions or implementing identified mechanisms, the features also can be combined together in any combination. Finally, the terms "exemplary" or "illustrative" refer to an implementation among potentially many implementations.

FIG. 1 shows an overview of a data processing system 102 that includes a software plane 104 and a hardware acceleration plane 106. Software plane 104 includes a collection of software-driven components (each denoted by the symbol "S" in FIG. 1), whereas hardware acceleration plane 106 includes a collection of hardware acceleration components (each denoted by the symbol "H" in FIG. 1).

For instance, a software-driven host component may correspond to a server computer that executes machine-readable instructions using one or more central processing units (CPUs). Each CPU, in turn, may execute the instructions on one or more hardware threads. Each hardware acceleration component, on the other hand, may correspond to hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), and so on.

The term "hardware" acceleration component is also intended to broadly encompass different ways of leveraging a hardware device to perform a function, including, for instance, at least: a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run on MPPAs of soft processors or the like; e) a case in which at least some tasks run as software on hard ASIC processors or the like, and so on, or any combination thereof. Likewise, data processing system 102 can accommodate different manifestations of software-driven devices in software plane 104.

To simplify repeated reference to hardware acceleration components, the following explanation will refer to these devices as simply "acceleration components." Further, the following explanation will present a primary example in which the acceleration components correspond to FPGA devices, although, as noted, data processing system 102 may be constructed using other types of acceleration components. Further, hardware acceleration plane 106 may be constructed using a heterogeneous collection of acceleration components, including different types of FPGA devices having different respective processing capabilities and architectures, a mixture of FPGA devices and other devices, and so on.

A host component generally performs operations using a temporal execution paradigm, e.g., by using each of its CPU hardware threads to execute machine-readable instructions, one after the other. In contrast, an acceleration component may perform operations using a spatial paradigm, e.g., by using a large number of parallel logic elements to perform computational tasks. Thus, an acceleration component can perform some operations in less time compared to a software-driven host component. In the context of data processing system 102, the "acceleration" qualifier associated with the term "acceleration component" reflects its potential for accelerating the functions that are performed by host components.

In one example, data processing system 102 corresponds to a data center environment that includes a plurality of computer servers. The computer servers correspond to the host components in software plane 104 shown in FIG. 1. In other cases, data processing system 102 corresponds to an enterprise system. In other cases, data processing system 102 corresponds to a user device or appliance which uses at least one host component that has access to two or more acceleration components, etc. These examples are cited by way of example, not limitation. Still other applications are possible.

In one implementation, each host component in data processing system 102 is coupled to at least one acceleration component through a local link. That fundamental unit of processing equipment is referred to herein as a "server unit component" because that equipment may be grouped together and maintained as a single serviceable unit within data processing system 102 (although not necessarily so). The host component in the server unit component is referred to as the "local" host component to distinguish it from other host components that are associated with other server unit components. Likewise, the acceleration component(s) of the server unit component is referred to as the "local" acceleration component(s) to distinguish them from other acceleration components that are associated with other server unit components.

For example, FIG. 1 shows an illustrative local host component 108 that is coupled to a local acceleration component 110 through a local link 112 (such as, as will be described below, a Peripheral Component Interconnect Express (PCIe) link). That pairing of local host component 108 and local acceleration component 110 forms at least part of a single server unit component. More generally, FIG. 1 shows that software plane 104 is coupled to hardware acceleration plane 106 through many individual local links, which FIG. 1 collectively refers to as a local$_H$-to-local$_S$ coupling 114.

Local host component 108 may further indirectly communicate with any other remote acceleration component in hardware acceleration plane 106. For example, local host component 108 has access to a remote acceleration component 116 via local acceleration component 110. More specifically, local acceleration component 110 communicates with remote acceleration component 116 via a link 118.

In one implementation, a common network 120 is used to couple host components in software plane 104 to other host components, and to couple acceleration components in hardware acceleration plane 106 to other acceleration components. That is, two host components may use the same network 120 to communicate with each other as do two acceleration components. As another feature, the interaction among host components in software plane 104 is independent of the interaction among acceleration components in hardware acceleration plane 106.

This means, for instance, that two or more acceleration components may communicate with each other in a transparent manner from the perspective of host components in software plane 104, outside the direction of the host components, and without the host components being "aware" of the particular interaction that is taking place in hardware acceleration plane 106. A host component may nevertheless initiate interaction that takes place in hardware acceleration plane 106 by issuing a request for a service that is hosted by hardware acceleration plane 106.

According to one non-limiting implementation, data processing system 102 uses the Ethernet protocol to transmit IP packets over common network 120. In one implementation, each local host component in a server unit component is given a single physical IP address. The local acceleration component in the same server unit component may adopt the same IP address. The server unit component can determine whether an incoming packet is destined for the local host component as opposed to the local acceleration component in different ways.

For example, packets that are destined for the local acceleration component can be formulated as user datagram protocol (UDP) packets specifying a specific port. Host-defined packets, on the other hand, are not formulated in this way. In another case, packets belonging to hardware acceleration plane 106 can be distinguished from packets belonging to software plane 104 based on the value of a status flag in each of the packets (e.g., in the header or body of a packet).

In view of the above characteristic, data processing system 102 may be conceptualized as forming two logical networks that share the same physical communication links. The packets associated with the two logical networks may be distinguished from each other by their respective traffic classes in the manner described above. But in other implementations (e.g., as described below with respect to FIG. 8), data processing system 102 may use two distinct physical networks to handle host-to-host traffic and hardware-to-hardware traffic, respectively. Further, in implementations that use common network 120, the host-to-host network infrastructure need not be entirely identical to the hardware-to-hardware network infrastructure. That is, these two infrastructures are common in the sense that most of their network resources are shared, but not necessarily all of their network resources are shared.

Finally, management functionality 122 serves to manage the operations of data processing system 102. As will be set forth in greater detail below, management functionality 122 can be physically implemented using different control architectures. For example, in one control architecture, management functionality 122 may include multiple local management components that are coupled to one or more global management components. Each local management component and global management component may be implemented with one or computer processors with memory store instructions, or dedicated logic gate arrays implemented, for example, in an FPGA or on an ASIC, or other similar device.

In an example, management functionality 122 can include a number of sub-components that perform different respective logical functions (which can be physically implemented in different ways). A location determination component 124, for instance, identifies the current locations of services within data processing system 102, based on current allocation information stored in a data store 126. Location determination component 124 may be implemented with one or computer processors with memory store instructions, or dedicated logic gate arrays implemented, for example, in an FPGA or on an ASIC, or other similar device.

As used herein, a service refers to any function that is performed by the data processing system 102. For example, a service may correspond to an encryption function. Another service may correspond to a document ranking function. Another service may correspond to a data compression function. Still another service may correspond to an image classification function. Yet another service may correspond to a machine learning function, and so on.

In operation, location determination component 124 may receive a request for a service. In response, location determination component 124 returns an address associated with the service, if that address is present in data store 126. The address may identify a particular acceleration component that hosts the requested service.

A service mapping component (SMC) 128 maps services to particular data processing system 102 components. SMC 128 may be implemented with one or computer processors with memory store instructions, or dedicated logic gate arrays implemented, for example, in an FPGA or on an ASIC, or other similar device. SMC 128 may operate in at least two modes depending on the type of triggering event SMC 128 receives which invokes operation of SMC 128. In a first mode, SMC 128 processes requests for services made by instances of tenant functionality. An instance of tenant functionality may correspond to a software program running on a particular local host component, or, more specifically, a program executing on a virtual machine that, in turn, is associated with the particular local host component. That software program may request a service in the course of its execution.

SMC 128 handles the request by determining an appropriate component (or components) in data processing system 102 to provide the service. Possible components for consideration include: a local acceleration component (associated with the local host component from which the request originated); a remote acceleration component; and/or the local host component itself (whereupon the local host component will implement the service in software). SMC 128 makes its determinations based on one or more mapping considerations, such as whether the requested service pertains to a line-rate service or other load balancing and power management considerations.

In another manner of operation, SMC 128 generally operates in a background and global mode, allocating services to data processing system 102 components based on global conditions in data processing system 102 (rather than, or in addition to, handling individual requests from instances of tenant functionality, as in the first mode). For example, SMC 128 may invoke its allocation function in response to a change in demand that affects one or more services. In this mode, SMC 128 again makes its determinations based on one or more mapping considerations, such as the historical demand associated with the services, etc.

SMC 128 may interact with location determination component 124 in performing its functions. For instance, SMC 128 may consult data store 126 when it seeks to determine the address of an already allocated service provided by an acceleration component. SMC 128 also can update data store 126 when it maps a service to one or more acceleration components, e.g., by storing the addresses of those acceleration components in relation to the service.

Although not shown in FIG. 1, a sub-component of SMC 128 also manages multi-component services. A multi-component service is a service that is composed of multiple acceleration components.

As a matter of convenience, FIG. 1 illustrates management functionality 122 separate from the components in software plane 104 and hardware plane 106. But as will be described below, any aspect of management functionality 122 can be implemented using the resources of software plane 104 and/or hardware plane 106. When implemented by hardware plane 106, the management functions can be accelerated like any service.

Figure 2:
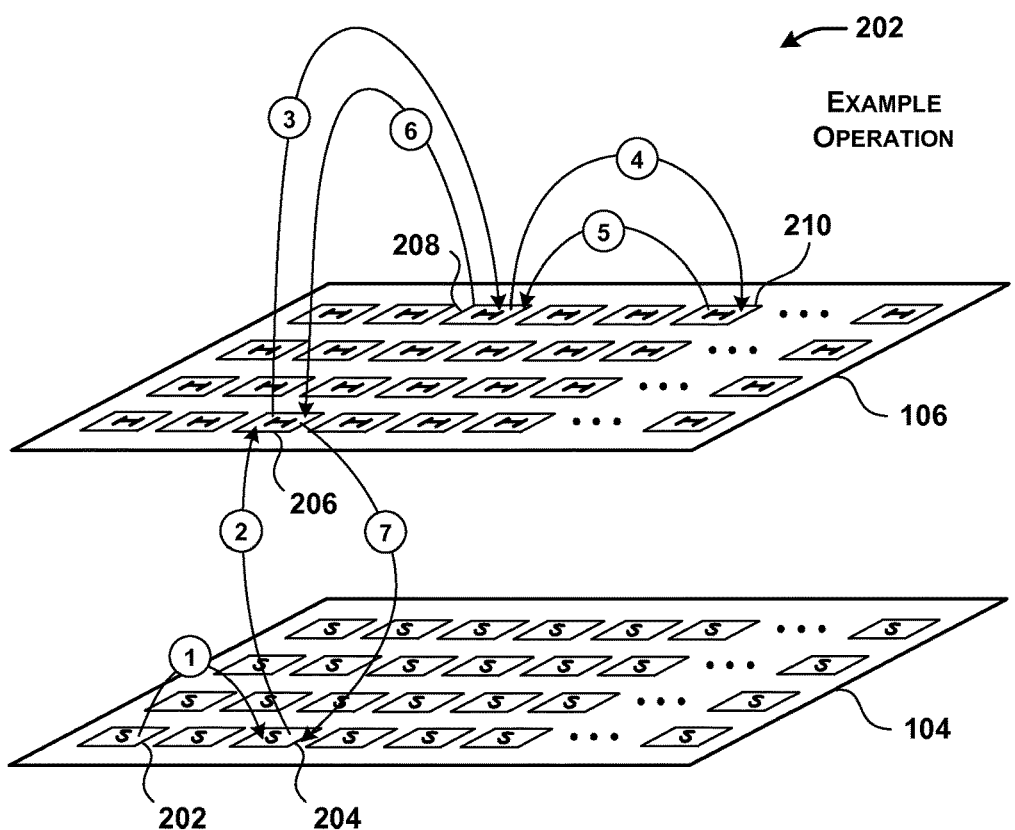
FIG. 2 shows a first example of the operation of the data processing system of FIG. 1.

FIG. 2 shows a first example of the operation of data processing system 102 of FIG. 1, corresponding to a single transaction, or part of a single transaction. In operation (1), a first host component 202 communicates with a second host component 204 in the course of performing a single computational task. Second host component 204 then requests the use of a service that is implemented in hardware acceleration plane 106 (although second host component 204 may not be "aware" of where the service is implemented, beyond that the service can be accessed at a specified address).

In many cases, a requested service is implemented on a single acceleration component (although there may be plural redundant such acceleration components to choose from among). But in the particular example of FIG. 2, the requested service corresponds to a multi-component service that is spread out over a collection (or cluster) of acceleration components, each of which performs an allocated part of the service. A graph structure may specify the manner by which the individual acceleration components are coupled together in the collection. In some implementations, the graph structure also identifies at least one head component. The head component corresponds to a point of contact by which entities in data processing system 102 may interact with the multi-component service in hardware acceleration plane 106. The head component also may serve as an initial processing stage in a processing pipeline defined by the graph structure. In the particular case of FIG. 2, assume that acceleration component 206 corresponds to local acceleration component 206 (that is locally linked to local host component 204) and acceleration component 208 is the head component of the multi-component service.

In operations (2) and (3), the requesting local host component 204 accesses acceleration component 208 via its local acceleration component 206. Acceleration component 208 then performs its part of the multi-component service to generate an intermediate output result. In operation (4), acceleration component 208 then invokes another acceleration component 210, which performs another respective part of the multi-component service, to generate a final result. In operations (5), (6), and (7), hardware acceleration plane 106 successively forwards the final result back to the requesting local host component 204, through the same chain of components set forth above but in the opposite direction. Note that the data flow operations described above, including the flow operations that define the return path, are cited by way of example, not limitation. Other multi-component services may use other graph structures that specify any other flow paths. For example, acceleration component 210 can forward the final result directly to local acceleration component 206.

First, note that the operations that take place in hardware acceleration plane 106 are performed in an independent manner of operations performed in software plane 104. In other words, the host components in software plane 104 do not manage the operations in hardware acceleration plane 106. However, the host components may invoke the operations in hardware acceleration plane 106 by issuing requests for services that are hosted by hardware acceleration plane 106.

Second, note that hardware acceleration plane 106 performs its transactions in a manner that is transparent to a requesting host component. For example, local host component 204 may be "unaware" of how its request is being processed in hardware acceleration plane, including the fact that the service corresponds to a multi-component service.

Third, note that in this implementation the communication in software plane 104 (e.g., corresponding to operation (1)) takes place using the same common network 120 as communication in hardware acceleration plane 106 (e.g., corresponding to operations (3)-(6)). Operations (2) and (7) may take place over a local link, corresponding to $local_H$-to-$local_S$ coupling 114 shown in FIG. 1.

The multi-component service shown in FIG. 2 resembles a ring in that a series of acceleration components are traversed in a first direction to arrive at a final result. The final result is then propagated back through the same series of acceleration components in the opposite direction to the head component. But as noted above, other multi-component services may use different collections of acceleration components having different respective flow structures.

Figure 3:
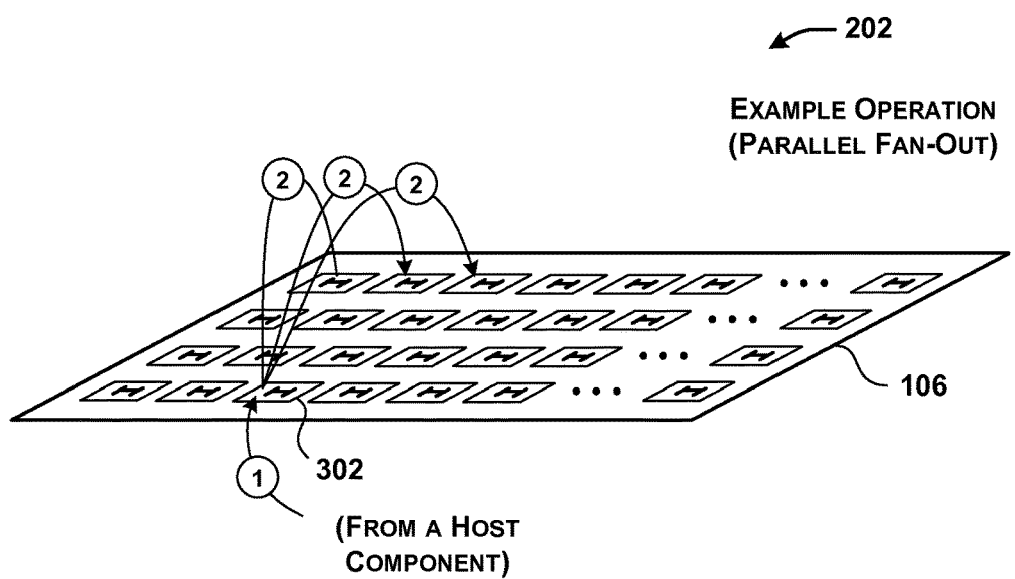
FIG. 3 shows a second example of the operation of the data processing system of FIG. 1.

For example, FIG. 3 shows a second example of the operation of data processing system 102 of FIG. 1 that employs a different flow structure compared to the example of FIG. 1. More specifically, in operation (1), a local host component (not shown) sends a request to its local acceleration component 302. In this case, assume that the local acceleration component is also the head component of the service. In operation (2), the head component may then forward multiple messages to multiple respective acceleration components. Each acceleration component that receives the message may perform a part of the multi-component service in parallel with the other acceleration components. (Note that FIG. 3 may represent only a portion of a more complete transaction.)

Moreover, a multi-component service does not necessarily need to employ a single head component, or any head component. For example, a multi-component service can employ a cluster of acceleration components which all perform the same function. Data processing system 102 can be configured to invoke this kind of multi-component service by contacting any arbitrary member in the cluster. That acceleration component may be referred to as a head component because it is the first component to be accessed, but it otherwise has no special status. In yet other cases, a host component may initially distribute plural requests to plural members of a collection of acceleration components.

Figure 4:
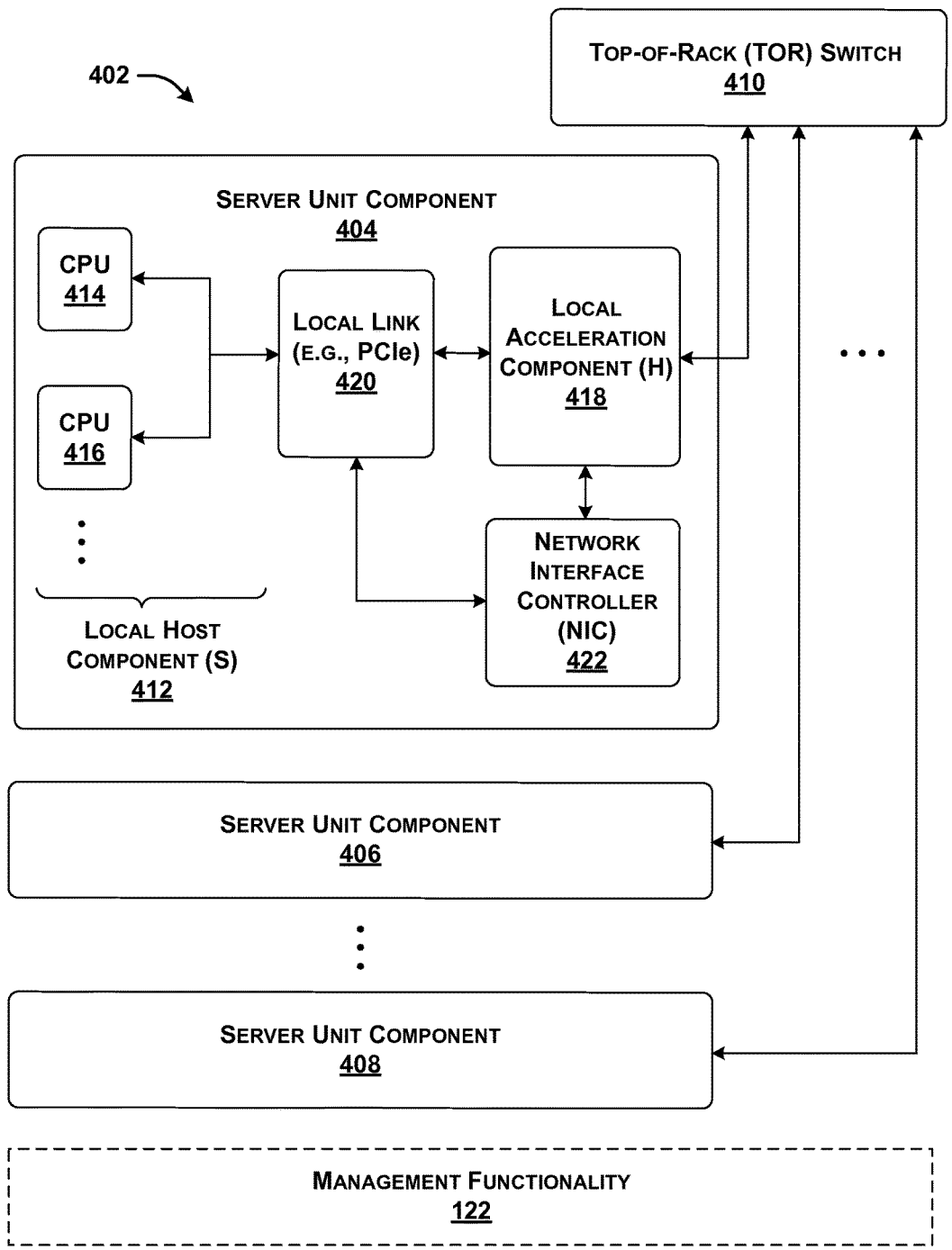
FIG. 4 shows one implementation of the data processing system of FIG. 1, corresponding to a data center.

FIG. 4 shows a portion of a data center 402 which represents one implementation of data processing system 102 of FIG. 1. In particular, FIG. 4 shows one rack in data center 402. The rack includes multiple server unit components (404, 406, . . . , 408), each of which is coupled to a top-of-rack (TOR) switch 410. A TOR refers to a switch that couples the components in a rack to other parts of a data center. Other racks, although not shown, may have a similar architecture. A rack is a physical structure for housing or otherwise grouping multiple processing components.

FIG. 4 also shows the illustrative composition of one representative server unit component 404. Server unit component 404 includes a local host component 412 that includes one or more central processing units (CPUs) (414, 416, . . . ), and a local acceleration component 418. Local acceleration component 418 is directly coupled to local host component 412 via a local link 420. Local link 420, for example, may be implemented as a PCIe link. Local acceleration component 418 is also indirectly coupled to local host component 412 by way of a network interface controller (NIC) 422.

Finally, local acceleration component 418 is coupled to TOR switch 410. Hence, in this particular implementation, local acceleration component 418 represents the sole path through which local host component 412 interacts with other components in data center 402 (including other host components and other acceleration components). Among other effects, the architecture of FIG. 4 allows local acceleration component 418 to perform processing on packets that are received from (and/or sent to) TOR switch 410 (e.g., by performing encryption, compression, etc.), without burdening the CPU-based operations performed by local host component 412.

Local host component 412 may communicate with local acceleration component 418 through local link 420 or via NIC 422. Different entities may leverage these two paths in different respective circumstances. For example, assume that a program running on local host component 412 requests a service. In one implementation, assume that local host component 412 provides a local instantiation of location determination component 124 and data store 126. Or a global management component may provide location determination component 124 and its data store 126. In either case, local host component 412 may consult data store 126 to determine the address of the service. Local host component 412 may then access the service via NIC 422 and TOR switch 410, using the identified address.

In another implementation, assume that local acceleration component 418 provides a local instantiation of location determination component 124 and data store 126. Local host component 412 may access local acceleration component 418 via local link 420. Local acceleration component 418 can then consult data store 126 to determine the address of the service, upon which it accesses the service via TOR switch 410. Still other ways of accessing the service are possible.

Figure 5:
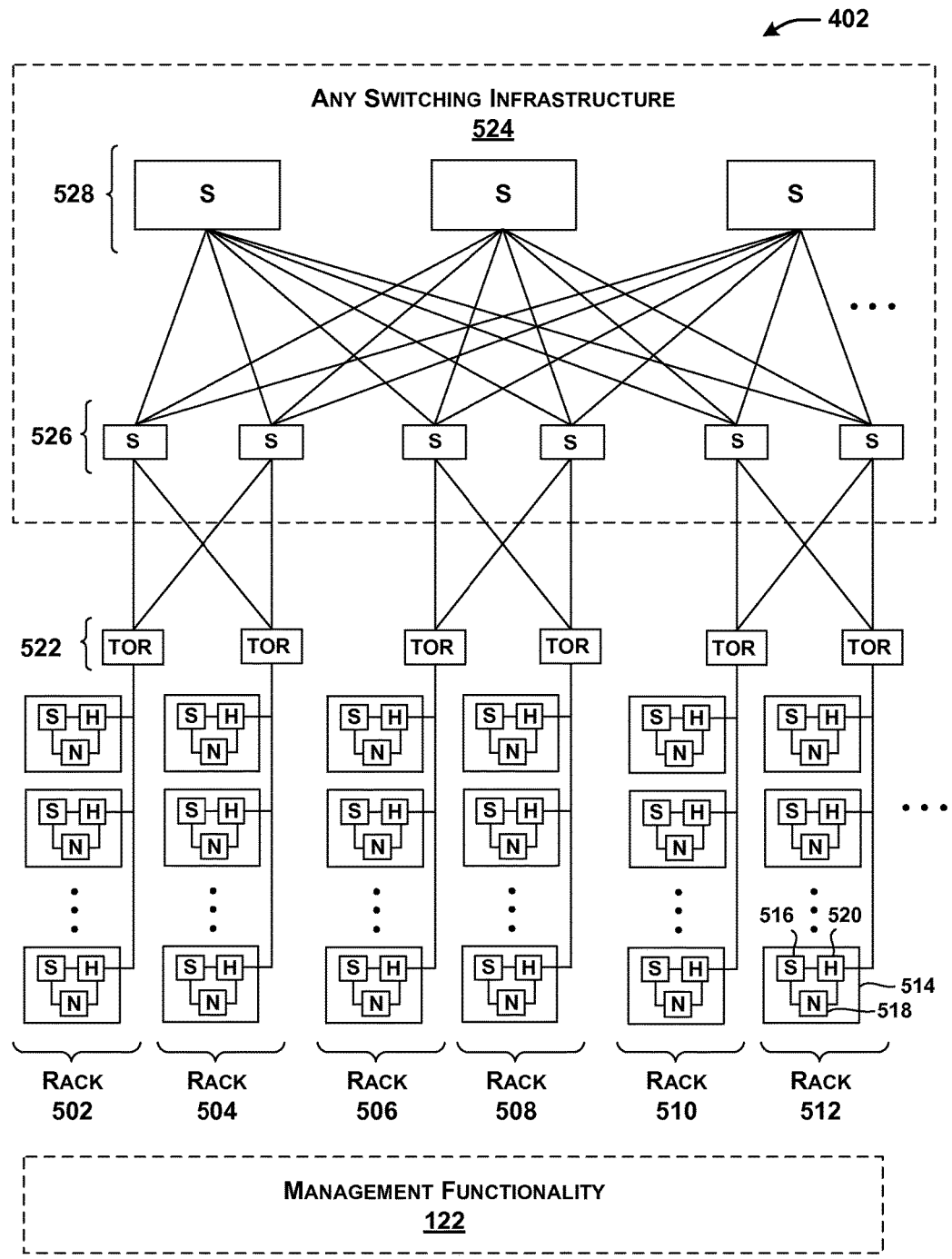
FIG. 5 is a more encompassing depiction of the data center implementation of FIG. 4.

FIG. 5 is a more encompassing depiction of the data center 402 of FIG. 4. Data center 402 includes a plurality of racks (502-512). Each rack includes a plurality of server unit components. Each server unit component, in turn, may have the architecture described above in FIG. 4. For example, a representative server unit component 514 includes a local host component (S) 516, a network interface controller (N) 518, and a local acceleration component (H) 520.

The routing infrastructure shown in FIG. 5 corresponds to one implementation of common network 120, described above with reference to FIG. 1. The routing infrastructure includes a plurality of TOR switches 522 and higher-level switching infrastructure 524. Higher-level switching infrastructure 524 connects TOR switches 522 together. Higher-level switching infrastructure 524 can have any architecture, and may be driven by any routing protocol(s). In the illustrated example of FIG. 5, higher-level switching infrastructure 524 includes at least a collection of aggregation switches 526, core switches 528, etc. The traffic routed through the illustrated infrastructure may correspond to Ethernet IP packets.

Data center 402 shown in FIG. 5 may correspond to a set of resources provided at a single geographic location, or a distributed collection of resources that are distributed over multiple geographic locations (e.g., over plural individual contributing data centers located in different parts of the world). In a distributed context, management functionality 122 can send work from a first contributing data center to a second contributing data center based on any mapping consideration(s), such as: (1) a determination that acceleration components are available at the second contributing data center; (2) a determination that acceleration components are configured to perform a desired service or services at the second contributing data center; and/or (3) a determination that the acceleration components are not only configured to performed a desired service or services, but they are immediately available (e.g., "online") to perform those services, and so on. As used herein, the term "global" generally refers to any scope that is more encompassing than the local domain associated with an individual server unit component.

Generally note that although FIGS. 4 and 5 focus on the use of a relatively expansive data processing system (corresponding to a data center), some of the principles set forth herein can be applied to smaller systems, including a case in which a single local host component (or other type of component) is coupled to multiple acceleration components, including a local acceleration component and one or more remote acceleration components. Such a smaller system may even be embodied in a user device or appliance, etc. The user device may have the option of using local acceleration resources and/or remote acceleration resources.

Figure 6:
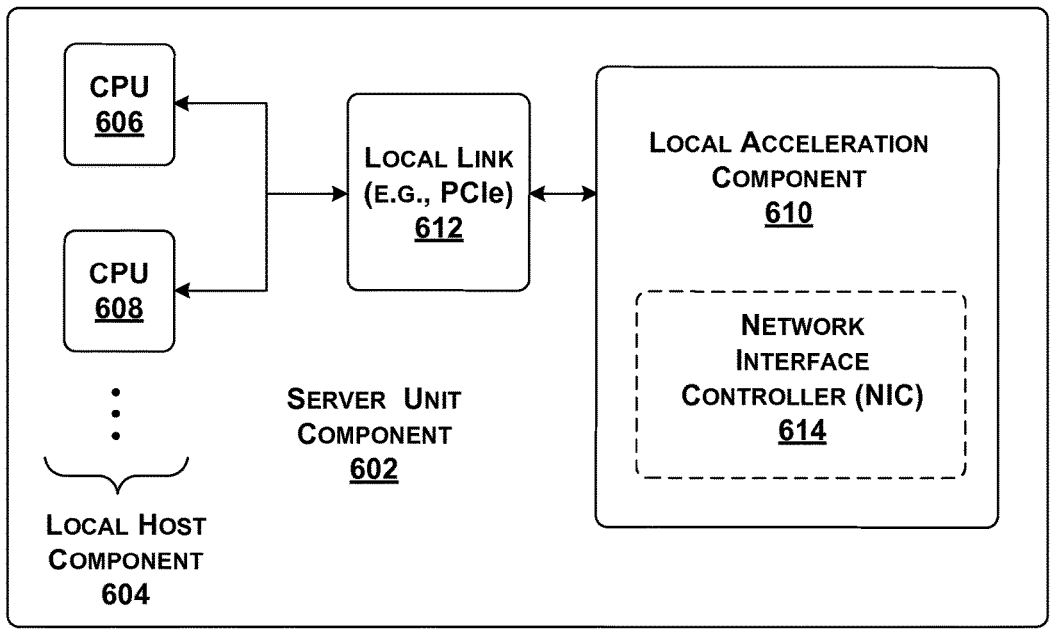
FIG. 6 shows an alternative way of implementing a server unit component, compared to that shown in FIG. 4.

FIG. 6 shows an alternative way of implementing a server unit component 602, compared to the architecture shown in FIG. 4. Like the case of FIG. 4, server unit component 602 of FIG. 6 includes a local host component 604 made up of one or more CPUs (606, 608, . . . ), a local acceleration component 610, and a local link 612 for coupling local host component 604 with local acceleration component 610. Unlike the case of FIG. 4, server unit component 602 implements a network interface controller (NIC) 614 as an internal component of local acceleration component 610, rather than as a separate component.

Figure 7:
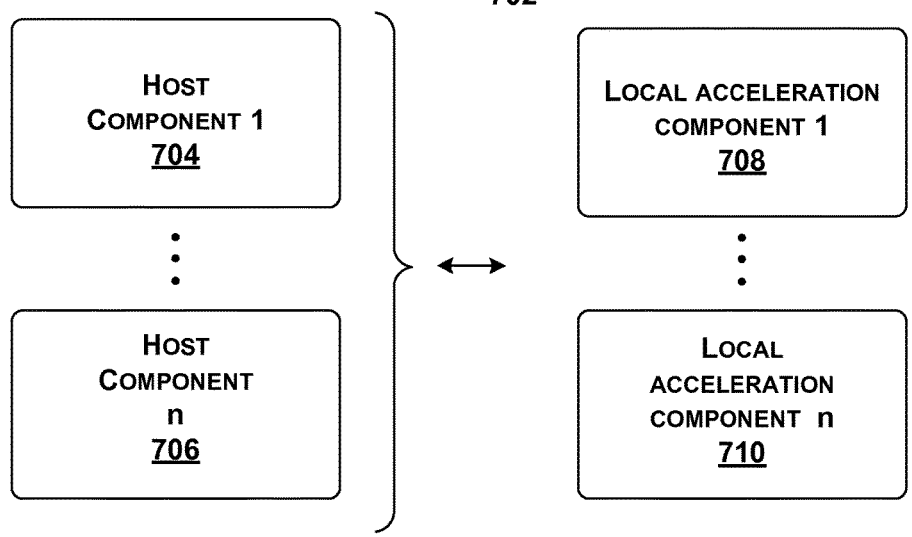
FIG. 7 shows yet another way of implementing a server unit component compared to that shown in FIG. 4.

FIG. 7 shows another way of implementing a server unit component 702 compared to the architecture shown in FIG. 4. In the case of FIG. 7, server unit component 702 includes any number n of local host components (704, . . . , 706)

together with any number m of local acceleration components (708, . . . , 710) (other components of server unit component 702 are omitted from the figure to facilitate explanation).

For example, server unit component 702 may include a single host component coupled to two local acceleration components. The two acceleration components can perform different respective tasks. For example, one acceleration component can be used to process outgoing traffic to its local TOR switch, while the other acceleration component can be used to process incoming traffic from the TOR switch. In addition, server unit component 702 can load any services on any of the local acceleration components (708, . . . , 710).

Also note that in the examples set forth above, a server unit component may refer to a physical grouping of components, e.g., by forming a single serviceable unit within a rack of a data center. In other cases, a server unit component may include one or more host components and one or more acceleration components that are not necessarily housed together in a single physical unit. In that case, a local acceleration component may be considered logically, rather than physically, associated with its respective local host component.

Alternatively, or in addition, a local host component and one or more remote acceleration components can be implemented on a single physical component, such as a single MPSoC-FPGA die. The network switch may also be incorporated into that single component.

Figure 8:
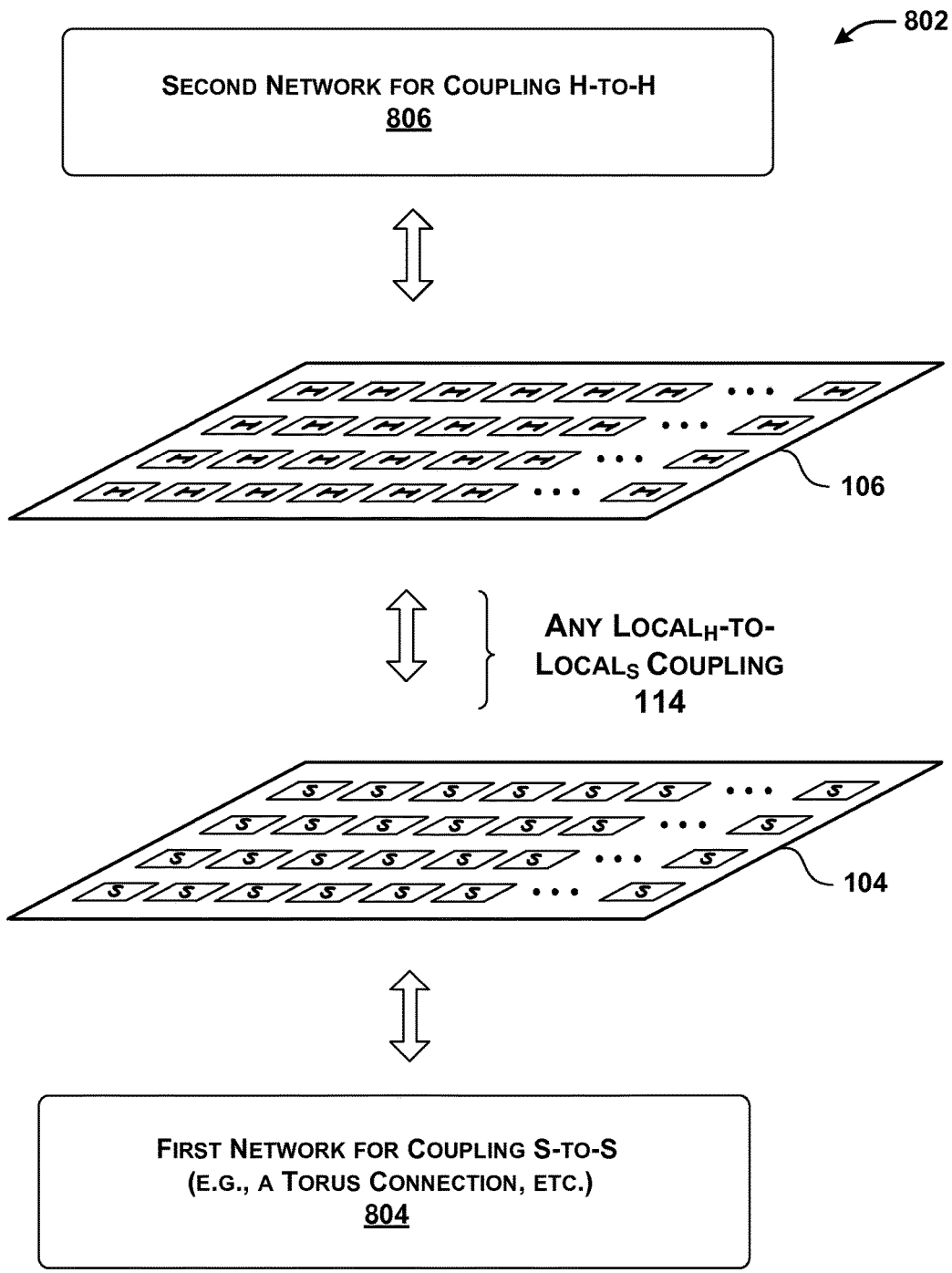
FIG. 8 shows an alternative data processing system compared to that shown in FIG. 1, e.g., which uses a different network infrastructure compared to that shown in FIG. 1.

FIG. 8 shows an alternative data processing system 802 compared to that shown in FIG. 1. Like data processing system 102 of FIG. 1, data processing system 802 includes a software plane 104 and a hardware acceleration plane 106, and a $local_H$-to-$local_S$ coupling 114 for connecting local host components to respective local acceleration components. But unlike data processing system 102 of FIG. 1, data processing system 802 includes a first network 804 for coupling host components together, and a second network 806 for coupling hardware components together, wherein first network 804 differs from second network 806, at least in part.

For example, first network 804 may correspond to the type of data center switching infrastructure shown in FIG. 5. Second network 806 may correspond to dedicated links for connecting the acceleration components together having any network topology. For example, second network 806 may correspond to a p×r torus network. Each acceleration component in the torus network is coupled to east, west, north, and south neighboring acceleration components via appropriate cable links or the like. Other types of networks can alternatively be used having any respective sizes and dimensions.

In other cases, local hard CPUs, and/or soft CPUs, and/or acceleration logic provided by a single processing component (e.g., as implemented on a single die) may be coupled via diverse networks to other elements on other processing components (e.g., as implemented on other dies, boards, racks, etc.). An individual service may itself utilize one or more recursively local interconnection networks.

Further note that the above description was framed in the context of host components which issue service requests that are satisfied by acceleration components. But alternatively, or in addition, any acceleration component also can make a request for a service which can be satisfied by any other component, e.g., another acceleration component and/or even a host component. SMC 128 can address such a request in a similar manner to that described above. Indeed, certain features described herein can be implemented on a hardware acceleration plane by itself, without a software plane.

More generally stated, certain features can be implemented by any first component which requests a service, which may be satisfied by the first component, and/or by one or more local components relative to the first component, and/or by one or more remote components relative to the first component. To facilitate explanation, however, the description below will continue to be framed mainly in the context in which the entity making the request corresponds to a local host component.

Finally, other implementations can adopt different strategies for coupling the host components to the hardware components, e.g., other than the $local_H$-to-$local_S$ coupling 114 shown in FIG. 8.

Figure 9:
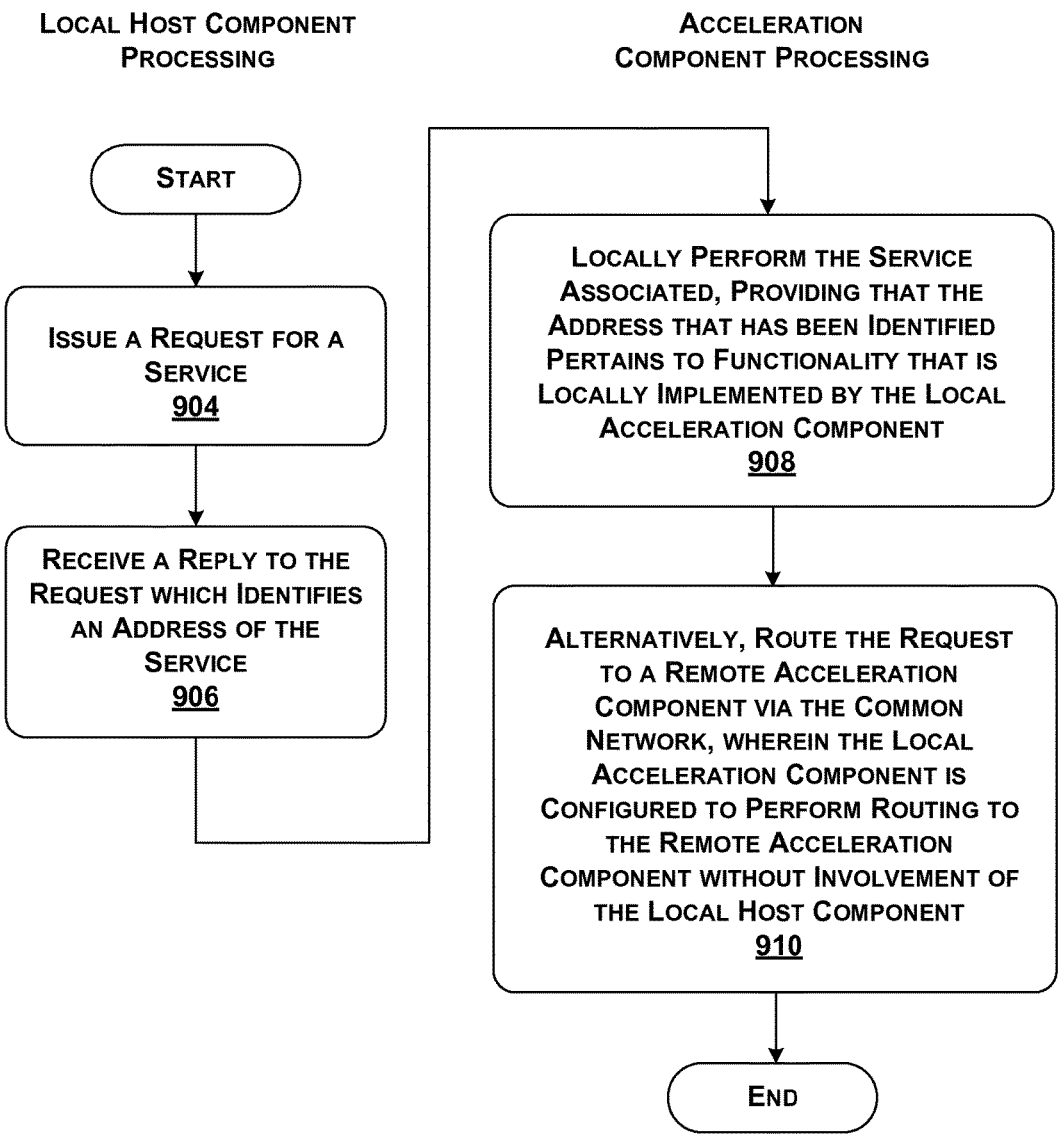
FIG. 9 is a flowchart that shows one manner of operation of the data processing system of FIG. 1.

FIG. 9 shows a process 902 which represents one illustrative manner of operation of data processing system 102 of FIG. 1. In block 904, a local host component issues a request for a service. In block 906, the local host component receives a reply to the request which may identify an address of the service. In an alternative implementation, an associated local acceleration component may perform blocks 904 and 906 after receiving a request from the local host component. In other words, either the local host component or the local acceleration component can perform the address lookup function.

In block 908, the associated local acceleration component may locally perform the service, assuming that the address that has been identified pertains to functionality that is locally implemented by the local acceleration component. Alternatively, or in addition, in block 910, the local acceleration component routes the request to a remote acceleration component. As noted above, the local acceleration component is configured to perform routing to the remote acceleration component without involvement of the local host component. Further, multiple host components communicate in data processing system 102 with each other over a same physical network as do multiple acceleration components.

Data processing system 102 has a number of useful characteristics. First, data processing system 102 uses a common network 120 (except for the example of FIG. 8) that avoids the expense associated with a custom network for coupling acceleration components together. Second, common network 120 makes it feasible to add an acceleration plane to an existing data processing environment, such as a data center. And after installment, the resultant data processing system 102 can be efficiently maintained because it leverages existing physical links found in the existing data processing environment. Third, data processing system 102 integrates acceleration plane 106 without imposing large additional power requirements, e.g., in view of the above-described manner in which local acceleration components may be integrated with existing server unit components. Fourth, data processing system 102 provides an efficient and flexible mechanism for allowing host components to access any acceleration resources provided by hardware acceleration plane 106, e.g., without narrowly pairing host components to specific fixed acceleration resources, and without burdening the host components with managing hardware acceleration plane 106 itself. Fifth, data processing system 102 provides an efficient mechanism for managing acceleration resources by intelligently dispersing these resources within hardware plane 106, thereby: (a) reducing the over-utilization and underutilization of resources (e.g., corresponding to the "stranded capacity" problem); (b) facilitating quick access to these services by consumers of these services; (c) accommodating heightened processing requirements specified by some consumers and/or services, and so on. The above effects are illustrative, rather than exhaustive. Data processing system 102 offers yet other useful effects.

Figure 10:
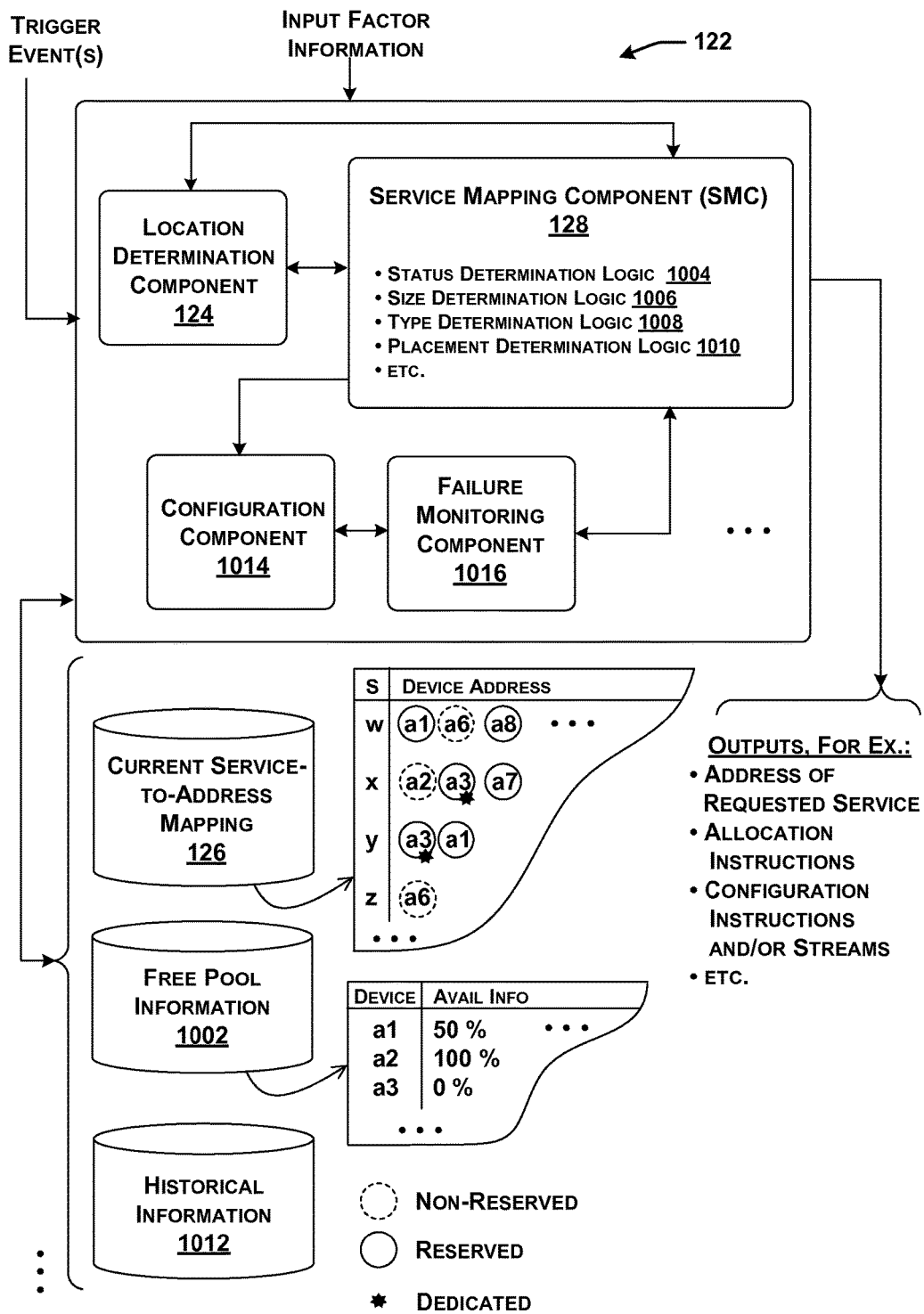
FIG. 10 shows an overview of one implementation of management functionality that is used to manage the data processing system of FIG. 1.

FIG. 10 shows an overview of one implementation of management functionality 122 that is used to manage data processing system 102 of FIG. 1. More specifically, FIG. 10 depicts a logical view of functions performed by management functionality 122, including its principal engine, SMC 128. Different sub-components correspond to different main functions performed by management functionality 122. FIGS. 17-20, described below, show various possible physical implementations of the logical functionality.

As described above, location determination component 124 identifies the current location of services within data processing system 102, based on current allocation information stored in data store 126. In operation, location determination component 124 receives a request for a service. In response, it returns the address of the service, if present within data store 126. The address may identify a particular acceleration component that implements the service.

Data store 126 may maintain any type of information which maps services to addresses. In the small excerpt shown in FIG. 10, data store 126 maps a small number of services (service w, service x, service y, and service z) to the acceleration components which are currently configured to provide these services. For example, data store 126 indicates that a configuration image for service w is currently installed on devices having addresses a1, a6, and a8. The address information may be expressed in any manner. Here, the address information is represented in high-level symbolic form to facilitate explanation.

In some implementations, data store 126 may optionally also store status information which characterizes each current service-to-component allocation in any manner. Generally, the status information for a service-to-component allocation specifies the way that the allocated service, as implemented on its assigned component (or components), is to be treated within data processing system 102, such as by specifying its level of persistence, specifying its access rights (e.g., "ownership rights"), etc. In one non-limiting implementation, for instance, a service-to-component allocation can be designated as either reserved or non-reserved.

When performing a configuration operation, SMC 128 can take into account the reserved/non-reserved status information associated with an allocation in determining whether it is appropriate to change that allocation, e.g., to satisfy a current request for a service, a change in demand for one or more services, etc. For example, data store 126 indicates that the acceleration components having address a1, a6, and a8 are currently configured to perform service w, but that only the assignments to acceleration components a1 and a8 are considered reserved. Thus, SMC 128 will view the allocation to acceleration component a6 as a more appropriate candidate for reassignment (reconfiguration), compared to the other two acceleration components.

In addition, or alternatively, data store 126 can provide information which indicates whether a service-to-component allocation is to be shared by all instances of tenant functionality, or dedicated to one or more particular instances of tenant functionality (or some other indicated consumer(s) of the service). In the former (fully shared) case, all instances of tenant functionality vie for the same resources provided by an acceleration component. In the latter (dedicated) case, only those clients that are associated with a service allocation are permitted to use the allocated acceleration component. FIG. 10 shows, in high-level fashion, that the services x and y that run on the acceleration component having address a3 are reserved for use by one or more specified instances of tenant functionality, whereas any instance of tenant functionality can use the other service-to-component allocations.

SMC 128 also may interact with a data store 1002 that provides availability information. The availability information identifies a pool of acceleration components that have free capacity to implement one or more services. For example, in one manner of use, SMC 128 may determine that it is appropriate to assign one or more acceleration components as providers of a function. To do so, SMC 128 draws on data store 1002 to find acceleration components that have free capacity to implement the function. SMC 128 will then assign the function to one or more of these free acceleration components. Doing so will change the availability-related status of the chosen acceleration components.

SMC 128 also manages and maintains the availability information in data store 1002. In doing so, SMC 128 can use different rules to determine whether an acceleration component is available or unavailable. In one approach, SMC 128 may consider an acceleration component that is currently being used as unavailable, while an acceleration component that is not currently being used as available. In other cases, the acceleration component may have different configurable domains (e.g., tiles), some of which are being currently used and others which are not being currently used.

Here, SMC 128 can specify the availability of an acceleration component by expressing the fraction of its processing resources that are currently not being used. For example, FIG. 10 indicates that an acceleration component having address a1 has 50% of its processing resources available for use. On the other hand, an acceleration component having address a2 is completely available, while an acceleration component having an address a3 is completely unavailable. Individual acceleration components can notify SMC 128 of their relative levels of utilization in different ways, as will be described in greater detail below.

In other cases, SMC 128 can take into consideration pending requests for an acceleration component in registering whether it is available or not available. For example, SMC 128 may indicate that an acceleration component is not available because it is scheduled to deliver a service to one or more instances of tenant functionality, even though it may not be engaged in providing that service at the current time.

In other cases, SMC 128 can also register the type of each acceleration component that is available. For example, data processing system 102 may correspond to a heterogeneous environment that supports acceleration components having different physical characteristics. The availability information in this case can indicate not only the identities of processing resources that are available, but also the types of those resources.

In other cases, SMC 128 can also take into consideration the status of a service-to-component allocation when registering an acceleration component as available or unavailable. For example, assume that a particular acceleration component is currently configured to perform a certain service, and furthermore, assume that the allocation has been designated as reserved rather than non-reserved. SMC 128 may designate that acceleration component as unavailable (or some fraction thereof as being unavailable) in view of its reserved status alone, irrespective of whether the service is currently being actively used to perform a function at the present time. In practice, the reserved status of an acceleration component therefore serves as a lock which prevents SMC 128 from reconfiguring the acceleration component, at least in certain circumstances.

Now referring to the core mapping operation of SMC 128 itself, SMC 128 allocates or maps services to acceleration components in response to triggering events. More specifically, SMC 128 operates in different modes depending on the type of triggering event that has been received. In a request-driven mode, SMC 128 handles requests for services by tenant functionality. Here, each triggering event corresponds to a request for an instance of tenant functionality that resides at least in part on a particular local host component. In response to each request by a local host component, SMC 128 determines an appropriate component to implement the service. For example, SMC 128 may choose from among: a local acceleration component (associated with the local host component that made the request), a remote acceleration component, or the local host component itself (whereupon the local host component will implement the service in software), or some combination thereof.

In a second background mode, SMC 128 operates by globally allocating services to acceleration components within data processing system 102 to meet overall anticipated demand in data processing system 102 and/or to satisfy other system-wide objectives and other factors (rather than narrowly focusing on individual requests by host components). Here, each triggering event that is received corresponds to some condition in the data processing system 102 as a whole that warrants allocation (or reallocation) of a service, such as a change in demand for the service.

Note, however, that the above-described modes are not mutually exclusive domains of analysis. For example, in the request-driven mode, SMC 128 may attempt to achieve at least two objectives. As a first primary objective, SMC 128 will attempt to find an acceleration component (or components) that will satisfy an outstanding request for a service, while also meeting one or more performance goals relevant to data processing system 102 as a whole. As a second objective, SMC 128 may optionally also consider the long term implications of its allocation of the service with respect to future uses of that service by other instances of tenant functionality. In other words, the second objective pertains to a background consideration that happens to be triggered by a request by a particular instance of tenant functionality.

For example, consider the following simplified case. An instance of tenant functionality may make a request for a service, where that instance of tenant functionality is associated with a local host component. SMC 128 may respond to the request by configuring a local acceleration component to perform the service. In making this decision, SMC 128 may first of all attempt to find an allocation which satisfies the request by the instance of tenant functionality. But SMC 128 may also make its allocation based on a determination that many other host components have requested the same service, and that these host components are mostly located in the same rack as the instance of tenant functionality which has generated the current request for the service. In other words, this supplemental finding further supports the decision to place the service on an in-rack acceleration component.

FIG. 10 depicts SMC 128 as optionally including plural logic components that perform different respective analyses. As a first optional component of analysis, SMC 128 may use status determination logic 1004 to define the status of an allocation that it is making, e.g., as either reserved or non-reserved, dedicated or fully shared, etc. For example, assume that SMC 128 receives a request from an instance of tenant functionality for a service. In response, SMC 128 may decide to configure a local acceleration component to provide the service, and, in the process, designate this allocation as non-reserved, e.g., under the initial assumption that the request may be a "one-off" request for the service.

In another situation, assume that SMC 128 makes the additional determination that the same instance of tenant functionality has repeatedly made a request for the same service in a short period of time. In this situation, SMC 128 may make the same allocation decision as described above, but this time SMC 128 may designate it as being reserved. SMC 128 may also optionally designate the service as being dedicated to just the requesting tenant functionality. By doing so, SMC 128 may enable data processing system 102 to more effectively satisfy future requests for this service by the instance of tenant functionality. In other words, the reserved status may reduce the chance that SMC 128 will later move the service from the local acceleration component, where it is being heavily used by the local host component.

In addition, an instance of tenant functionality (or a local host component) may specifically request that it be granted a reserved and dedicated use of a local acceleration component. Status determination logic 1004 can use different environment-specific rules in determining whether to honor this request. For instance, status determination logic 1004 may decide to honor the request, providing that no other triggering event is received which warrants overriding the request. Status determination logic 1004 may override the request, for instance, when it seeks to fulfill another request that is determined, based on any environment-specific reasons, as having greater urgency than the tenant functionality's request.

In some implementations, note that an instance of tenant functionality (or a local host component or some other consumer of a service) may independently control the use of its local resources. For example, a local host component may pass utilization information to management functionality 122 which indicates that its local acceleration component is not available or not fully available, irrespective of whether the local acceleration component is actually busy at the moment. In doing so, the local host component may prevent SMC 128 from "stealing" its local resources. Different implementations can use different environment-specific rules to determine whether an entity is permitted to restrict access to its local resources in the above-described manner, and if so, in what circumstances.

In another example, assume that SMC 128 determines that there has been a general increase in demand for a particular service. In response, SMC 128 may find a prescribed number of free acceleration components, corresponding to a "pool" of acceleration components, and then designate that pool of acceleration components as reserved (but fully shared) resources for use in providing the particular service. Later, SMC 128 may detect a general decrease in demand for the particular service. In response, SMC 128 can decrease the pool of reserved acceleration components, e.g., by changing the status of one or more acceleration components that were previously registered as "reserved" to "non-reserved."

Note that the particular dimensions of status described above (reserved vs. non-reserved, dedicated vs. fully shared) are cited by way of illustration, not limitation. Other implementations can adopt any other status-related dimensions, or may accommodate only a single status designation (and therefore omit use of status determination logic 1004 functionality).

As a second component of analysis, SMC 128 may use size determination logic 1006 to determine a number of acceleration components that are appropriate to provide a service. SMC 128 can make such a determination based on a consideration of the processing demands associated with the service, together with the resources that are available to meet those processing demands.

As a third component of analysis, SMC 128 can use type determination logic 1008 to determine the type(s) of acceleration components that are appropriate to provide a service. For example, consider the case in which the data processing system 102 has a heterogeneous collection of acceleration components having different respective capabilities. The type determination logic 1008 can determine one or more of a particular kind of acceleration components that are appropriate to provide the service.

As a fourth component of analysis, SMC 128 can use placement determination logic 1010 to determine the specific acceleration component (or components) that are appropriate to address a particular triggering event. This determination, in turn, can have one more aspects. For instance, as part of its analysis, placement determination logic 1010 can determine whether it is appropriate to configure an acceleration component to perform a service, where that component is not currently configured to perform the service.

The above facets of analysis are cited by way of illustration, not limitation. In other implementations, SMC 128 can provide additional phases of analyses.

Generally, SMC 128 performs its various allocation determinations based on one or more mapping considerations. For example, one mapping consideration may pertain to historical demand information provided in a data store 1002. Note, however, that SMC 128 need not perform multi-factor analysis in all cases. In some cases, for instance, a host component may make a request for a service that is associated with a single fixed location, e.g., corresponding to the local acceleration component or a remote acceleration component. In those cases, SMC 128 may simply defer to location determination component 124 to map the service request to the address of the service, rather than assessing the costs and benefits of executing the service in different ways. In other cases, data store 126 may associate plural addresses with a single service, each address associated with an acceleration component that can perform the service. SMC 128 can use any mapping consideration(s) in allocating a request for a service to a particular address, such as a load balancing consideration.

As a result of its operation, SMC 128 can update data store 126 with information that maps services to addresses at which those services can be found (assuming that this information has been changed by SMC 128). SMC 128 also can store status information that pertains to new service-to-component allocations.

To configure one or more acceleration components to perform a function (if not already so configured), SMC 128 can invoke a configuration component 1014. Configuration component 1014 may be implemented with one or computer processors with memory store instructions, or dedicated logic gate arrays implemented, for example, in an FPGA or on an ASIC, or other similar device. In one implementation, configuration component 1014 configures acceleration components by sending a configuration stream to the acceleration components. A configuration stream specifies the logic to be "programmed" into a recipient acceleration component. Configuration component 1014 may use different strategies to configure an acceleration component, several of which are set forth below.

A failure monitoring component 1016 determines whether a previously configured acceleration component has failed. Failure monitoring component 1016 may be implemented with one or computer processors with memory store instructions, or dedicated logic gate arrays implemented, for example, in an FPGA or on an ASIC, or other similar device. SMC 128 may respond to failure notification by substituting a spare acceleration component for a failed acceleration component.

Figure 11:
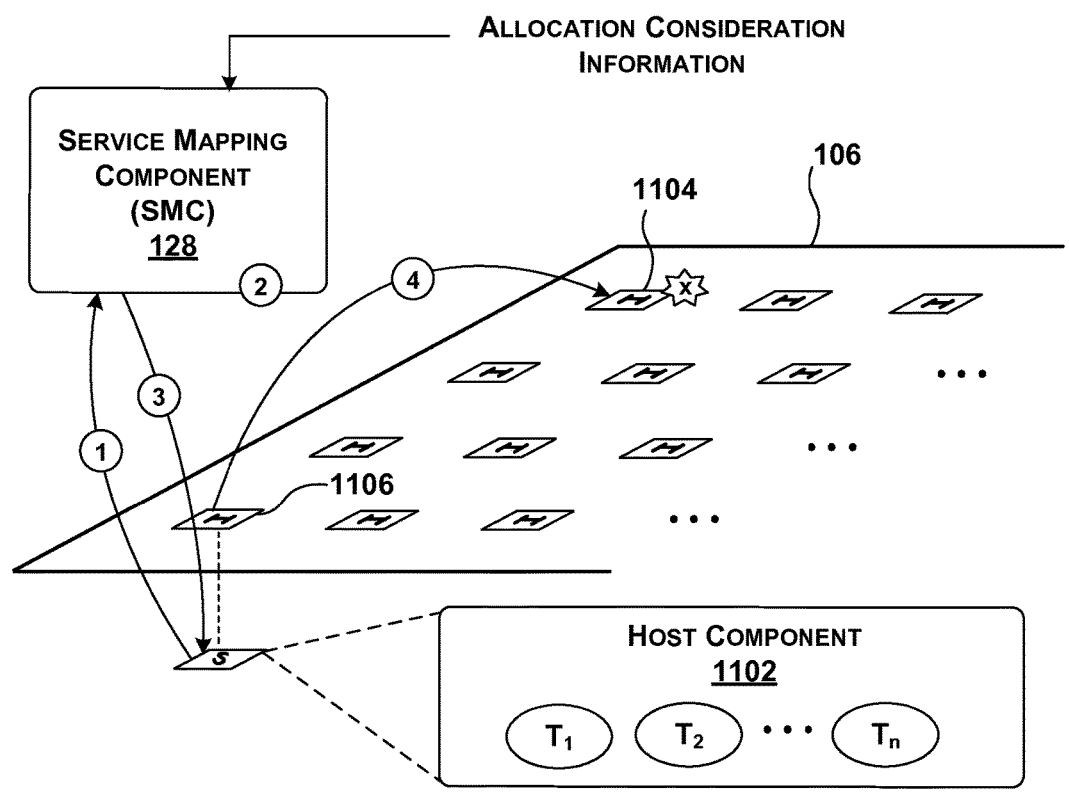
FIG. 11 provides an overview of one request-driven manner of operation of a service mapping component, which is a component of the management functionality of FIG. 10.
Figure 12:
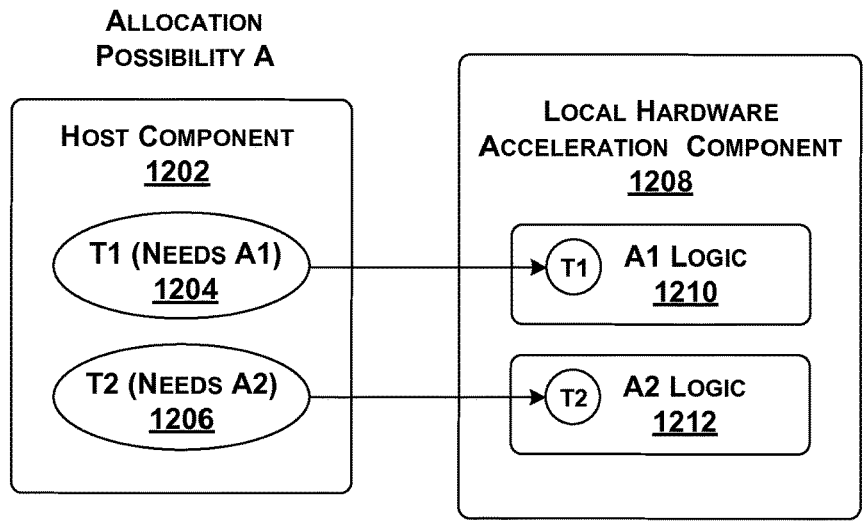
FIGS. 12-15 show different respective options for handling requests for services made by instances of tenant functionality that reside on a host component.

FIG. 11 provides an overview of one manner of operation of SMC 128 when applied to the task of processing requests by instances of tenant functionality running on host components. In the illustrated scenario, assume that a host component 1102 implements multiple instances of tenant functionality ($T_1, T_2, \ldots, T_n$). Each instance of tenant functionality may correspond to a software program that executes, at least in part, on host component 1102, e.g., in a virtual machine that runs using the physical resources of host component 1102 (among other possible host components). Further, assume that one instance of tenant functionality initiates the transaction shown in FIG. 11 by generating a request for a particular service. For example, the tenant functionality may perform a photo editing function, and may call on a compression service as part of its overall operation. Or the tenant functionality may perform a search algorithm, and may call on a ranking service as part of its overall operation.

In operation (1), local host component 1102 may send its request for the service to SMC 128. In operation (2), among other analyses, SMC 128 may determine at least one appropriate component to implement the service. In this case, assume that SMC 128 determines that a remote acceleration component 1104 is the most appropriate component to implement the service. SMC 128 can obtain the address of that acceleration component 1104 from location determination component 124. In operation (3), SMC 128 may communicate its answer to local host component 1102, e.g., in the form of the address associated with the service. In operation (4), local host component 1102 may invoke remote acceleration component 1104 via its local acceleration component 1106. Other ways of handling a request by tenant functionality are possible. For example, local acceleration component 1106 can query SMC 128, rather than, or in addition to, local host component 102.

Path 1108 represents an example in which a representative acceleration component 1110 (and/or its associated local host component) communicates utilization information to SMC 128. The utilization information may identify whether acceleration component 1110 is available or unavailable for use, in whole or in part. The utilization information may also optionally specify the type of processing resources that acceleration component 1110 possesses which are available for use. As noted above, the utilization information can also be chosen to purposively prevent SMC 128 from later utilizing the resources of acceleration component 1110, e.g., by indicating in whole or in part that the resources are not available.

Although not shown, any acceleration component can also make directed requests for specific resources to SMC 128. For example, host component 1102 may specifically ask to use its local acceleration component 1106 as a reserved and dedicated resource. As noted above, SMC 128 can use different environment-specific rules in determining whether to honor such a request.

Further, although not shown, other components besides the host components can make requests. For example, a hardware acceleration component may run an instance of tenant functionality that issues a request for a service that can be satisfied by itself, another hardware acceleration component (or components), a host component (or components), etc., or any combination thereof.

FIGS. 12-15 show different respective options for handling a request for a service made by tenant functionality that is resident on a host component. Starting with FIG. 12, assume that a local host component 1202 includes at least two instances of tenant functionality, T1 (1204) and T2 (1206), both of which are running at the same time (but, in actuality, local host component 1202 can host many more instances of tenant functionality). The first instance of tenant functionality T1 requires an acceleration service A1 to perform its operation, while the second instance of tenant functionality T2 requires an acceleration service A2 to perform its operation.

Further assume that a local acceleration component 1208 is coupled to local host component 1202, e.g., via a PCIe local link or the like. At the current time, local acceleration component 1208 hosts A1 logic 1210 for performing acceleration service A1, and A2 logic 1212 for performing acceleration service A2.

According to one management decision, SMC 128 assigns T1 to A1 logic 1210, and assigns T2 to A2 logic 1212. However, this decision by SMC 128 is not a fixed rule. SMC 128 may make its decision based on multiple factors, some of which may reflect conflicting considerations. As such, based on other factors (not described at this juncture), SMC 128 may choose to assign jobs to acceleration logic in a different manner from that illustrated in FIG. 12.

Figure 13:
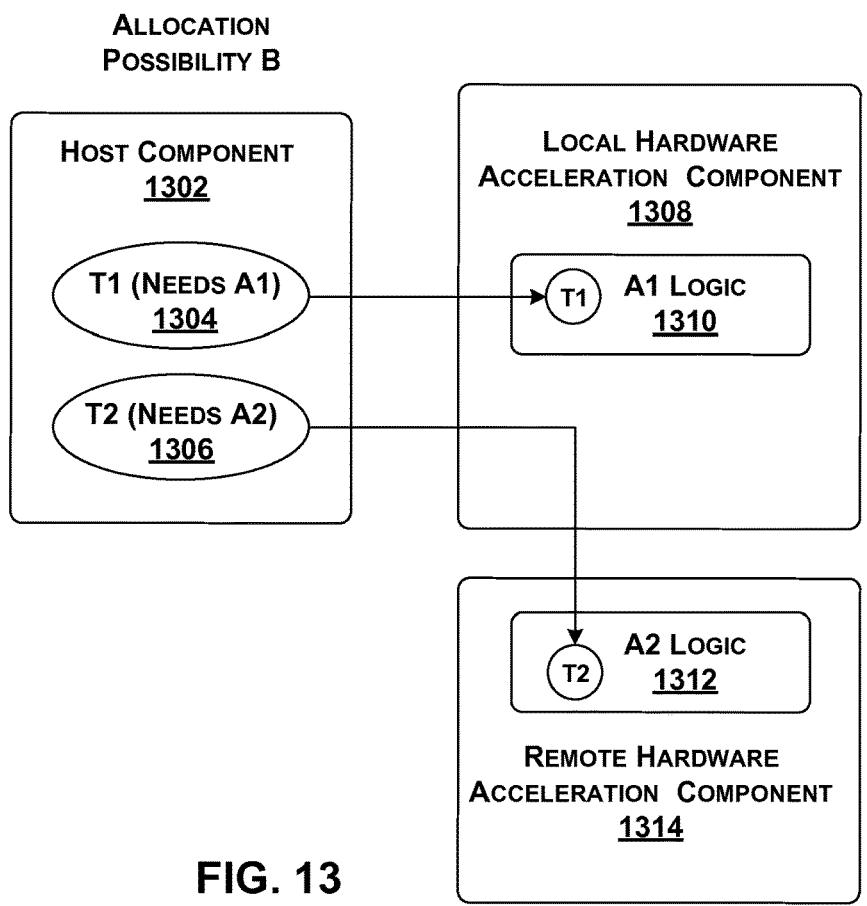

In the scenario of FIG. 13, host component 1302 has the same instances of tenant functionality (1304, 1306) with the same service needs described above. But in this case, a local acceleration component 1308 includes only A1 logic 1310 for performing service A1. That is, it no longer hosts A2 logic for performing service A2.

In response to the above scenario, SMC 128 may choose to assign T1 to A1 logic 1310 of acceleration component 1308. SMC 128 may then assign T2 to A2 logic 1312 of a remote acceleration component 1314, which is already configured to perform that service. Again, the illustrated assignment is set forth here in the spirit of illustration, not limitation. SMC 128 may choose a different allocation based on another combination of input considerations. In one implementation, local host component 1302 and remote acceleration component 1314 can optionally compress the information that they send to each other, e.g., to reduce consumption of bandwidth.

Note that host component 1302 accesses A2 logic 1312 via local acceleration component 1308. But in another case (not illustrated), host component 1302 may access A2 logic 1312 via the local host component (not illustrated) that is associated with acceleration component 1314.

Figure 14:
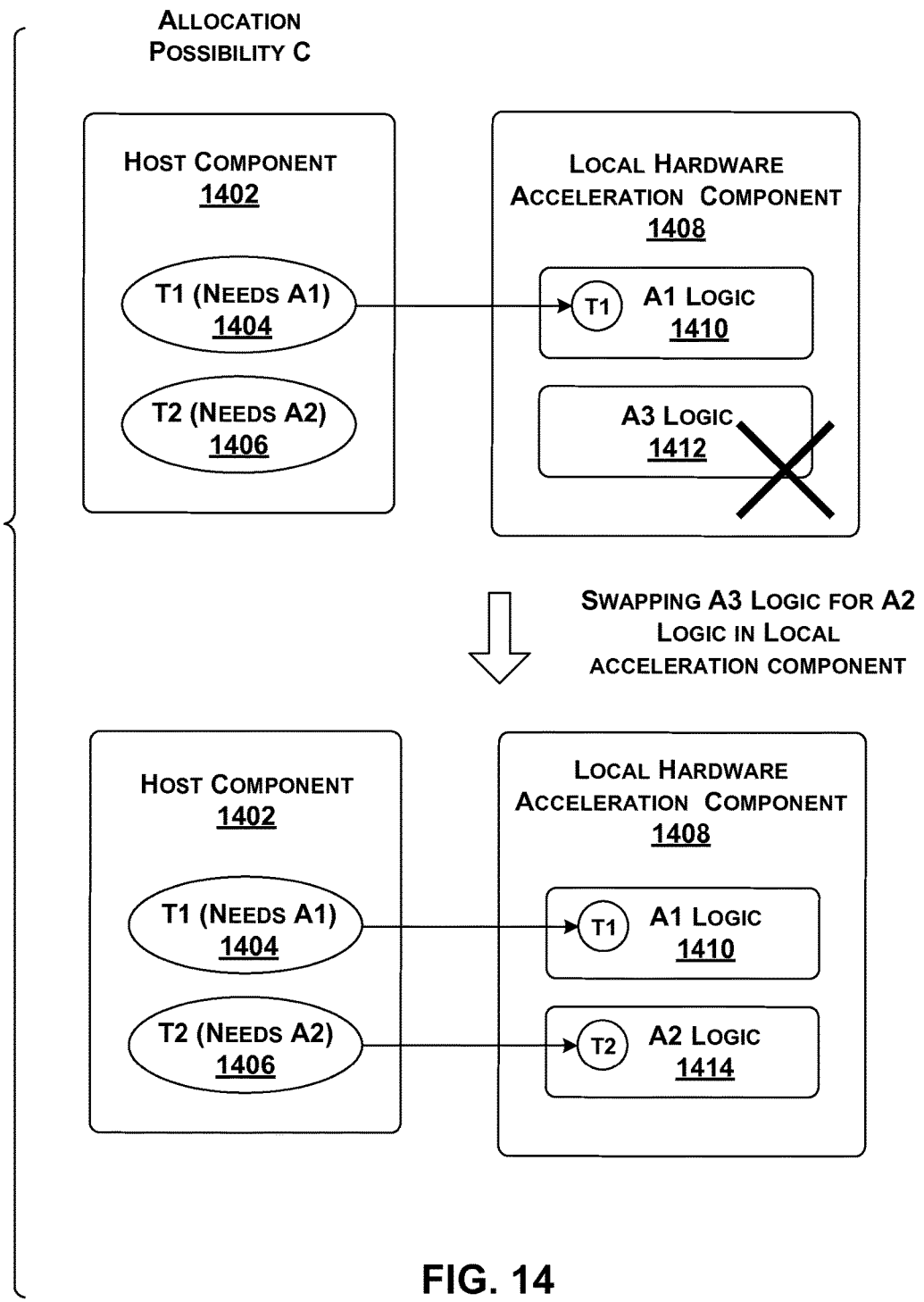

FIG. 14 presents another scenario in which host component 1402 has the same instances of tenant functionality (1404, 1406) with the same service needs described above. In this case, a local acceleration component 1408 includes A1 logic 1410 for performing service A1, and A3 logic 1412 for performing service A3. In response to the above scenario, SMC 128 may use configuration component 1006 (of FIG. 10) to reconfigure acceleration component 1408 so that it includes A2 logic 1414, rather than A3 logic 1412 (as shown at the bottom of FIG. 14). SMC 128 may then assign T2 to A2 logic 1414. Although not shown, SMC 128 can alternatively, or in addition, decide to reconfigure any remote acceleration component to perform A2 service.

Generally, SMC 128 can perform configuration in a full or partial manner to satisfy any request by an instance of tenant functionality. SMC 128 performs full configuration by reconfiguring all of the application logic provided by an acceleration component. SMC 128 can perform partial configuration by reconfiguring part (e.g., one or more tiles) of the application logic provided by an acceleration component, leaving other parts (e.g., one or more tiles) intact and operational during reconfiguration. The same is true with respect to the operation of SMC 128 in its background mode of operation, described below. Further note that additional factors may play a role in determining whether A3 logic 1412 is a valid candidate for reconfiguration, such as whether or not the service is considered reserved, whether or not there are pending requests for this service, etc.

Figure 15:
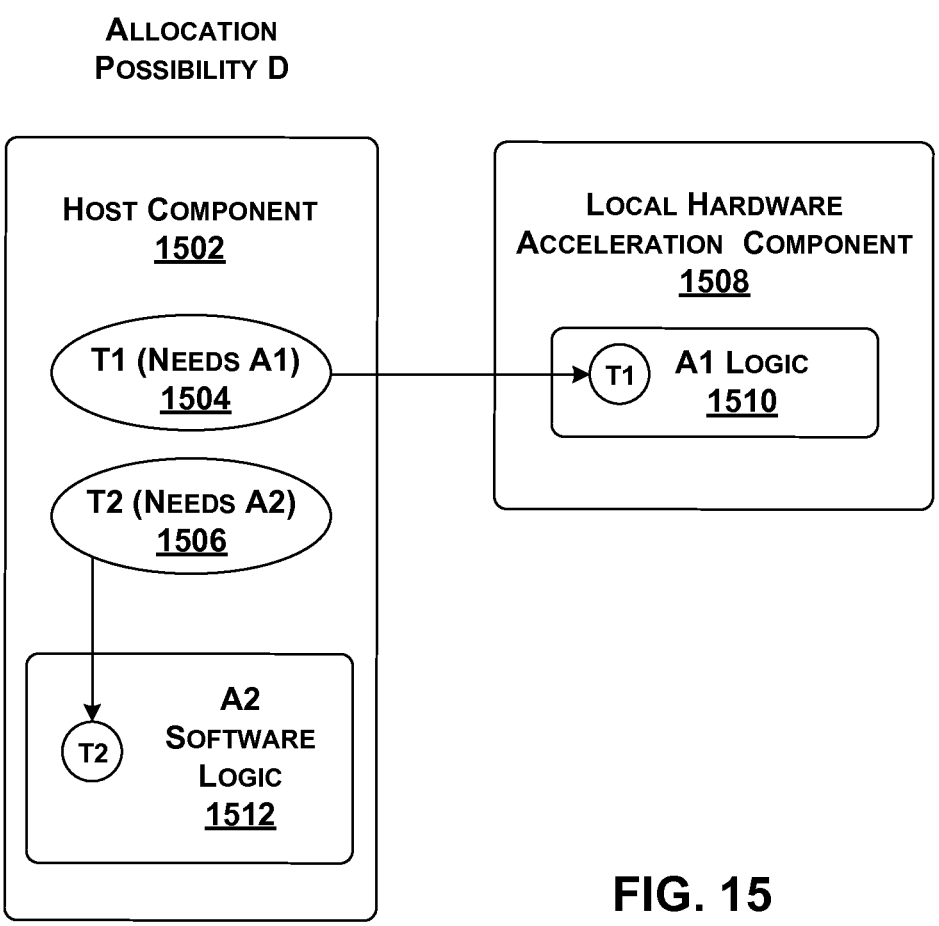

FIG. 15 presents another scenario in which host component 1502 has the same instances of tenant functionality (1504, 1506) with the same service needs described above. In this case, a local acceleration component 1508 includes only A1 logic 1510) for performing service A1. In response to the above scenario, SMC 128 may assign T1 to A1 logic 1510. Further, assume that SMC 128 determines that it is not feasible for any acceleration component to perform A2 service. In response, SMC 128 may instruct local host component 1502 to assign T2 to local A2 software logic 1512, if, in fact, that logic is available at host component 1502. SMC 128 can make the decision of FIG. 15 on various grounds. For example, SMC 128 may conclude that hardware acceleration is not possible because a configuration image does not currently exist for this service. Or the configuration image may exist, but SMC 128 concludes that there is insufficient capacity on any of the acceleration devices to load and/or run such a configuration.

Finally, the above examples were described in the context of instances of tenant functionality that run on host components. But as already noted above, the instances of tenant functionality may more generally correspond to service requestors, and those service requestors can run on any component(s), including acceleration components. Thus, for example, a requestor that runs on an acceleration component can generate a request for a service to be executed by one or more other acceleration components and/or by itself and/or by one or more host components. SMC 128 can handle the requestor's request in any of the ways described above.

Figure 16:
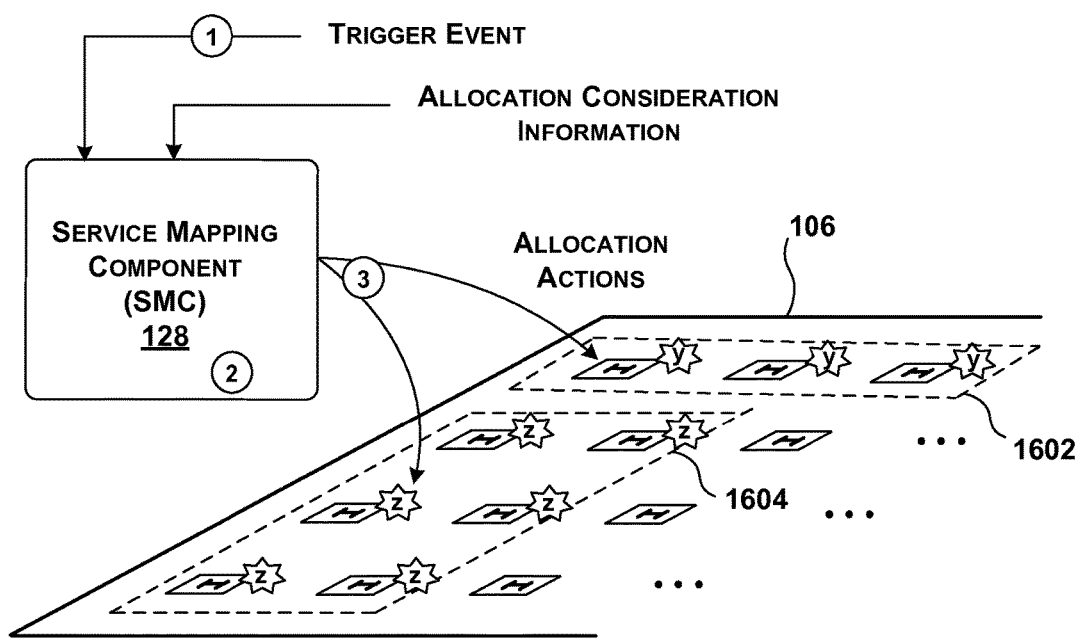
FIG. 16 provides an overview of another background-related manner of operation of the service mapping component of FIG. 10.

FIG. 16 provides an overview of one manner of operation of SMC 128 when operating in a background mode. In operation (1), SMC 128 may receive some type of triggering event which initiates the operation of SMC 128. For example, the triggering event may correspond to a change in demand which affects a service, etc. In operation (2), in response to the triggering event, SMC 128 determines an allocation of one or more services to acceleration components based on one or more mapping considerations and the availability information in data store 1002, e.g., by assigning the services to the acceleration components. In operation (3), SMC 128 carries out its allocation decisions. As part of this process, SMC 128 may call on configuration component 1014 to configure the acceleration components that have been allocated to perform the service(s), assuming that these components are not already configured to perform the service(s). SMC 128 also updates the service location information in data store 126, and if appropriate, the availability information in data store 1002.

In the particular example of FIG. 16, SMC 128 allocates a first group 1602 of acceleration components to perform a first service ("service y"), and allocates a second group 1604 of acceleration components to perform a second service ("service z"). In actual practice, an allocated group of acceleration components can have any number of members, and these members may be distributed in any fashion across hardware acceleration plane 106. SMC 128, however, may attempt to group the acceleration components associated with a service in a particular manner to achieve satisfactory bandwidth and latency performance (among other factors). SMC 128 may apply further analysis in allocating acceleration components associated with a single multi-component service, as also described in greater detail below.

SMC 128 also can operate in the background mode to allocate one or more acceleration components, which implement a particular service, to at least one instance of tenant functionality, without necessarily requiring the tenant functionality to make a request for this particular service each time. For example, assume that an instance of tenant functionality regularly uses a compression function, corresponding to "service z" in FIG. 16. SMC 128 can proactively allocate one or more dedicated acceleration components 1604 to at least this instance of tenant functionality. When the tenant functionality requires use of the service, it may draw from the pool of available addresses associated with acceleration components 1604 that have been assigned to it. The same dedicated mapping operation can be performed with respect to a group of instances of tenant functionality (instead of a single instance).

Figure 17:
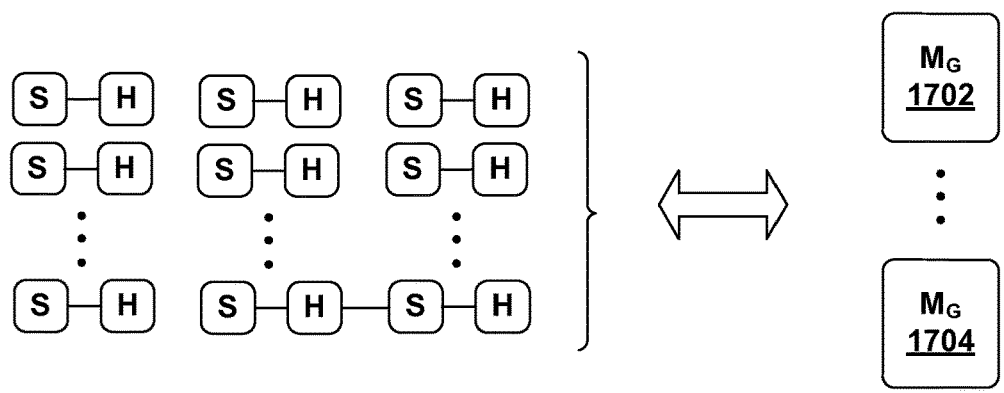
FIGS. 17-20 show different respective architectures for physically implementing the management functionality of FIG. 10.

FIG. 17 shows a first physical implementation of management functionality 122 of FIG. 10. In this case, management functionality 122 is provided on a single global management component ($M_G$) 1702, or on multiple global management components (1702, . . . , 1704). Each of global management components (1702, . . . , 1704) may be implemented with one or computer processors with memory store instructions, or dedicated logic gate arrays implemented, for example, in an FPGA or on an ASIC, or other similar device. The multiple global management components (1702, . . . , 1704), if used, may provide redundant logic and information to achieve desired load balancing and failure management performance. In one case, each global management component may be implemented on a computer server device, which may correspond to one of the host components, or a dedicated management computing device. In operation, any individual host component (S) or acceleration component (H) may interact with a global management component via common network 120 shown in FIG. 1.

Figure 18:
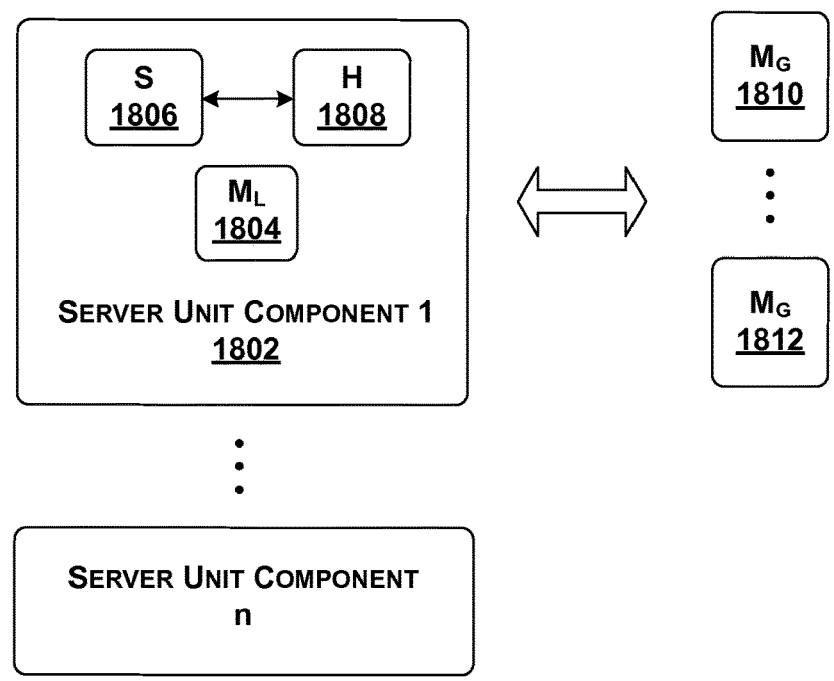

FIG. 18 shows a second physical implementation of management functionality 122 of FIG. 10. In this case, each server unit component (such as representative server unit component 1802) provides at least one local management component ($M_L$) 1804. For example, a local host component 1806 may implement local management component 1804 (e.g., as part of its hypervisor functionality), or a local acceleration component 1808 may implement local management component 1804, or some other component within server unit component 1802 may implement local management component 1804 (or some combination thereof).

Data processing system 102 also includes one or more global management components (1810, . . . , 1812). Each of global management components (1810, . . . , 1812) may be implemented with one or computer processors with memory store instructions, or dedicated logic gate arrays implemented, for example, in an FPGA or on an ASIC, or other similar device. Each global management component (1810, . . . , 1812) may provide redundant logic and information in the manner described above with respect to FIG. 17. Management functionality 122 collectively presents all of the local and global management components in data processing system 102, as set forth above.

The architecture of FIG. 18 can implement the request-driven aspects of SMC 128, for instance, in the following manner. Local management component 1804 may first determine whether local acceleration component 1808 can perform a service requested by tenant functionality. A global management component ($M_G$) can perform other decisions, such as identifying a remote acceleration component to perform a service, in the event that local acceleration component 1808 cannot perform this task. On the other hand, in the architecture of FIG. 17, a single global management component can perform all decisions pertaining to the mapping of a request to an acceleration component.

Further, local management component 1804 can send utilization information to a global management component on any basis, such as periodic basis and/or an event-driven basis (e.g., in response to a change in utilization). The global management component can use the utilization information to update its master record of availability information in data store 1002.

Figure 19:
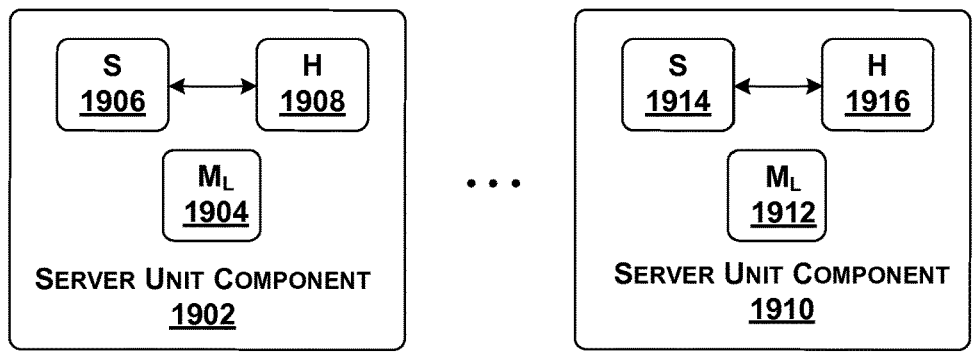

FIG. 19 shows a third physical implementation of management functionality 122 of FIG. 10. In this case, each server unit component stores its own dedicated local management component ($M_L$) (which can be implemented by a local host component as part of its hypervisor functionality, a local acceleration component, some other local component, or some combination thereof).

For instance, a server unit component 1902 provides a local management component 1904, along with a local host component 1906 and a local acceleration component 1908. Likewise, a server unit component 1910 provides a local management component 1912, along with a local host component 1914 and a local acceleration component 1916. Each instance of a local management component stores redundant logic and information with respect to other instances of the same component.

Known distributed system tools can be used to ensure that all distributed versions of this component contain the same logic and information, such as the ZOOKEEPER tool provided by Apache Software Foundation of Forest Hill, Md. (As an aside, note that the same technology can be used to maintain the redundant logic and information in the other examples described in this subsection.) Management functionality 122 collectively presents all of the local management components in data processing system 102, as set forth above. That is, there is no central global management component(s) in this example implementation.

Figure 20:
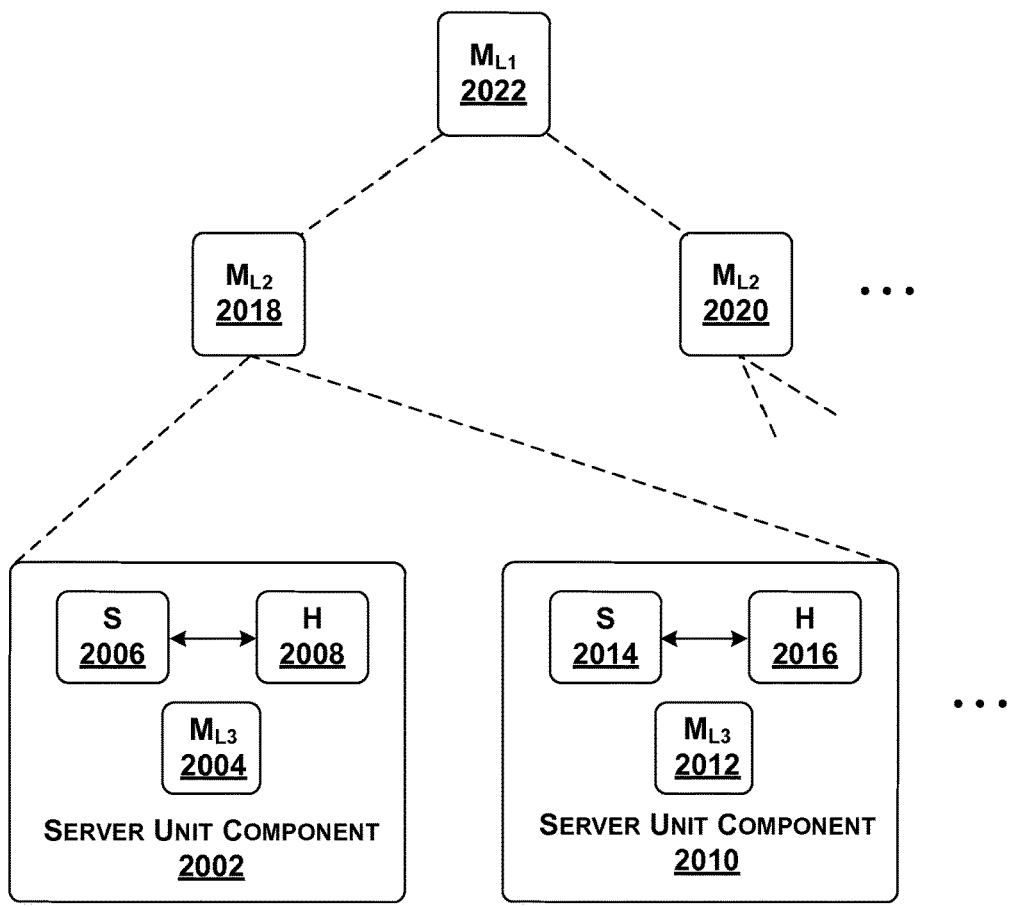
Figure 21:
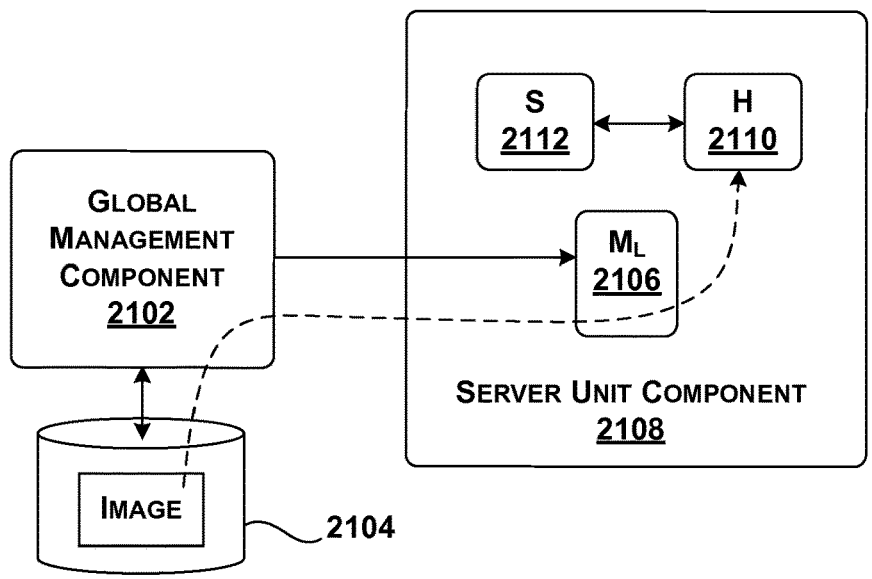
FIGS. 21-24 show different respective strategies for configuring a hardware acceleration component in the data processing system of FIG. 1.

FIG. 20 shows a fourth physical implementation of management functionality 122 of FIG. 10. In this case, management functionality 122 embodies a hierarchical structure of individual management components. For example, in one merely representative structure, each server unit component includes a low-level local management component ($M_{L3}$) (which can be implemented by a local host component, a local acceleration component, some other local component, or some combination thereof).

For example, a server unit component 2002 provides a low-level local management component 2004, along with a local host component 2006 and a local acceleration component 2008. Likewise, a server unit component 2010 provides a low-level local management component 2012, along with a local host component 2014 and an acceleration component 2016.

A next management tier of the structure includes at least a mid-level management component 2018 and a mid-level management component 2020. Each of mid-level management component 2018 and mid-level management component 2020 may be implemented with one or computer processors with memory store instructions, or dedicated logic gate arrays implemented, for example, in an FPGA or on an ASIC, or other similar device. A top level of the structure includes a single global management component 2022 (or multiple redundant such global management components). The illustrated control architecture thus forms a structure having three levels, but the architecture can have any number of levels.

In operation, the low-level management components (2004, 2012, . . . ) handle certain low-level management decisions that directly affect the resources associated with individual server unit components. The mid-level management components (2018, 2020) can make decisions which affect a relevant section of data processing system 102, such as an individual rack or a group of racks. The top-level management component (2022) can make global decisions which broadly apply to the entire data processing system 102.

FIGS. 21-24 show different respective strategies for configuring an acceleration component, corresponding to different ways of implementing configuration component 1014 of FIG. 10. Starting with FIG. 21, a global management component 2102 has access to a data store 2104 that provides one or more configuration images. Each configuration image contains logic that can be used to implement a corresponding service. Global management component 2102 can configure an acceleration component by forwarding a configuration stream (corresponding to a configuration image) to the acceleration component.

For example, in one approach, global management component 2102 can send the configuration stream to a local management component 2106 associated with a particular server unit component 2108. Local management component 2106 can then coordinate the configuration of a local acceleration component 2110 based on the received configuration stream. Alternatively, local host component 2112 can perform the above-described operation, instead of, or in addition to, local management component 2106.

Figure 22:
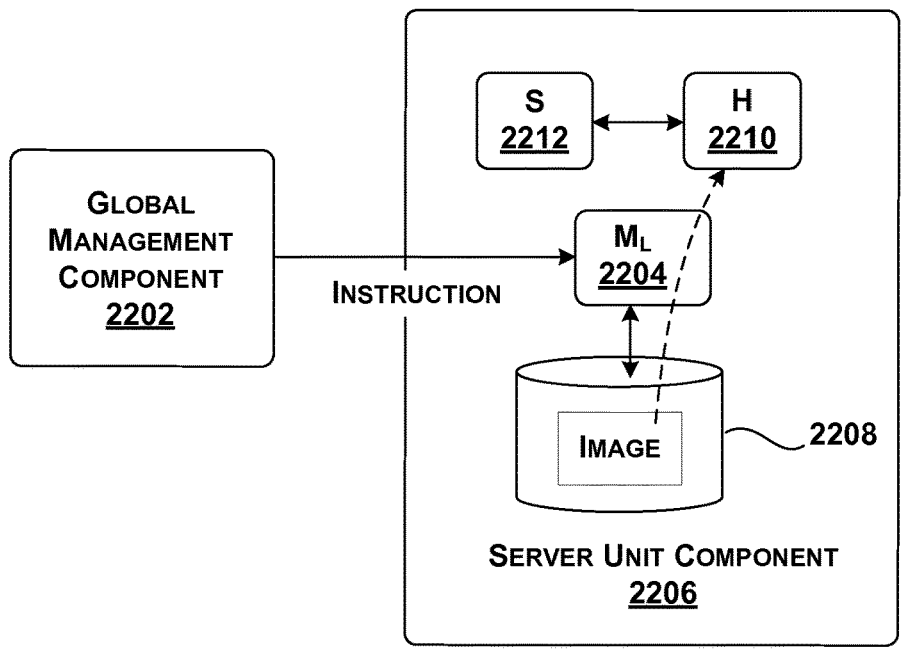

FIG. 22 shows another strategy for configuring an acceleration component. In this case, a global management component 2202 sends an instruction to a local management component 2204 of a server unit component 2206. In response, local management component 2204 accesses a configuration image in a local data store 2208 and then uses it to configure a local acceleration component 2210. Alternatively, a local host component 2212 can perform the above-described operation, instead of, or in addition to, local management component 2204.

Figure 23:
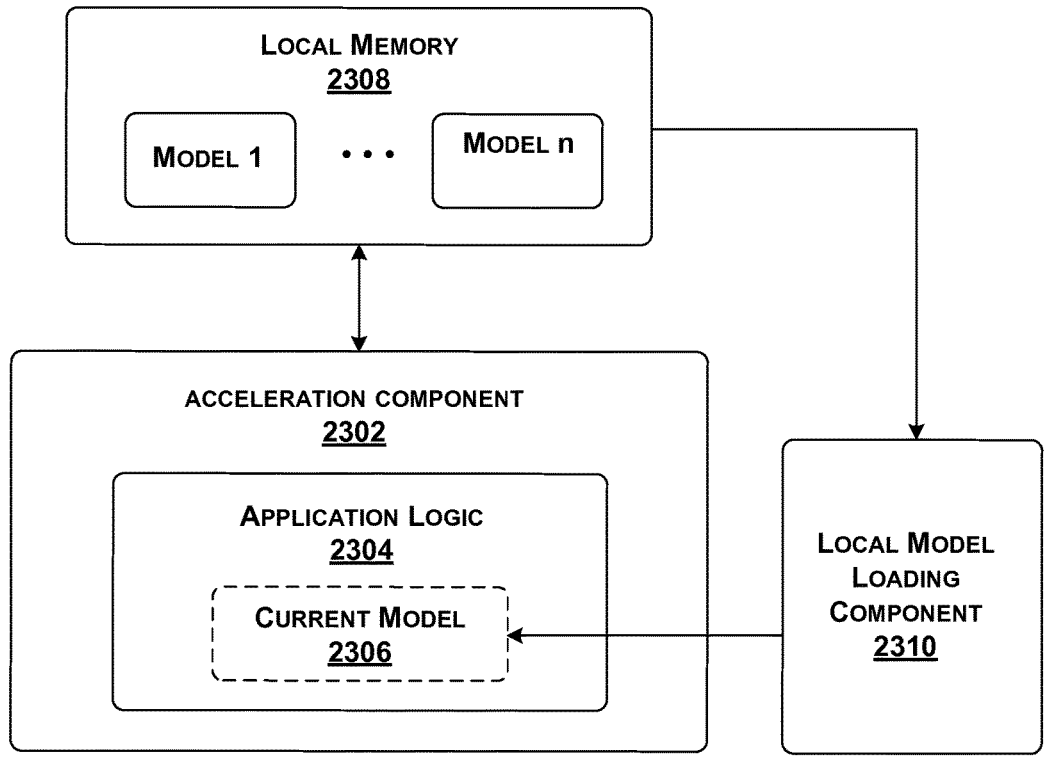

FIG. 23 shows another technique for configuring a local acceleration component 2302. In this approach, assume that acceleration component 2302 includes application logic 2304, which, in turn, is governed by a current model 2306 (where a model corresponds to logic that performs a function in a particular manner). Further assume that acceleration component 2302 has access to local memory 2308. Local memory 2308 stores configuration images associated with one or more other models (model 1, . . . , model n).

When triggered, a local model loading component 2310 can swap out the configuration associated with current model 2306 with the configuration associated with another model in local memory 2308. Model loading component 2310 may be implemented by acceleration component 2302 itself, a local host component, a local management component, etc., or some combination thereof. In one implementation, the configuration operation shown in FIG. 23 can be performed in less time than the overall reconfiguration of application logic 2304 as a whole, as it entails replacing some of the logic used by application logic 2304, not the entire application logic 2304 in wholesale fashion.

Figure 24:
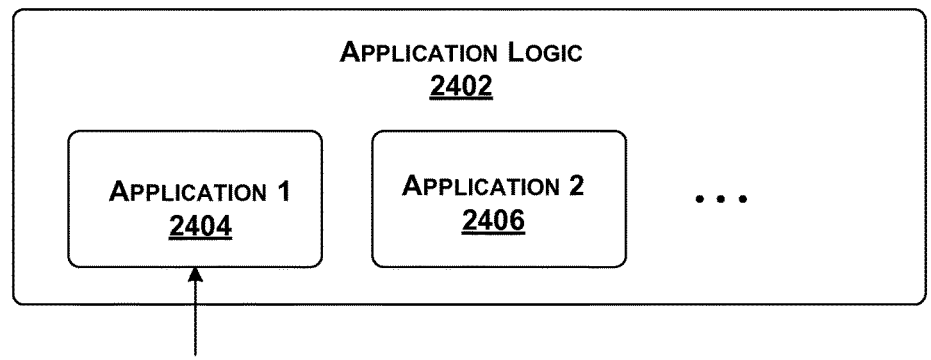

Finally, FIG. 24 shows an acceleration component having application logic 2402 that supports partial configuration. Management functionality 122 can leverage this capability by configuring application 1 (2404) separately from application 2 (2406), and vice versa.

Figure 25:
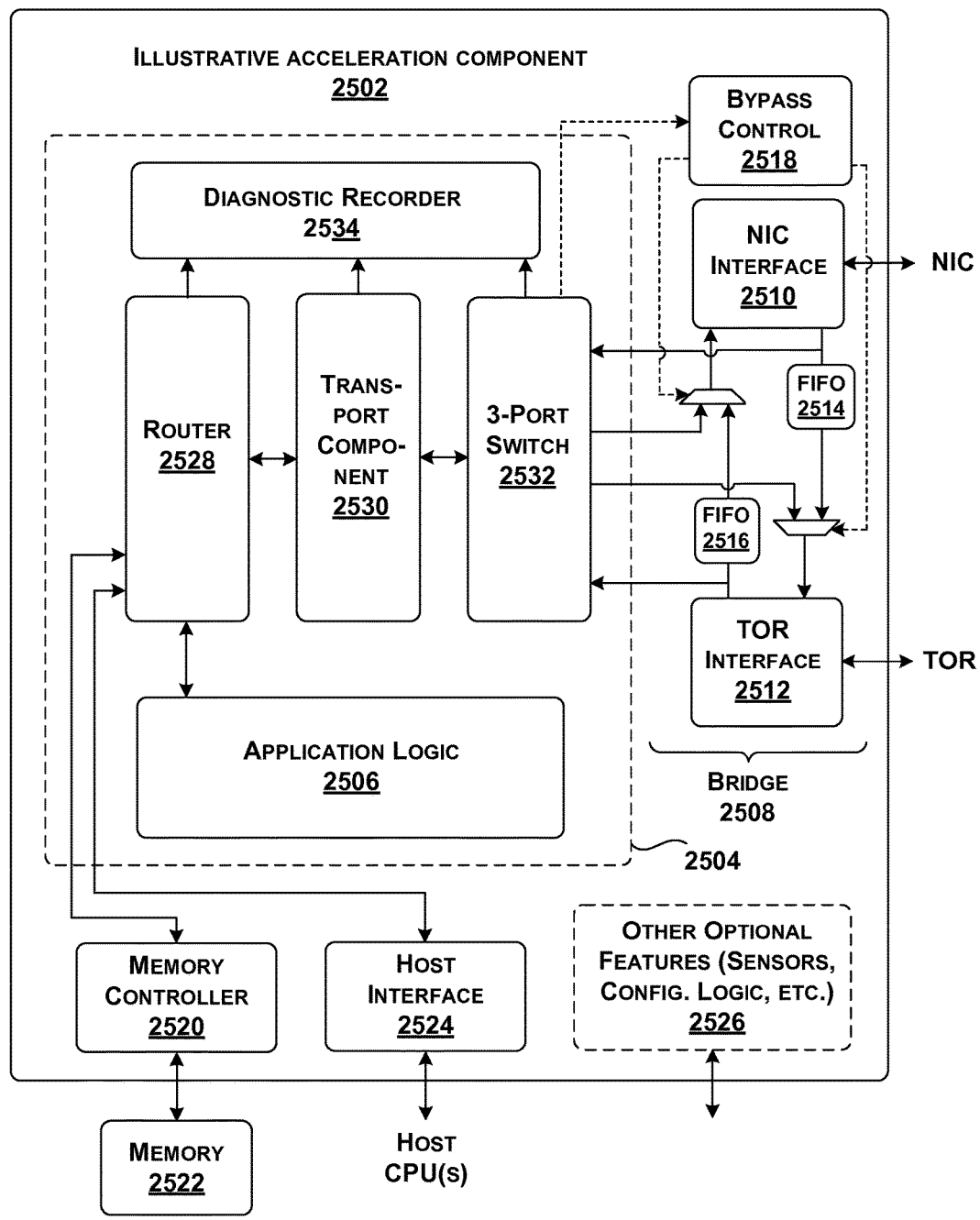
FIG. 25 shows one manner of implementing a hardware acceleration component of FIG. 1.

FIG. 25 shows one manner of implementing an acceleration component 2502 in data processing system 102 of FIG. 1, which may be physically implemented as an FPGA device. Note that the detail presented below is set forth in the spirit of illustration, not limitation. Other data processing systems may use acceleration components having architectures which vary in one or more ways compared to that shown in FIG. 25. Further, other data processing systems may employ a heterogeneous design that includes acceleration components having different types.

From a high-level standpoint, acceleration component 2502 may be implemented as a hierarchy having different layers of functionality. At a lowest level, acceleration component 2502 provides an "outer shell" which provides basic interface-related components that generally remain the same across most application scenarios. A core component 2504, which lies inside the outer shell, may include an "inner shell" and application logic 2506. The inner shell corresponds to all the resources in core component 2504 other than application logic 2506, and represents a second level of resources that remain the same within a certain set of application scenarios. Application logic 2506 itself represents a highest level of resources which are most readily subject to change. Note however that any component of acceleration component 2502 can technically be reconfigured.

In operation, application logic 2506 interacts with the outer shell resources and inner shell resources in a manner analogous to the way a software-implemented application interacts with its underlying operating system resources. From an application development standpoint, the use of common outer shell resources and inner shell resources frees a developer from having to recreate these common components for each application that he or she creates. This strategy also reduces the risk that a developer may alter core inner or outer shell functions in a manner that causes problems within data processing system 102 as a whole.

Referring to the outer shell, acceleration component 2502 includes a bridge 2508 for coupling acceleration component 2502 to a network interface controller (via a NIC interface 2510) and a local top-of-rack switch (via a TOR interface 2512).

Bridge 2508 supports two modes. In a first node, bridge 2508 provides a data path that allows traffic from the NIC or TOR to flow into acceleration component 2502, and traffic from acceleration component 2502 to flow out to the NIC or TOR. Acceleration component 2502 can perform any processing on the traffic that it "intercepts," such as compression, encryption, etc. In a second mode, bridge 2508 supports a data path that allows traffic to flow between the NIC and the TOR without being further processed by acceleration component 2502. Internally, bridge 2508 may be composed of various FIFOs (2514, 2516) which buffer received packets, and various selectors and arbitration logic which route packets to their desired destinations. A bypass control component 2518 controls whether bridge 2508 operates in the first mode or the second mode.

A memory controller 2520 governs interaction between acceleration component 2502 and local memory 2522 (such as DRAM memory). Memory controller 2520 may perform error correction as part of its services.

A host interface 2524 provides functionality that enables acceleration component 2502 to interact with a local host component (not shown in FIG. 25). In one implementation, host interface 2524 may use Peripheral Component Interconnect Express (PCIe), in conjunction with direct memory access (DMA), to exchange information with the local host component.

Finally, the shell also may include various other features 2526, such as clock signal generators, status LEDs, error correction functionality, and so on.

In one implementation, the inner shell may include a router 2528 for routing messages between various internal components of acceleration component 2502, and between acceleration component 2502 and external entities (via a transport component 2530). Transport component 2530 may be implemented with one or computer processors with memory store instructions, or dedicated logic gate arrays implemented, for example, in an FPGA or on an ASIC, or other similar device. Each such endpoint is associated with a respective port. For example, router 2528 is coupled to memory controller 2520, host interface 2524, application logic 2506, and transport component 2530.

Transport component 2530 formulates packets for transmission to remote entities (such as remote acceleration components), and receives packets from remote acceleration components (such as remote acceleration components).

A 3-port switch 2532, when activated, takes over the function of bridge 2508 by routing packets between the NIC and TOR, and between the NIC or TOR and a local port associated with acceleration component 2502.

Finally, an optional diagnostic recorder 2534 stores transaction information regarding operations performed by router 2528, transport component 2530, and 3-port switch 2532 in a circular buffer. For example, the transaction information may include data about a packet's origin and destination IP addresses, host-specific data, timestamps, etc. A technician may study a log of the transaction information in an attempt to diagnose causes of failure or sub-optimal performance in acceleration component 2502.

Figure 26:
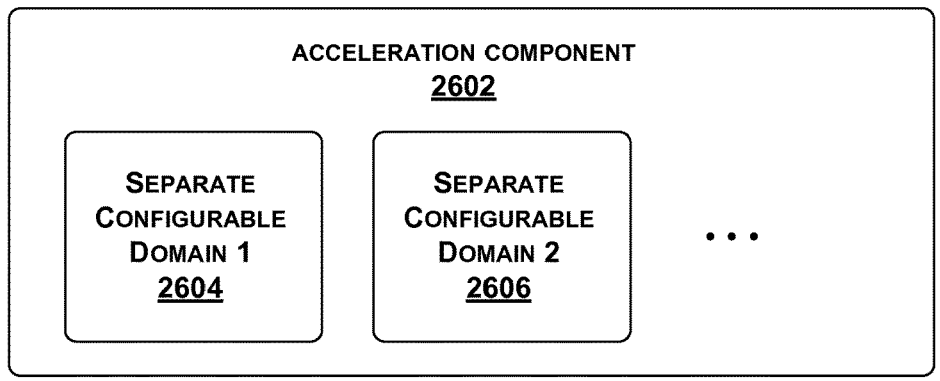
FIG. 26 shows a hardware acceleration component including separate configurable domains.

FIG. 26 shows an acceleration component 2602 that includes separate configurable domains (2604, 2606, . . . ). A configuration component (e.g., configuration component 1014 of FIG. 10) can configure each configurable domain without affecting other configurable domains. Hence, the configuration component can configure one or more configurable domains while the other configurable domains are executing operations based on their respective configurations, which are not disturbed.

In some implementations, data processing system 102 of FIG. 1 may dynamically reconfigure its acceleration components to address any mapping considerations. That reconfiguration can be performed on a partial and/or whole-service basis, and may be performed on a periodic and/or event-driven basis. Indeed, in some cases, data processing system 102 may appear to be continually in the process of adapting itself to changing conditions in data processing system 102 by reconfiguring its acceleration logic.

Figure 27:
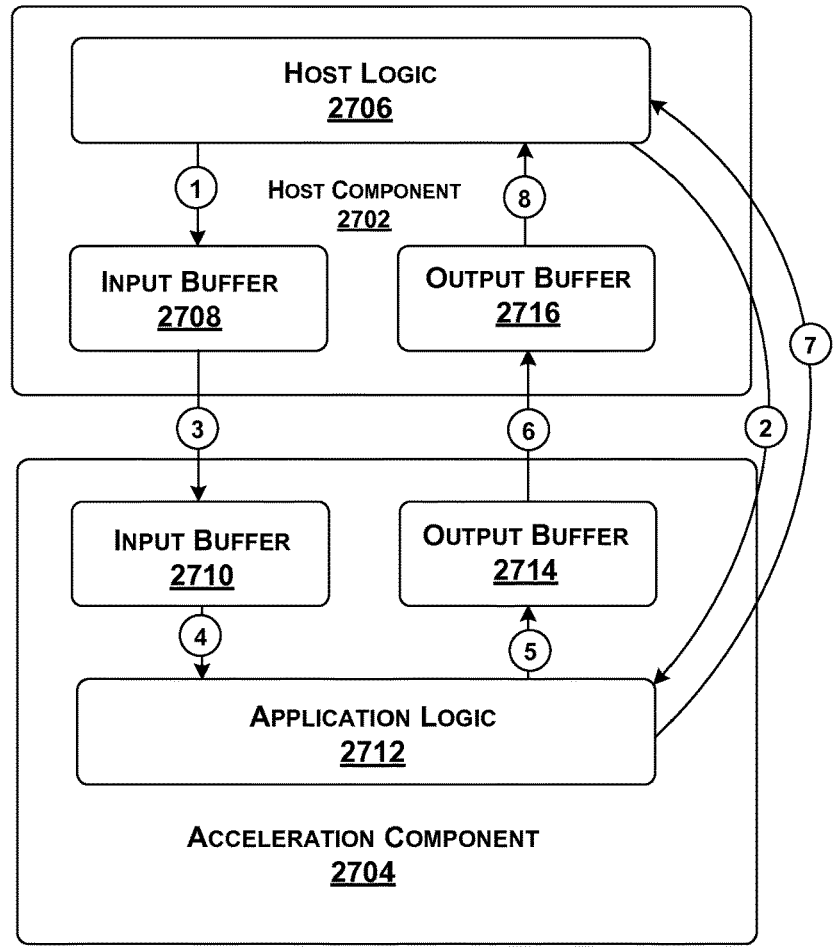
FIG. 27 shows functionality for performing data transfer between a local host component and an associated local hardware acceleration component.

FIG. 27 shows functionality by which a local host component 2702 may forward information to its local acceleration component 2704 via host interface 2524 shown in FIG. 25 (e.g., using PCIe in conjunction with DMA memory transfer). In one non-limiting protocol, in operation (1), host logic 2706 places data to be processed into a kernel-pinned input buffer 2708 in main memory associated with host logic 2706. In operation (2), host logic 2706 instructs acceleration component 2704 to retrieve the data and begin processing it. The host logic's thread is then either put to sleep until it receives a notification event from acceleration component 2704, or it continues processing other data asynchronously. In operation (3), acceleration component 2704 transfers the data from the host logic's memory and places it in an acceleration component input buffer 2710.

In operations (4) and (5), application logic 2712 retrieves the data from input buffer 2710, processes it to generate an output result, and places the output result in an output buffer 2714. In operation (6), acceleration component 2704 copies the contents of output buffer 2714 into an output buffer in the host logic's memory. In operation (7), the acceleration component notifies host logic 2706 that the data are ready for host logic 2706 to retrieve. In operation (8), the host logic thread wakes up and consumes the data in output buffer 2716. Host logic 2706 may then discard the contents of output buffer 2716, which allows acceleration component 2704 to reuse output buffer 2716 in the next transaction.

Figure 28:
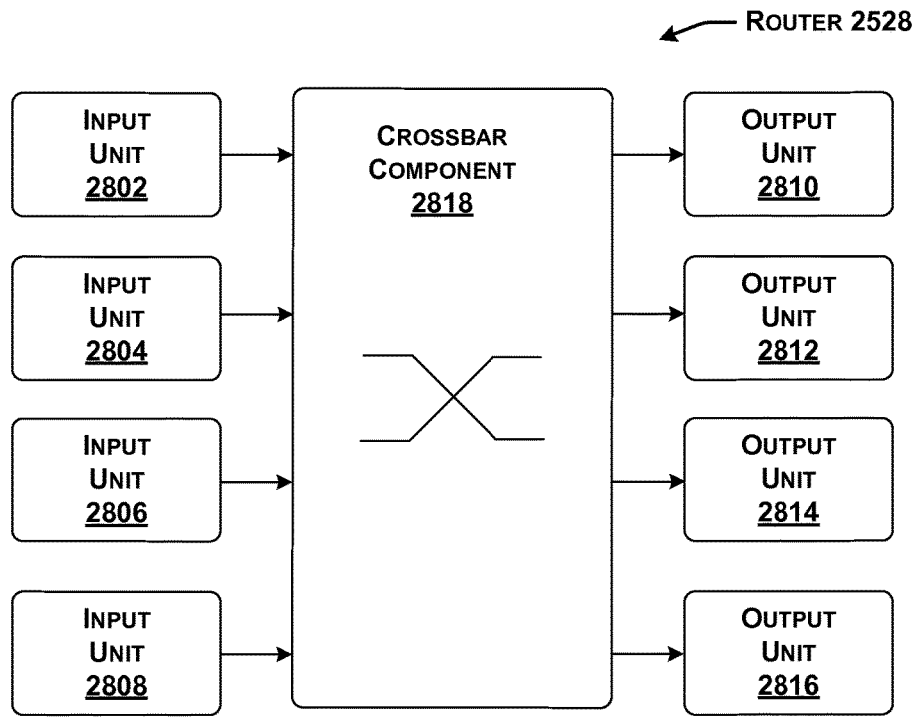
FIG. 28 shows one implementation of a router introduced in FIG. 25.

FIG. 28 shows one implementation of router 2528 introduced in FIG. 25. The router includes any number of input units (here four, 2802, 2804, 2806, 2808) for receiving messages from respective ports, and output units (here four, 2810, 2812, 2814, 2814) for forwarding messages to respective ports. As described above, the endpoints associated with the ports include memory controller 2520, host interface 2524, application logic 2506, and transport component 2530. A crossbar component 2818 forwards a message from an input port to an output port based on address information associated with the message. More specifically, a message is composed of multiple "flits," and router 2528 sends messages on a flit-by-flit basis. Crossbar component 2818 may be implemented with one or computer processors with memory store instructions, or dedicated logic gate arrays implemented, for example, in an FPGA or on an ASIC, or other similar device.

In one non-limiting implementation, router 2528 supports a number of virtual channels (such as eight) for transmitting different classes of traffic over a same physical link. That is, router 2528 may support multiple traffic classes for those scenarios in which multiple services are implemented by application logic 2506, and those services need to communicate on separate classes of traffic.

Router 2528 may govern access to the router's resources (e.g., its available buffer space) using a credit-based flow technique. In that technique, the input units (2802-2808) provide upstream entities with credits, which correspond to the exact number of flits available in their buffers. The credits grant the upstream entities the right to transmit their data to the input units (2802-2808). More specifically, in one implementation, router 2528 supports "elastic" input buffers that can be shared among multiple virtual channels. The output units (2810-2816) are responsible for tracking available credits in their downstream receivers, and provide grants to any input units (2802-2808) that are requesting to send a flit to a given output port.

Figure 29:
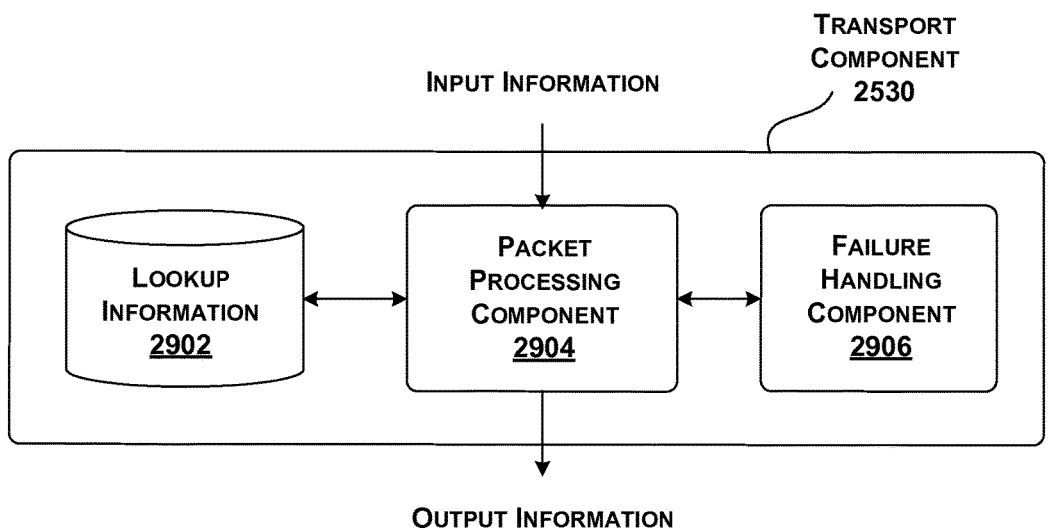
FIG. 29 shows one implementation of a transport component introduced in FIG. 25.

FIG. 29 shows one implementation of transport component 2530 introduced in FIG. 25. Transport component 2530 may provide a register interface to establish connections between nodes. That is, each such connection is one-way and links a send queue on a source component to a receive queue on a destination component. A software process may set up the connections by statically allocating them before transport component 2530 can transmit or receive data. A data store 2902 stores two tables that control the state of connections, a Send Connection Table and a Receive Connection Table.

A packet processing component 2904 processes messages arriving from router 2528 which are destined for a remote endpoint (e.g., another acceleration component). Packet processing component 2904 does so by buffering and packetizing the messages. Packet processing component 2904 also processes packets that are received from some remote endpoint and are destined for router 2528. Packet processing component 2904 may be implemented with one or computer processors with memory store instructions, or dedicated logic gate arrays implemented, for example, in an FPGA or on an ASIC, or other similar device.

For messages arriving from router 2528, packet processing component 2904 matches each message request to a Send Connection Table entry in the Send Connection Table, e.g., using header information and virtual channel (VC) information associated with the message as a lookup item, as provided by router 2528. Packet processing component 2904 uses the information retrieved from the Send Connection Table entry (such as a sequence number, address information, etc.) to construct packets that it sends out to the remote entity.

More specifically, in one non-limiting approach, packet processing component 2904 encapsulates packets in UDP/IP Ethernet frames, and sends them to a remote acceleration component. In one implementation the packets may include an Ethernet header, followed by an IPv4 header, followed by a UDP header, followed by transport header (specifically associated with transport component 2530), followed by a payload.

For packets arriving from the network (e.g., as received on a local port of S-port switch 2532), packet processing component 2904 matches each packet to a Receive Connectable Table entry provided in the packet header. If there is a match, the packet processing component retrieves a virtual channel field of the entry, and uses that information to forward the received message to router 2528 (in accordance with the credit-flow technique used by router 2528).

A failure handling component 2906 buffers all sent packets until it receives an acknowledgement (ACK) from the receiving node (e.g., the remote acceleration component). If an ACK for a connection does not arrive within a specified time-out period, failure handling component 2906 can retransmit the packet. Failure handling component 2906 will repeat such retransmission for a prescribed number times (e.g., 128 times). If the packet remains unacknowledged after all such attempts, failure handling component 2906 can discard it and free its buffer. Failure handling component 2906 may be implemented with one or computer processors with memory store instructions, or dedicated logic gate arrays implemented, for example, in an FPGA or on an ASIC, or other similar device.

Figure 30:
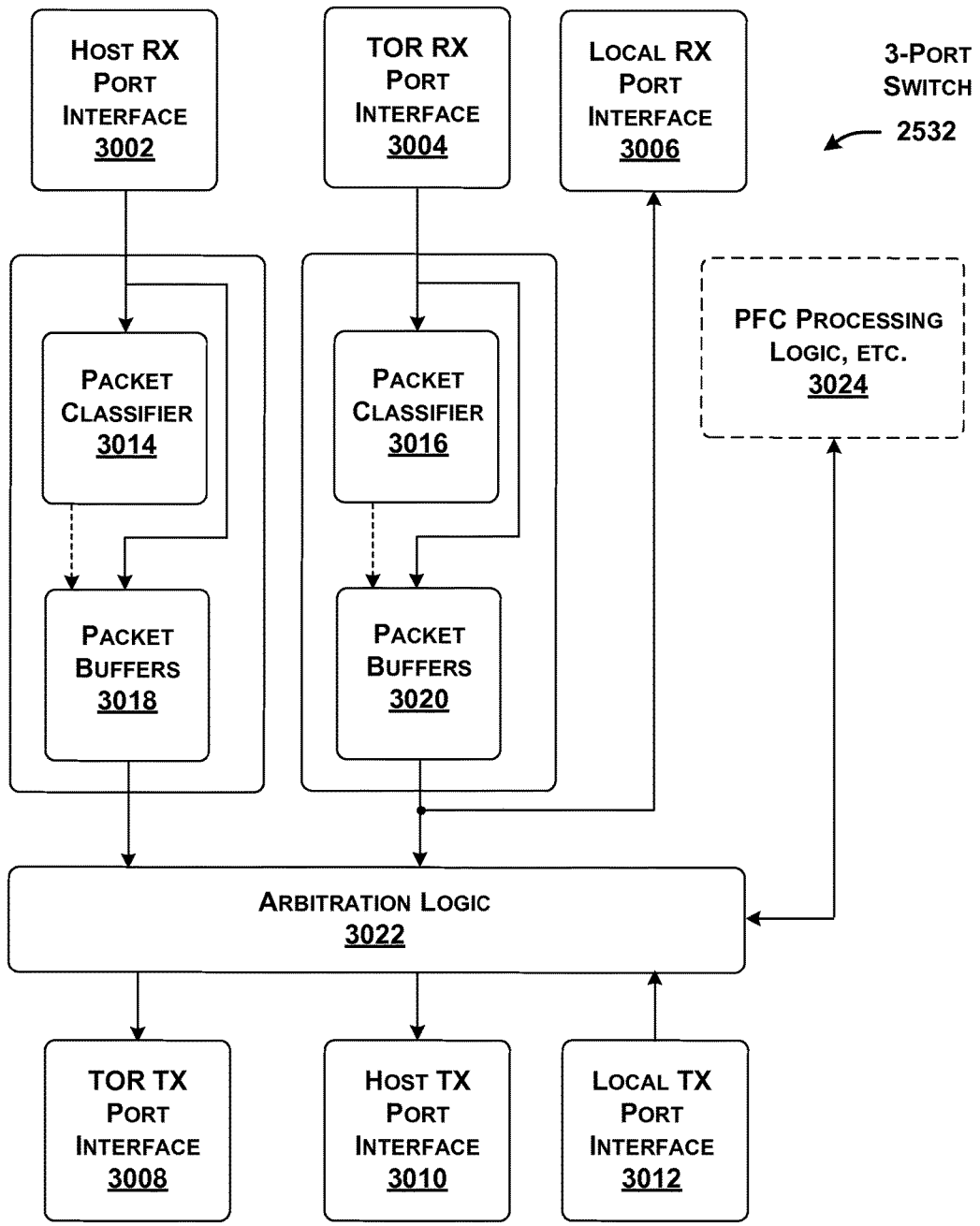
FIG. 30 shows one implementation of a 3-port switch introduced in FIG. 25.

FIG. 30 shows one implementation of 3-port switch 2532. 3-port switch 2532 operates to safely insert (and remove) acceleration component-generated network packets onto a data center network without compromising host-to-TOR network traffic.

3-port switch 2532 connects to NIC interface 2510 (corresponding to a host interface), TOR interface 2512, and a local interface associated with local acceleration component 2502 itself 3-port switch 2532 may be conceptualized as including receiving interfaces (3002, 3004, 3006) for respectively receiving packets from the host component, TOR switch, and for receiving packets at the local acceleration component. 3-port switch 2532 also includes transmitting interfaces (3008, 3010, 3012) for respectively providing packets to the TOR switch, and host component, and receiving packets transmitted by the local acceleration component.

Packet classifiers (3014, 3016) determine the class of packets received from the host component or the TOR switch, e.g., based on status information specified by the packets. In one implementation, each packet is either classified as belonging to a lossless flow (e.g., remote direct memory access (RDMA) traffic) or a lossy flow (e.g., transmission control protocol/Internet Protocol (TCP/IP) traffic). Traffic that belongs to a lossless flow is intolerant to packet loss, while traffic that belongs to a lossy flow can tolerate some packet loss.

Packet buffers (3018, 3020) store the incoming packets in different respective buffers, depending on the class of traffic to which they pertain. If there is no space available in the buffer, the packet will be dropped. In one implementation, 3-port switch 2532 does not provide packet buffering for packets provided by the local acceleration component (via the local port) because application logic 2506 can regulate the flow of packets through the use of "back pressuring." Arbitration logic 3022 selects among the available packets and transmits the selected packets.

As described above, traffic that is destined for the local acceleration component is encapsulated in UDP/IP packets on a fixed port number. 3-port switch 2532 inspects incoming packets (e.g., as received from the TOR) to determine if they are UDP packets on the correct port number. If so, 3-port switch 2532 outputs the packet on local RX port interface 3006. In one implementation, all traffic arriving on local TX port interface 3012 is sent out of the TOR TX port interface 3008, but it could also be sent to host TX port interface 3010. Further note that FIG. 30 indicates that acceleration component 2502 intercepts traffic from the TOR, but not from the host component; but it could be configured to intercept traffic from the host component as well.

PFC processing logic 3024 allows 3-port switch 2532 to insert Priority Flow Control frames into either the flow of traffic transmitted to the TOR or host component. That is, for lossless traffic classes, if a packet buffer fills up, PFC processing logic 3024 sends a PFC message to the link partner, requesting that traffic on that class be paused. If a PFC control frame is received for a lossless traffic class on either host RX port interface 3002 or TOR RX port interface 3004, 3-port switch 2532 will cease sending packets on the port that received the control message.

Figure 31:
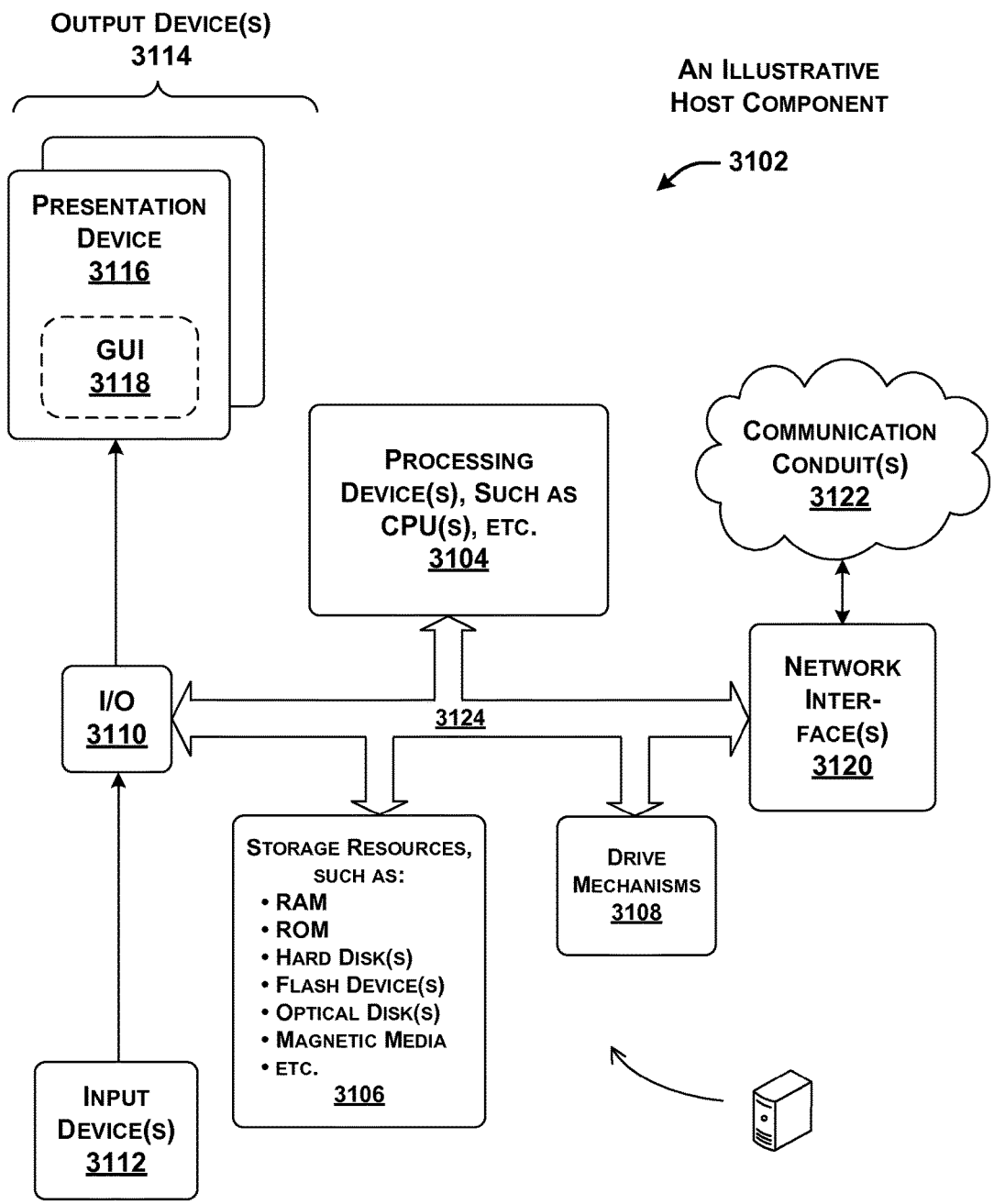
FIG. 31 shows one implementation of a host component shown in FIG. 1.

FIG. 31 shows one implementation of a host component 3102, corresponding to any of the host components (S) shown in FIG. 1. Host component 3102 can include one or more processing devices 3104, such as one or more central processing units (CPUs), each of which may implement one or more hardware threads. Host component 3102 also can include any storage resources 3106 for storing any kind of information, such as code, settings, data, etc. Without limitation, for instance, storage resources 3106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of host component 3102.

In one case, host component 3102 may perform any of the operations associated with local tenant functionality when processing devices 3104 carry out associated instructions stored in any storage resource or combination of storage resources. Host component 3102 also includes one or more drive mechanisms 3108 for interacting with any storage resource, such as a hard disk drive mechanism, an optical disk drive mechanism, and so on.

Host component 3102 also includes an input/output module 3110 for receiving various inputs (via input devices 3112), and for providing various outputs (via output devices 3114). One particular output mechanism may include a presentation device 3116 and an associated graphical user interface (GUI) 3118. Host component 3102 also can include one or more network interfaces 3120 for exchanging data with other devices via one or more communication conduits 3122. One or more communication buses 3124 communicatively couple the above-described components together.

Communication conduit(s) 3122 can be implemented in any manner, e.g., by a local area network, a wide area network (e.g., the Internet), point-to-point connections, etc., or any combination thereof. Communication conduit(s) 3122 can include any combination of hardwired links, wireless links, routers, gateway functionality, name servers, etc., governed by any protocol or combination of protocols.

Figure 32:
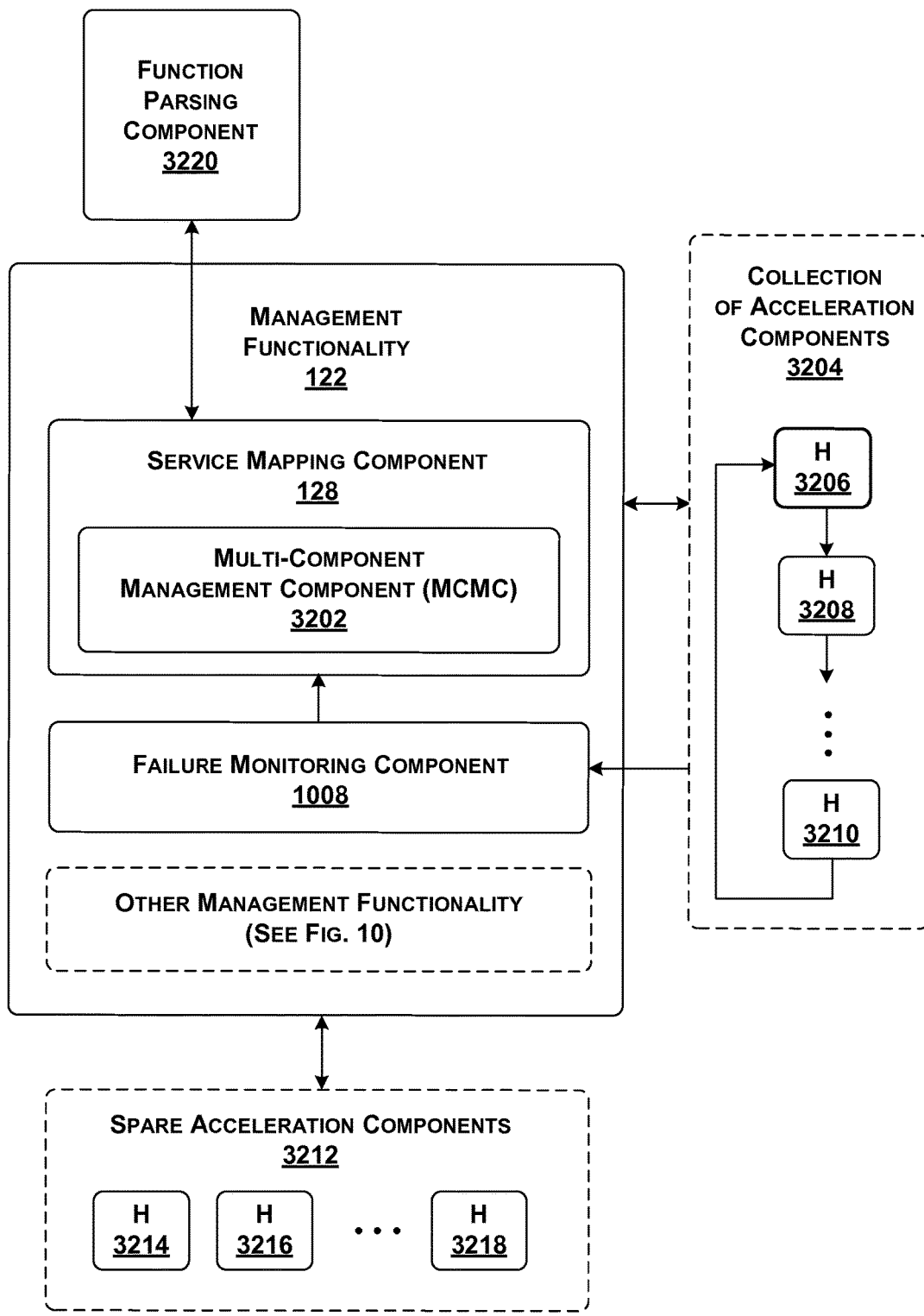
FIG. 32 provides an overview of functionality for generating and applying a multi-component service; that functionality, in turn, includes a multi-component management component.

FIG. 32 provides an overview of functionality for generating and applying a multi-component service. SMC 128 includes a multi-component management component (MCMC) 3202. MCMC 3202 interacts with configuration component 1014 (of FIG. 10) to configure a collection (cluster) of acceleration components. Thereafter, MCMC 3202 manages the collection. MCMC 3202 also stores information regarding the connection between the acceleration components in the collection. For example, for each member of the collection, MCMC 3202 can store its upstream component(s) (if any) and its downstream component(s) (if any).

FIG. 32 also shows one illustrative collection 3204 of acceleration components (3206, 3208, . . . , 3210) that perform a multi-component service. That particular collection 3204 of acceleration components (3206, 3208, . . . , 3210) is structured as a ring. But other collections may exhibit other flow structures. Within collection 3204, an acceleration component 3206 represents the head component of the multi-component service.

MCMC 3202 also receives failure reports from failure monitoring component 1016, introduced above in the context of FIG. 10. The failure reports indicate whether a link between two acceleration components has failed, e.g., which may manifest itself in the inability to exchange messages over the link. If a failure is confirmed, MCMC 3202 may heal the multi-component service by swapping out one or more failed acceleration components with suitably configured spare acceleration components. To perform this task, MCMC 3202 may draw from a pool of spare acceleration components 3212, e.g., including acceleration components (3214, 3216, . . . , 3218). For example, assume that acceleration component 3208 in collection 3204 fails, which performs a particular part of the multi-component service. MCMC 3202 can replace this component 3208 with another component from the pool that is already configured to perform the same function. Alternatively, MCMC 3202 can interact with configuration component 1014 to configure a spare component in a dynamic manner just prior to its assignment to collection 3204. MCMC 3202 stores information regarding spare components 3212 that are available at any given time, e.g., as part of the availability information in data store 1002.

A function parsing component 3220 may parse a function into multiple parts to create the multi-component service. Function parsing component 3220 may then forward instructions to MCMC 3202 which describe the manner in which the function has been parsed. MCMC 3202 uses these instructions to configure the acceleration components (3206, 3208, . . . , 3210) in the multi-component service. Function parsing component 3220 may be implemented with one or computer processors with memory store instructions, or dedicated logic gate arrays implemented, for example, in an FPGA or on an ASIC, or other similar device.

Figure 33:
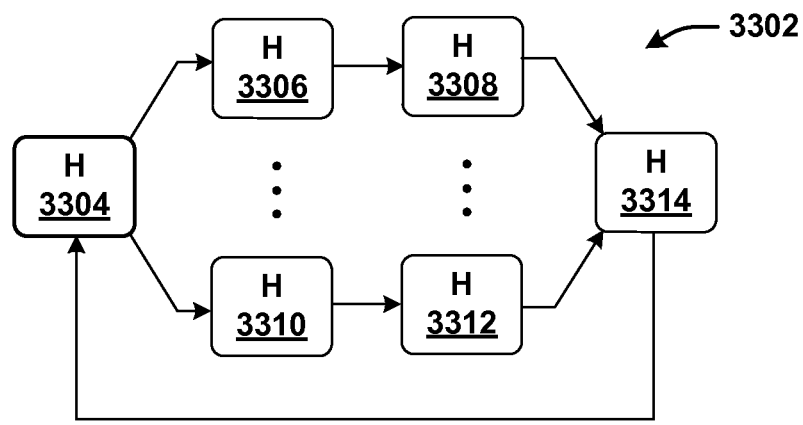
FIG. 33 shows one type of collection of hardware acceleration components that may be produced and applied by the functionality of FIG. 32.

FIG. 33 shows another simplified collection 3302 of acceleration components (3304-3314) that may be created and applied using the functionality of FIG. 32. Collection 3302 includes a head component 3304 that branches out to two parallel paths, including a first path made up of acceleration components 3306 and 3308, and a second path made up of acceleration components 3310 and 3312 (although the branches can have any number of components).

Figure 34:
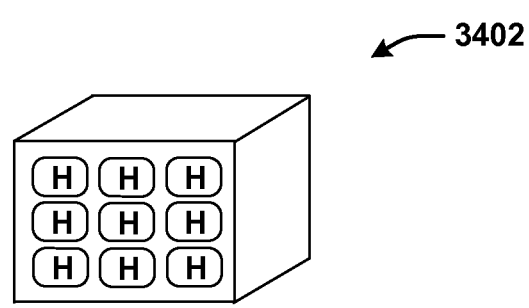
FIG. 34 shows another type of collection of hardware acceleration components that may be produced and applied by the functionality of FIG. 32.

FIG. 34 shows another type of collection 3402 of acceleration components that may be produced and applied by the functionality of FIG. 32. Here, the figure generally shows that the acceleration components can be arranged to form a three-dimensional flow structure.

More generally, in some cases, a multi-component service may be based on a graph structure which defines a fixed interconnection among its acceleration components. That type of multi-component service will use the same set of acceleration components whenever it is called, and pass information among those components in the fixed manner defined by its graph structure. In yet other cases, a multi-component service may dynamically vary its graph structure at runtime based on one or more factors. In doing so, the multi-component service may use different acceleration components for different invocations, and/or may employ different flows among acceleration components for different invocations.

For example, consider a multi-component service that performs image recognition. The multi-component service may invoke a first collection of acceleration components for processing a first type of input data. The multi-component service may invoke a second collection of acceleration components for processing a second type of input data. Alternatively, or in addition, the multi-component service may dynamically invoke different acceleration components and/or flows based on real-time performance conditions, such as experienced congestion of an acceleration component and/or a link.

Figure 35:
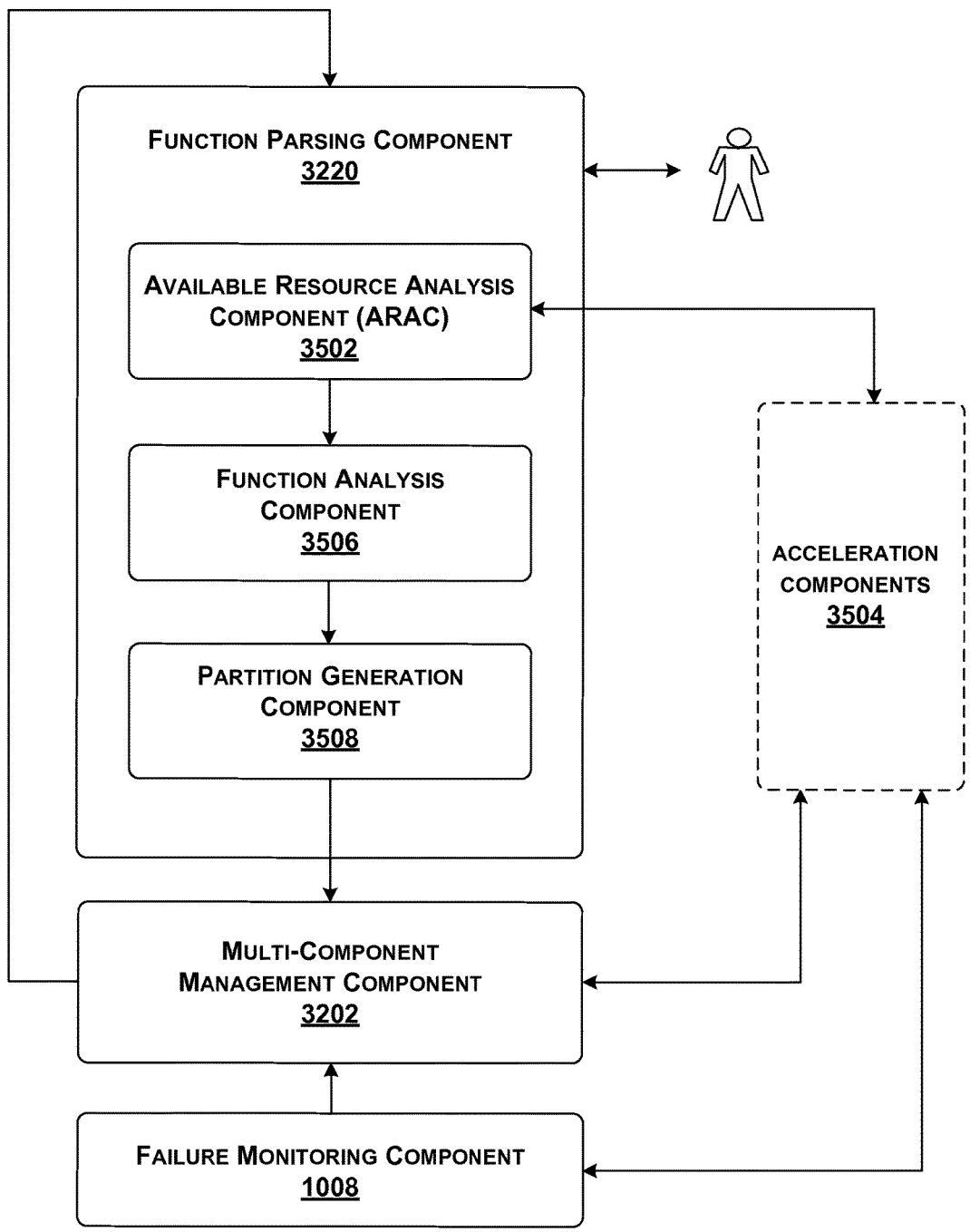
FIG. 35 shows one implementation of a function parsing component that produces a multi-component service.

FIG. 35 shows an illustrative implementation of function parsing component 3220 of FIG. 32, introduced above. Function parsing component 3220 can include an available resource analysis component (ARAC) 3502 for determining the capabilities of acceleration components 3504 that are available for use in constructing a multi-component service. For example, ARAC 3502 can query the availability information in data store 1002 (of FIG. 10) to determine a number of acceleration components that are available, the total processing capacity of each acceleration component, and the amount (and type(s)) of processing capacity in each acceleration component that is currently available for use in implementing a part of a multi-component service.

A function analysis component 3506 can investigate the function itself that is to be partitioned into multiple parts. Function analysis component 3506 can perform this operation in different ways depending on the nature of the function. Consider a function that involves repeating the same basic operation a relatively large number of times. Function analysis component 3506 can determine a total number of times that the operation is performed and the computational load associated with each iteration of the operation. Function analysis component 3506 may be implemented with one or computer processors with memory store instructions, or dedicated logic gate arrays implemented, for example, in an FPGA or on an ASIC, or other similar device.

Function analysis component 3506 also can identify natural transitions within the flow of a function. For example, a function may be characterized by multiple stages, and those stages may map to respective parts of a multi-component service, with transitions in between the parts. In addition, or alternatively, a function may invoke a collection of subroutines, and those subroutines may map to respective parts of a multi-component service, with transitions to and from the subroutines.

More generally, a function may include programmatic calls of any type, e.g., where one code module calls on another code module. Function parsing component 3220 can consider those calls as natural points at which to divide a function, effectively replacing internal programmatic calls with calls from one acceleration component to the next. Further, when the function has multiple parts or stages, functionality analysis component 3506 also can determine the amount of processing work associated with each part.

A partition generation component 3508 uses the results of ARAC 3502 and function analysis component 3506 to generate an allocation of the function into multiple parts to be allocated to respective allocation components. For example, consider the case in which function analysis component 3506 has determined that a function involves repeating a particular task a certain number of times (such as by performing ten million iterations of the Monte Carlo simulation algorithm). Partition generation component 3508 can divvy the entire number of tasks into appropriately sized chunks for allocation to individual acceleration components that are available. More specifically, partition generating component 3508 can choose a number of acceleration components that is sufficient to perform the total number of tasks, and then allocate appropriate portions to each such acceleration component depending on the particular available capacity of each acceleration component. Partition generation component 3508 also can leverage the natural transition information identified by function analysis component 3506 in selecting specific partition points, e.g., such that an internal programmatic cell is repurposed as a call from once acceleration component to another. Partition generation component 3508 may be implemented with one or computer processors with memory store instructions, or dedicated logic gate arrays implemented, for example, in an FPGA or on an ASIC, or other similar device.

In other cases, function parsing component 3220 can identify a finite number of possibly ways of partitioning a function into multiple parts, and can identify the resultant characteristics of each option that impact its overall desirability (e.g., in terms of speed of computation, cost, power consumption, thermal profile, and/or any other factors). Function parsing component 3220 can then choose the most favorable partitioning option. For example, function parsing component 3220 can assign a score to each option that reflects a weighted combination of its characteristic features, and then choose the option with the most favorable score. The weights may be chosen based on environment-specific considerations. In other cases, function parsing component 3220 can apply known search algorithms (such as best-first) to find a suitable solution within a space of options.

In another scenario, assume that the function has multiple stages that function parsing component 3220 maps to different acceleration components. But assume that one stage is more labor intensive than the others. To avoid a bottleneck in processing associated with this stage, function parsing component 3220 can allocate two or more acceleration components that operate in parallel for this stage.

Function parsing component 3220 can be applied in different use contexts. In one use context, function parsing component 3220 provides a tool with which a developer may interact to manually explore different partition options.

In another use context, function parsing component 3220 operates in at least a partially automated manner. For instance, assume that data processing system 102 provides at least one multi-component service. Further assume that, at any given time, the multi-component service employs a collection of acceleration components that is structured on the basis of a current partitioning strategy. Upon a triggering event, data processing system 102 can dynamically invoke function parsing component 3220 to determine whether a the current partitioning strategy continues to be appropriate in view of prevailing conditions in data processing system 102. For example, function parsing component 3220 can perform this operation on a periodic basis and/or on an event-driven basis in the course of the operation of data processing system 102. If the strategy is no longer appropriate, function parsing component 3220 dynamically updates the allocation of parts associated with the multi-component service, and then deploys the resultant new multi-component service.

A previously-chosen partitioning strategy may no longer be appropriate for one or more reasons. For example, data processing system 102 may contain a different set of available resources than originally encountered, which may warrant a repartitioning of the multi-component service. In addition, or alternatively, data processing system 102 may encounter real-time performance constraints that may differ upon each invocation of the multi-component service.

In addition, or alternatively, the nature of the task to be performed itself may change based on various factors. For example, as noted above, the multi-component service may have different processing requirements depending on the nature of the input information that is fed to it, and/or the nature of the customer's requirements, and so on.

To cite a particular scenario, assume that the multi-component service corresponds to an iterative algorithm that invokes a different number of repetitive tasks depending on the nature of the input data that are fed to it and/or based on a confidence metric specified by a consumer. To address this scenario, function parsing component 3220 can dynamically reparation the algorithm based on the real-time data processing needs that function parsing component 3220 encounters when processing a data set. For example, consider the type of collection 3302 shown in FIG. 33. Function parsing component 3220 may dynamically reduce or increase the number of branches in collection 3302 in response to the real-time processing needs that function parsing component 3220 encounters to respectively decrease or increase its processing capacity.

In one case, function parsing component 3220 corresponds to a program that runs on one or more software-driven computing devices, e.g., one of the host components shown in FIG. 1, or a dedicated computer server. Alternatively, or in addition, an acceleration component (or components) can implement some aspects of function parsing component 3220, even without assistance from software plane 104. For example, an acceleration component can automatically detect congestion in its local processing, or in the processing of other acceleration components in the collection.

For instance, the acceleration component may determine that it has failed to produce its output result within a specified amount of time, for whatever reason(s). In response, the acceleration component can automatically generate duplicate versions of itself, which thereupon operate in parallel to alleviate the congestion. For example, once again with reference to FIG. 33, an acceleration component can automatically increase of decrease the number of parallel branches or single nodes upon detecting that the processing in one or more branches or nodes is becoming congested or otherwise underperforming.

Figure 36:
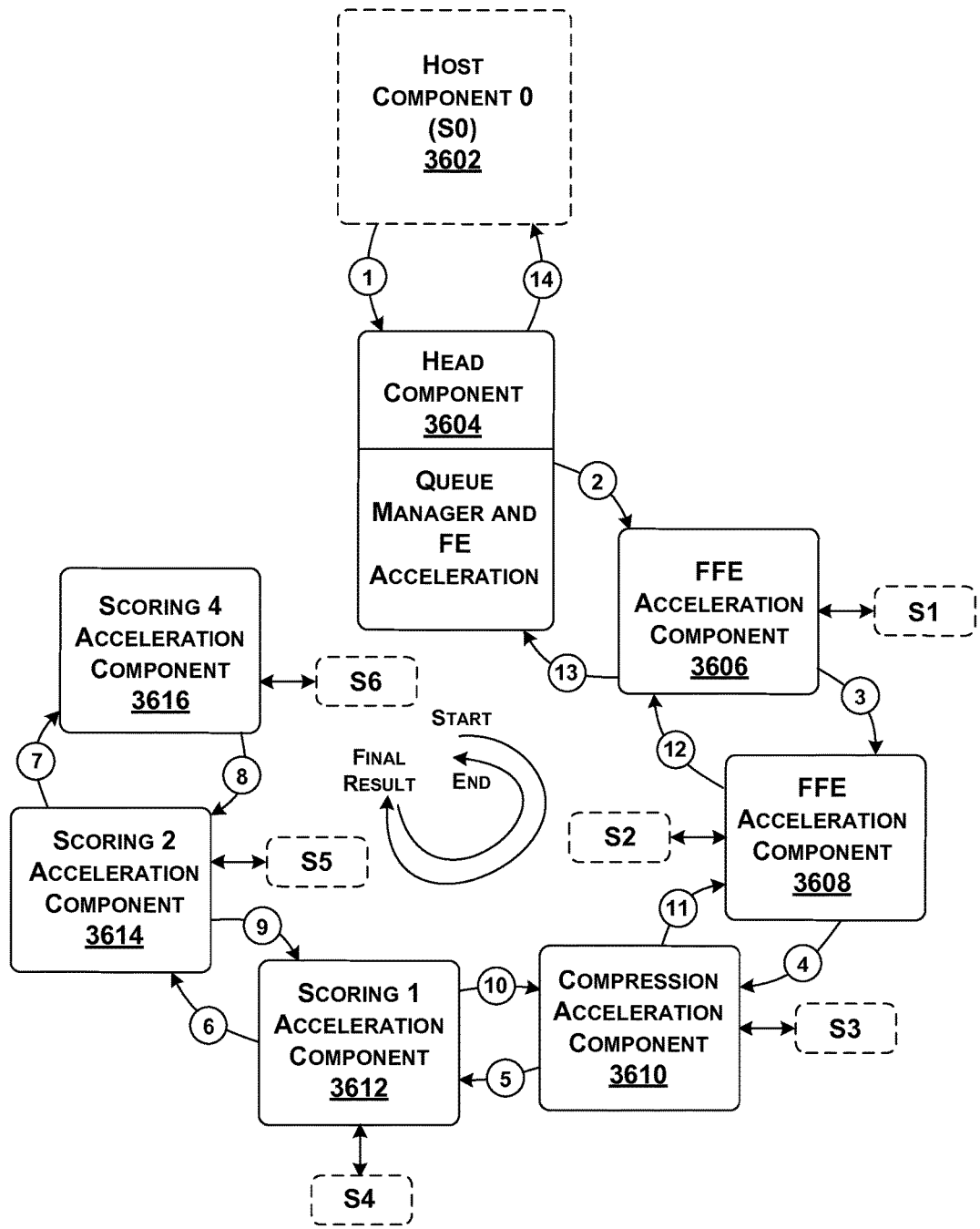
FIG. 36 shows a more detailed example of an illustrative multi-component service, implemented using a collection of hardware acceleration components.

FIG. 36 shows a more detailed example of an illustrative multi-component service, implemented using a collection of acceleration components. Overall, the multi-component service assigns a ranking score to a pairing of a query and a document. The ranking score defines the relevance of the document to the query. Traditionally, such as task is performed entirely in software by applying a model produced by machine-learning.

In the present implementation, a host component 3602 may invoke the service by sending a request to a first acceleration component of the multi-component service, corresponding to a head component 3604. More specifically, FIG. 36 simplifies the first operation by showing, in operation (1), that host component 3602 directly interacts with head component 3604. More generally, host component 3602 directly interacts with its local acceleration component, which may or may not correspond to head component 3604. If the local acceleration component is not head component 3604, the local acceleration component will forward the request to head component 3604.

The request itself may include various items of information, such as one or more hit vectors which describe the locations of the query terms within the document under consideration, etc. The request also may specify a collection of software-generated features. These software-generated features are computed in software (and not hardware) for any environment-specific reason (e.g., because such computations do not map well to hardware resources).

Head component 3604 performs two roles. First, head component 3604 calculates numeric scores, referred to herein as "feature values" to be used as input information for downstream acceleration components. For example, one such feature value may identify the number of times a query word occurs in the document under consideration. Another feature value may be the number of times query words appear in consecutive order, and so on. Head component 3604 also may perform a queue management role, to be described in greater detail below.

The next two acceleration components (3606, 3608) perform more complex computations, referred to herein as "free form expressions" (FFE), compared to the computations performed by head component 3604. For example, as described in more detail below, FFE acceleration components 3606 and 3608 may perform mathematical computations using feature values determined by head component 3604. Although two FFE acceleration components 3606 and 3608 are shown in FIG. 36, persons of ordinary skill in the art will understand that more or fewer than two FFE acceleration components may be used. The next acceleration component 3610 in the sequence compresses the feature values computed by thus far.

The last three acceleration components (3612, 3614, 3616) generate a final ranking score using all of the feature values computed thus far as input information to the scoring calculation, and using any environment-specific score calculation equation or algorithm. The above-described series of acceleration components then routes the final score back to head component 3604, and thereafter to host component 3602.

Generally, the numbered arrows in FIG. 36 reflect the sequence of operations that are performed by the acceleration components that make up the multi-component service. Here, the flow structure assumes the form of a ring, in which computation flows in a first direction of the ring and a final result flows in the opposite direction of the ring. But again, many other flow structure as possible. The labels S1, S2, . . . , S6 denote local host components that are associated with the respective acceleration components shown in FIG. 36.

Figure 37:
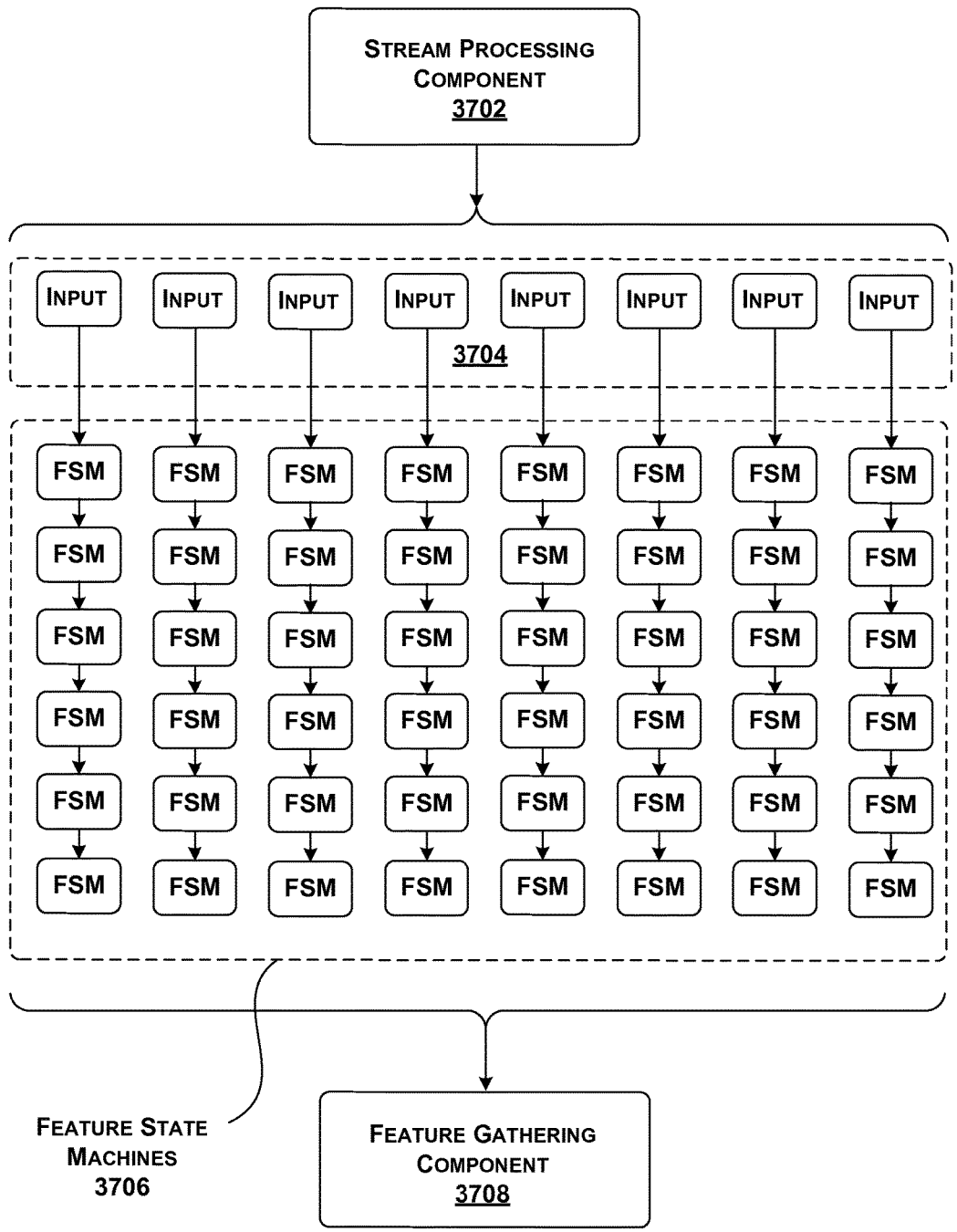
FIG. 37 shows functionality that performs processing in one of the stages of the multi-component service of FIG. 36.

FIG. 37 shows functionality in head component 3604 for use in calculating feature values. The functionality includes a stream processing component 3702 for splitting an input stream (e.g., associated with the hit vectors) into multiple sub-streams 3704. A collection of feature state machines 3706 then operates on the sub-streams in parallel to generate feature values. A feature gathering component 3708 collects the feature values from the feature state machines and makes them available to downstream acceleration components. Feature gathering component 3708 may be implemented with one or computer processors with memory store instructions, or dedicated logic gate arrays implemented, for example, in an FPGA or on an ASIC, or other similar device. Although not shown, acceleration components (35606, 3608) that perform more advanced feature computations also can leverage parallel computational resources.

Figure 38:
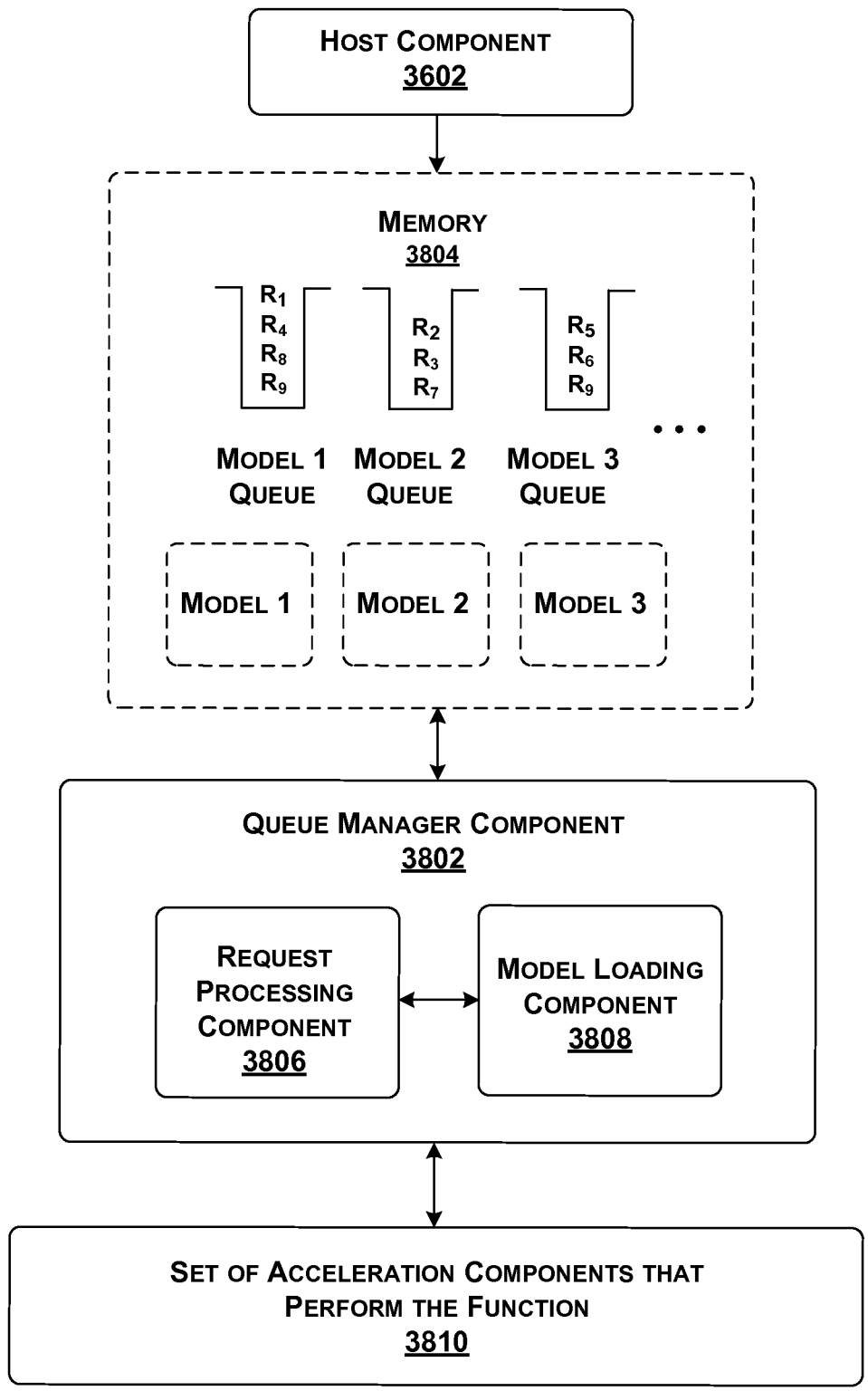
FIG. 38 shows functionality for swapping models in the collection of hardware acceleration components of FIG. 36, to accommodate requests that are associated with different models.

FIG. 38 shows a queue manager component 3802, which may be implemented by head component 3604 of FIG. 36. Queue manager component 3802 operates by changing a model used by the collection of acceleration components of FIG. 36 to accommodate requests that demand different models. More specifically, different requests received from host component 3602 correspond to queries that are expressed in different natural languages. The different languages, in turn, prompt a queue manager component 3802 to load different respective models to process the different requests. For instance, if a received query is expressed in French, then queue manager component 3802 will seek to load a French-related model in the multi-component service to act on the query (if that model is not already loaded).

More specifically, queue manager component 3802 may maintain multiple queues in local memory 3804. Each queue is associated with a different respective model. For example, queue 1 is associated with model 1, queue 2 is associated with model 2, queue 3 is associated with model 3, and so on.

Queue manager component 3802 includes a request processing component 3806 and a model loading component 3808. Model loading component 3808 may be implemented with one or computer processors with memory store instructions, or dedicated logic gate arrays implemented, for example, in an FPGA or on an ASIC, or other similar device. In operation, request processing component 3806 adds each incoming request to an appropriate queue, e.g., by adding the above-noted French query to a French queue. Request processing component 3806 also selects among the queues to process based on any policy, such as by selecting among queues on a round-robin basis, queue-fullness basis, priority basis, etc., or any combination thereof. Such a policy may generally seek to fairly arbitrate among queues and requests, while also reducing the frequency at which new queues are selected (and consequently, the frequency at which new models are loaded). Upon switching to a new queue (e.g., having z unprocessed requests therein), model loading component 3808 loads the model associated with that queue into acceleration components 3810, and then submits the requests in the queue to acceleration components 3810 for processing based on the loaded new model.

Figure 39:
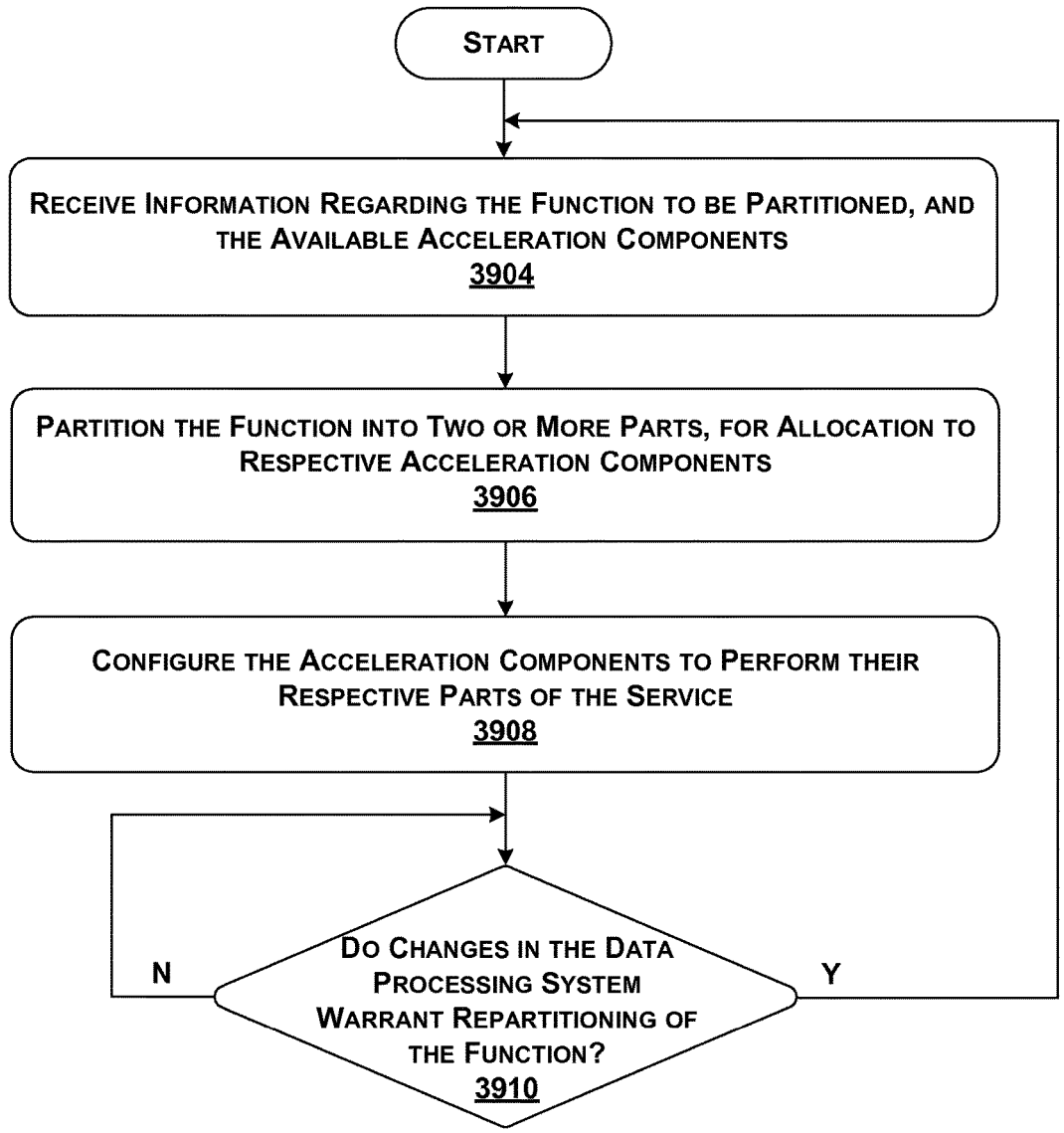
FIG. 39 is a flowchart that shows one manner of operation of the function parsing component of FIG. 35.

FIG. 39 is a process 3902 that shows one manner of operation of function parsing component 3220 of FIG. 35. In block 3904, function parsing component 3220 receives information regarding a function to be partitioned, together with information regarding the available acceleration components. In block 3906, function parsing component 3220 partitions the function into two or more parts, for allocation to respective acceleration components. In block 3908, function parsing component 3220 uses configuration component 1006 to configure the acceleration components with the parts identified in block 3906 (if not already configured). In block 3910, function parsing component 3220 determines whether conditions in data processing system 102 (and/or the nature of function itself) warrant repartitioning the function. If so, process 2802 returns to block 3904.

Figure 40:
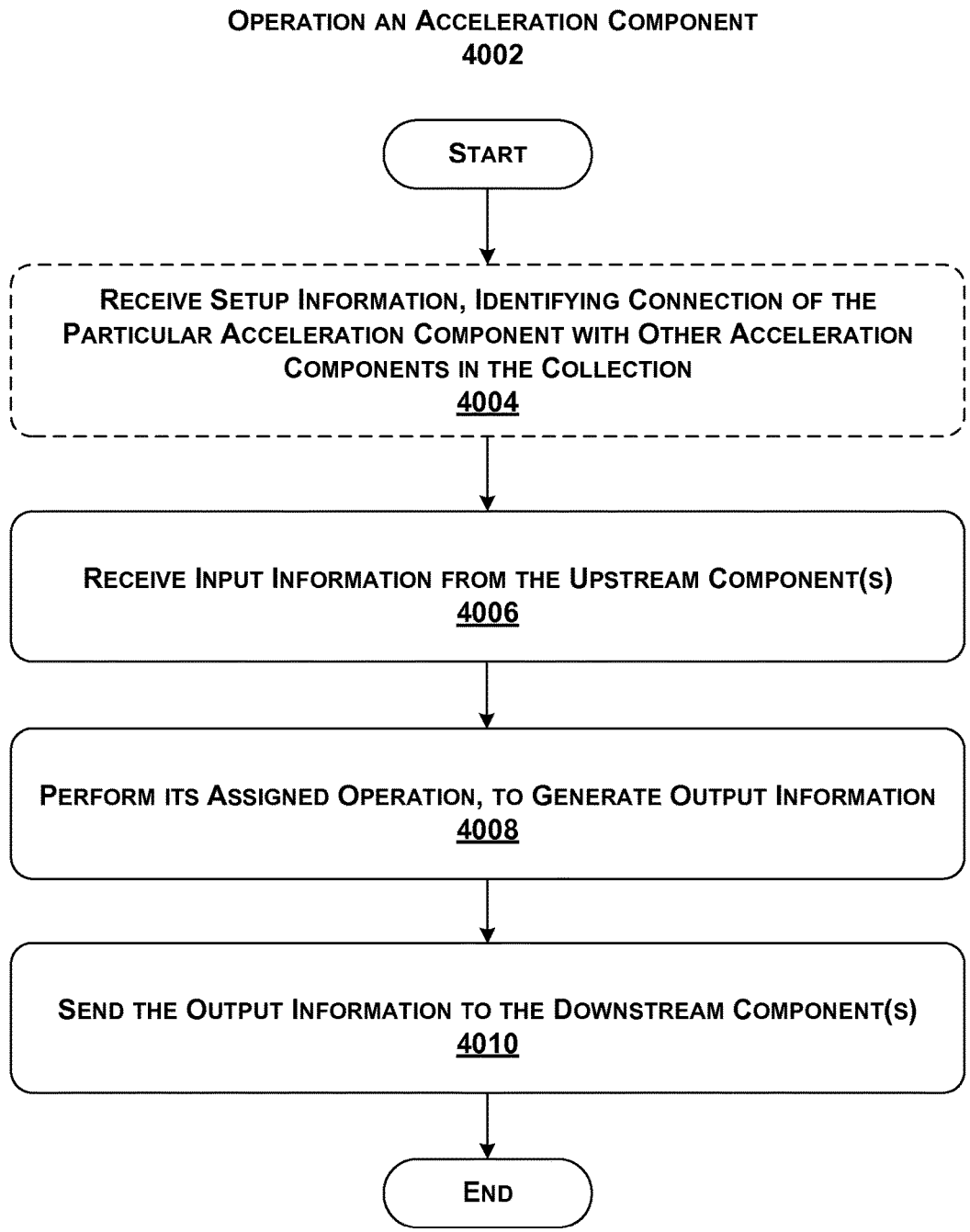
FIG. 40 is a flowchart that shows the operation of one hardware acceleration component within a collection of hardware acceleration components that implements a multi-component service.

FIG. 40 shows a process 4002 that describes the operation of a particular acceleration component within a collection of acceleration components that implements a multi-component service. In block 4004, the acceleration component receives setup information that identifies the connection of the particular acceleration component with other acceleration components in the collection, e.g., by identifying the upstream component(s) (if any) and the downstream component(s) (if any). In block 4006, the particular acceleration component receives input information from the upstream component(s) or from the requesting host component that has requested use of the multi-component service. In block 4008, the particular acceleration component performs its assigned operation to generate output information. In block 4010, the particular acceleration component sends the output information to the downstream component(s) or the requesting host component.

Figure 41:
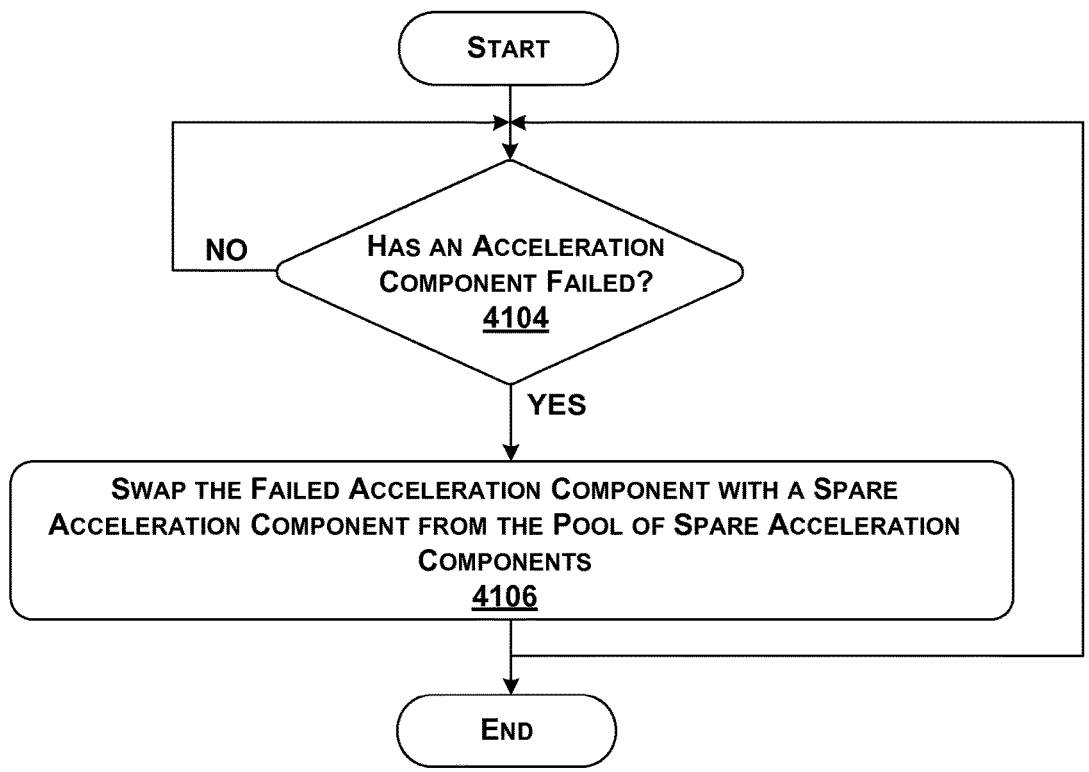
FIG. 41 is a flowchart that shows one way of handling a failure in a collection of hardware acceleration components that implements a multi-component service.

FIG. 41 is a process 4102 that describes one way of handling a failure in a collection of acceleration components that implements a multi-component service. In block 4104, management functionality 122 determines if an acceleration component has failed. In block 4106, management functionality 122 swaps the failed acceleration component with a spare acceleration component, selected from the pool of spare acceleration components. The spare acceleration component may be already configured to perform the role of the failed acceleration component, or it may be configured to perform that role in an on-demand manner.

As described above in connection with FIG. 36, an example multi-component service may be used to assign a ranking score to a pairing of a query and a document. In the illustrated example, head component 3604 calculates feature values based on the query and document combination. For example, one such feature value may be the number of times a query word occurs in the document under consideration. Another feature value may be the number of times query words appear in consecutive order, and so on.

As described above, FFE acceleration components 3606 and 3608 may perform mathematical computations using feature values determined by head component 3604. FFEs give developers a way to create hybrid features that are not conveniently specified as feature extraction state machines. There may be thousands of FFEs, ranging from very simple (such as adding two features) to large and complex (thousands of operations including conditional execution and complex floating point operators such as natural logarithm (ln), pow, and divide). FFEs vary greatly across different models, so it is impractical to synthesize customized data paths for each expression.

FIG. 42 illustrates examples of some feature values and examples of FFEs that perform various mathematical computations using the example feature values. In the illustrated example, feature values include NumberofOccurences_0 (e.g., the number of times a first query word appears in a document) having a value 7, NumberofOccurences_1 (e.g., the number of times a second query word appears in a document) having a value 4, and NumberofTuples_0_1 (e.g., the number of times the first and second query words appear in order) having a value 1. Persons of ordinary skill in the art will understand that feature values may have values other than those shown in FIG. 42, and there may be more of fewer than four feature values.

FIG. 42 also includes four example FFEs. A first FFE (FFE#0) is the simple addition of two feature values. A second FFE (FFE#1) includes multiplication, addition and division operations. A third FFE (FFE#2) includes division and natural logarithm operations. A fourth FFE (FF#3) include multiplication, power and division operations. Persons of ordinary skill in the art will understand that FFEs may include many more variables and mathematical operations, and there may be more or fewer than four FFEs. Thus, FFEs may vary considerably in terms of the number of feature values used and the complexity of mathematical operations performed on the feature values.

As described above, hardware acceleration components of data processing system 102 may be configured to host a variety of services, such as, among other things, an encryption function, a document ranking function, a data compression function, an image classification function, a machine learning function, and so on. Some services may require relatively small amounts of data that may be stored in memory and require relatively low memory bandwidth (e.g., tens of GB/sec), whereas other services may require much larger amounts of data that may be stored in memory and require much higher memory bandwidth (e.g., hundreds of GB/sec) (referred to herein as "High BW Services").

As described above in connection with FIG. 25, example acceleration component 2502 is coupled to local memory 2522. In an implementation, acceleration component 2502 is coupled to local memory 2522 (e.g., DDR3 or DDR4 DRAM devices, such as traditional DIMMS), via a multi-channel memory bus (e.g., on the order of a 64- or 72-bit wide bus), and has a memory bandwidth of about 10 GB/sec at a power of about 3 watts (i.e., a power efficiency of about 3.33 MB/sec/mW). Although that memory bandwidth may suffice for some services, for other data-intensive services, more memory bandwidth is needed.

One technique to increase memory bandwidth is to provide more channels to a larger number of DIMMS. But such a technique requires a large number of traces on the motherboard, driven at very high speed, and requires a large amount of power. Such a technique for increasing memory bandwidth can be impractical for some applications. For example, in a data center implementation of data processing system 102, power is a very expensive and limited resource, so that providing more channels to a larger number of DIMMS may not be feasible.

Another technique to increase memory bandwidth is to implement local memory 2522 using memory technologies other than DDR3 or DDR4 DRAM, such as hybrid memory cube (HMC). HMC combines through-silicon vias and microbumps to connect multiple (e.g., 4 to 8) die of memory cell arrays on top of each other. Total bandwidth is in the range of 128 GB/sec to 400 GB/sec. Although HMC provides high memory bandwidth, the technology also requires very high power, which also can be impractical for some applications, such as data centers.

An alternative technology for providing high bandwidth, low power memory uses die stacking techniques. As used herein, a "high bandwidth, low power memory" is a memory having a memory bandwidth greater than about 50 GB/sec and a power efficiency of greater than about 20 MB/sec/mW. One such die stacking technology is the JEDEC High Bandwidth Memory (HBM) DRAM Standard JESD235, which specifies a memory architecture that uses a wide-interface architecture to provide high-bandwidth, low-power memory.

Figure 43B:
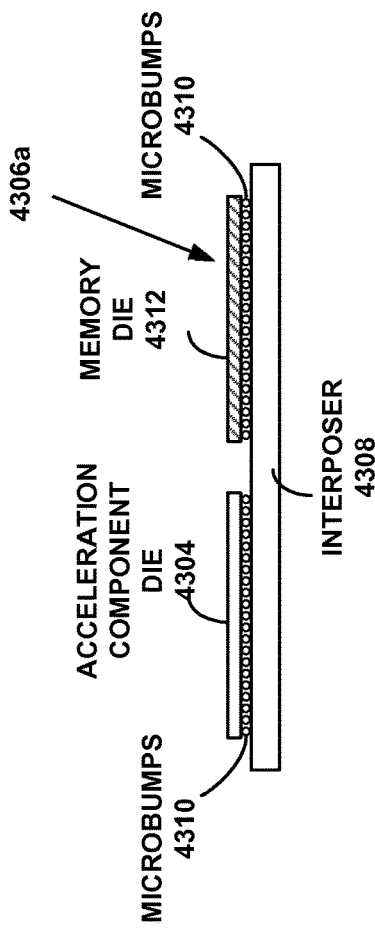
FIGS. 43A-43C show views of various implementations of high bandwidth memory acceleration components.
Figure 43C:
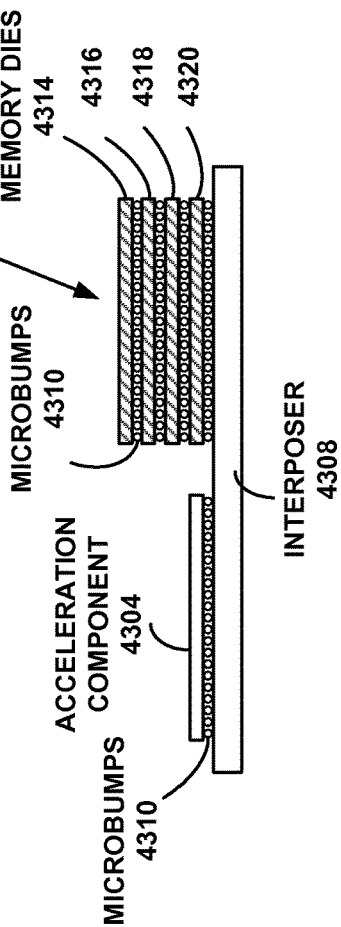
Figure 43A:
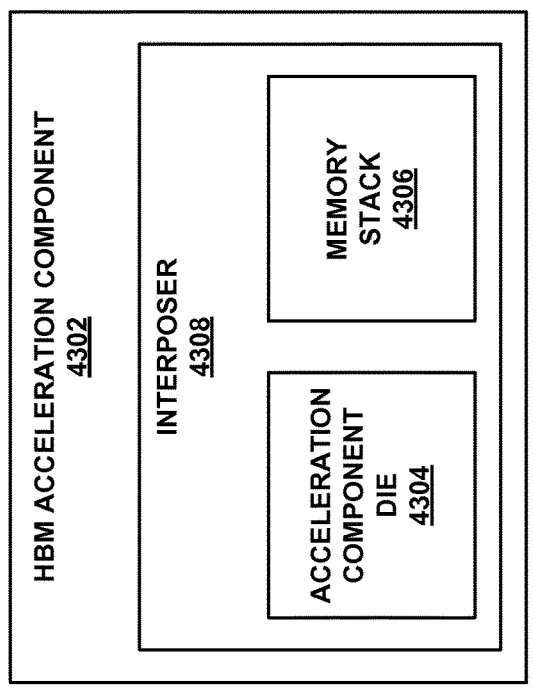

FIGS. 43A-43C show implementations of an acceleration component with HBM DRAM 4302. For simplicity, an acceleration component with HBM DRAM will be referred to herein as an "HBM acceleration component." HBM acceleration component 4302 includes an acceleration component die 4304, which may be physically implemented as an FPGA die, and a memory stack 4306 disposed on an interposer 4308. In an implementation, acceleration component die 4304, memory stack 4306 and interposer 4308 are disposed in an integrated circuit package (not shown). As shown in cross-section in FIG. 43B, in an implementation, each of acceleration component die 4304 and memory stack 4306 are coupled to interposer 4308 via microbumps 4310 or other similar contact.

Memory stack 4306 may include one to four memory die, with each memory die having a capacity of between about 0.5 GB to about 4 GB. In an implementation depicted in FIG. 43B, memory stack 4306a includes a single memory die 4312. In another implementation depicted in FIG. 43C, memory stack 4306b includes four memory dies 4314, 4316, 4318 and 4320. Each memory die in memory stack 4306 may include 1 or 2 memory channels, with a 512-bit data interface. Memory stack 4306 may have a clock rate of between about 1066 MHz to 1600 MHz, although other clock rates may be used.

Interposer 4308 can be a die having a planar surface on which one or more dies, e.g., acceleration component die 4304 and memory stack 4306, can be mounted. In an implementation, acceleration component die 4304 and memory stack 4306 are located side-by-side on the planar surface of interposer 4308. Interposer 4308 provides a common mounting surface and electrical coupling point for acceleration component die 4304 and memory stack 4306.

Interposer 4308 serves as an intermediate layer for interconnect routing (not shown) between acceleration component die 4304 and memory stack 4306. Interposer 4308 can be implemented with a silicon wafer substrate, whether doped or un-doped with an N-type and/or a P-type impurity. Interposer 4308 can include one or more layers of metal interconnect, and one or more dielectric or insulating layers. Interposer 4308 can be implemented as a passive die that does not includes active circuit elements, or may include active circuit elements (e.g., transistor devices and/or diode devices).

In an embodiment, acceleration component die 4304 and memory stack 4306 are electrically coupled via microbumps 4310 and interconnect routing (not shown) in interposer 4308. For example, acceleration component die 4304 and memory stack 4306 may be coupled via 512 nano-scale interconnect traces in interposer 4308. The interconnect traces have very low resistance and parasitic capacitance, and thus have very relatively low drive requirements.

In an implementation, memory stack 4306 has a 512-bit data interface, clocked at 1600 MHz, with 2 data transfers per clock, and a maximum memory bandwidth of about 204.8 GB/sec can be achieved at a power of about 7 watts (a power efficiency of about 29 MB/sec/mW). Thus, memory stack 4306 can be clocked at a relatively low clock frequency and yet still obtain very high memory bandwidth at relatively high power efficiency. In other implementations, memory stack 4306 has a maximum memory bandwidth of between about 128 GB/sec and about 256 GB/sec.

Figure 44:
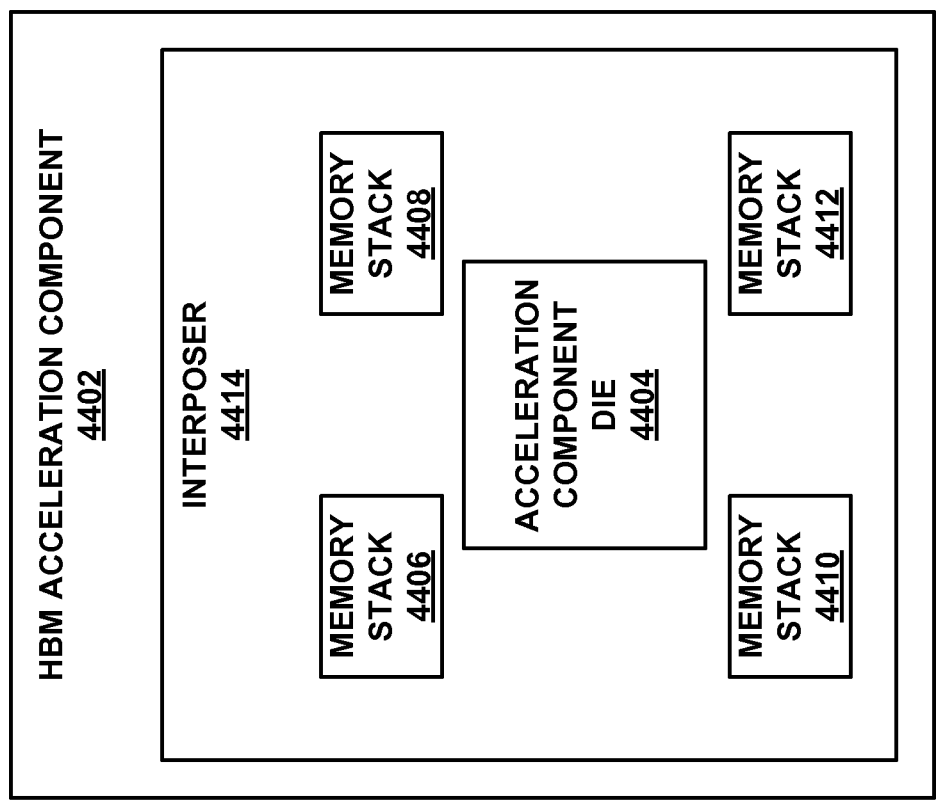
FIG. 44 shows another implementation of a high bandwidth memory acceleration component.

FIG. 44 shows an implementation of an HBM acceleration component 4402 that includes an acceleration component die 4404, which may be physically implemented as an FPGA die, and memory stacks 4406, 4406, 4410 and 4412 disposed on an interposer 4414. Although not shown in FIG. 44, in an implementation, each of acceleration component die 4404 and memory stacks 4406, 4406, 4410 and 4412 are coupled to interposer 4414 via microbumps or other similar contact. Each of memory stacks 4406, 4406, 4410 and 4412 may include one to four memory die, although all four memory stacks need not include the same number of memory die. Although four memory stacks 4406, 4406, 4410 and 4412 are shown in FIG. 44, more or fewer than four memory stacks may be used. In addition, although memory stacks 4406, 4406, 4410 and 4412 are shown disposed at the four corners of acceleration component die 4404, memory die may be disposed at other locations on interposer 4414.

Figure 45A:
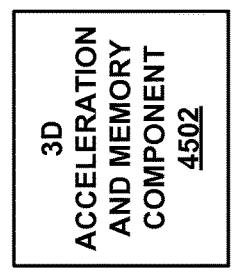
FIGS. 45A-45C show views of various implementations of three-dimensional memory and acceleration components.
Figure 45B:
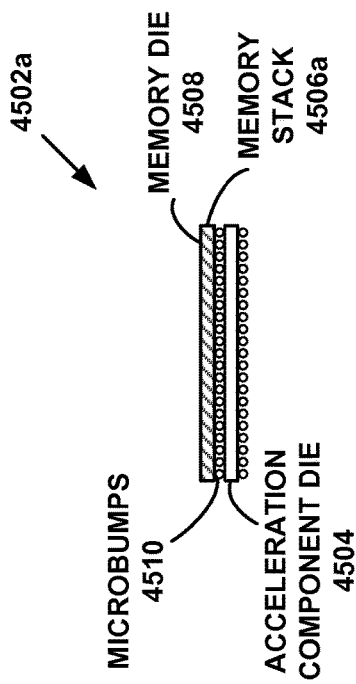
Figure 45C:
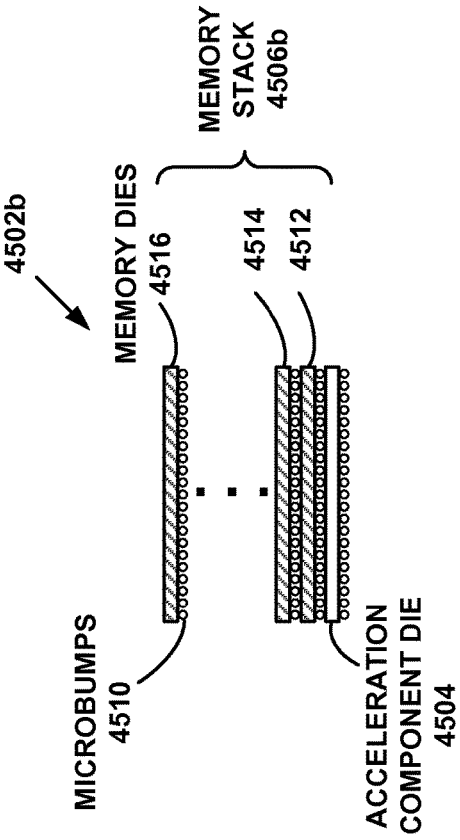

Another die stacking technology for providing high bandwidth, low power memory is 3D integrated circuit technology. FIGS. 45A-45C show implementations of a 3D acceleration and memory component 4502. 3D acceleration and memory component 4502 includes an acceleration component die 4504, which may be physically implemented as an FPGA die, and a memory stack 4506 that includes one or more memory die disposed on acceleration component die 4504. In an implementation, acceleration component die 4504 and memory stack 4506 are disposed in an integrated circuit package (not shown).

As shown in cross-section in FIG. 45B, in an implementation, 3D acceleration and memory component 4502a includes memory stack 4506a that includes a single memory die 4508 disposed on acceleration component die 4504 and coupled together via microbumps 4510 or other similar contacts. As shown in cross-section in FIG. 45C, in an implementation, 3D acceleration and memory component 4502b includes a memory stack 4506b that includes multiple memory die 4512, 4514, . . . , 4516 disposed on acceleration component die 4504 and coupled together via microbumps 4510 or other similar contacts. Although not shown in FIGS. 45A-45C, one or more of the dies in 3D acceleration and memory component 4502 may include through-silicon vias (TSVs) to allow upper die to communicate with lower die.

Figure 46:
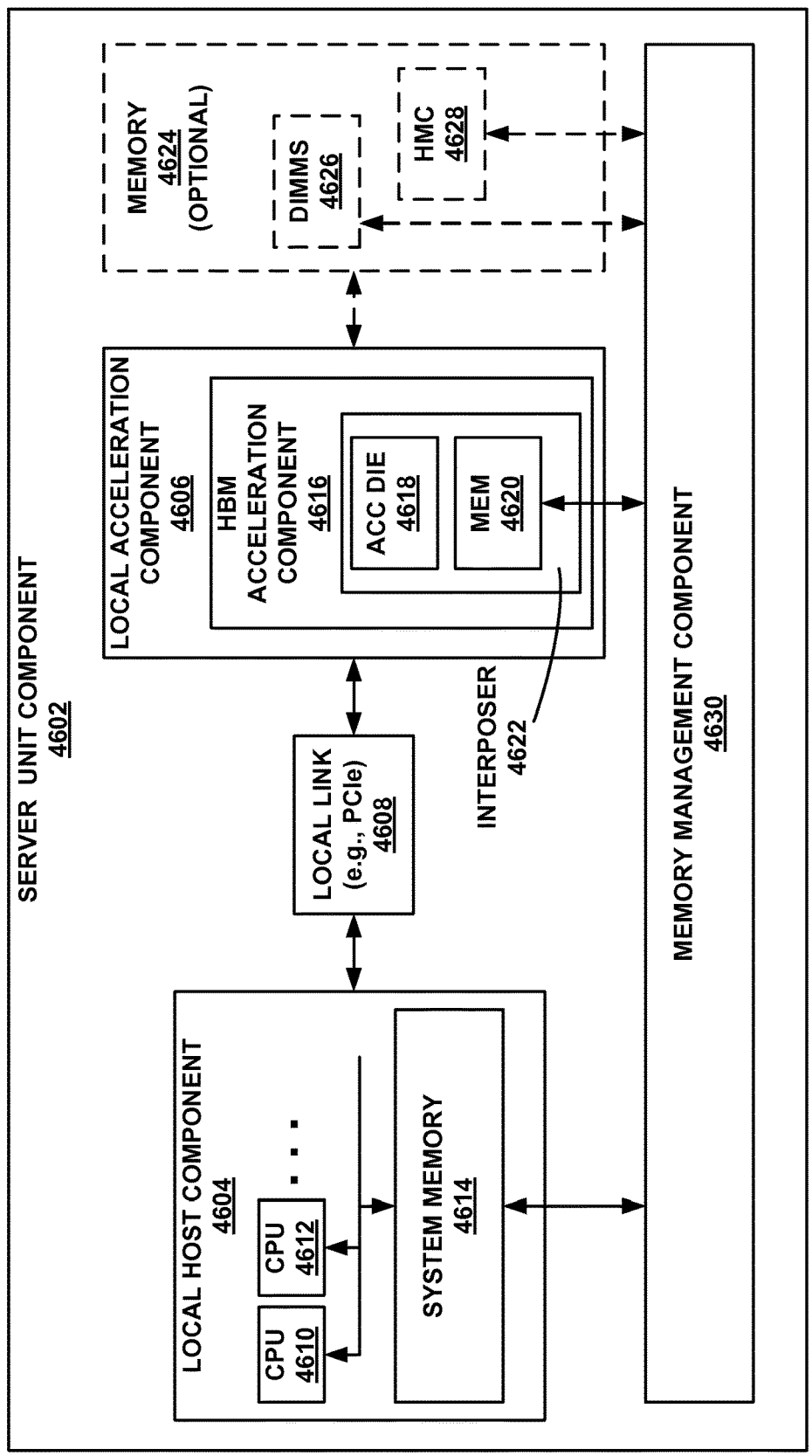
FIG. 46 shows an implementation of a server unit component including a high bandwidth memory acceleration component.

As described above in connection with FIG. 4, data center 402 represents one implementation of data processing system 102 of FIG. 1, and includes racks of server unit components (404, 406, . . . , 408). FIG. 46 shows an alternative implementation of a server unit component 4602, compared to the architecture shown in FIG. 4, that includes an acceleration component with high bandwidth, low power memory using die stacking techniques.

Server unit component 4602 includes a host component 4604 and an acceleration component 4606 coupled via a local link 4608 (e.g., a PCIe link). Host component 4604 includes one or more CPUs (4610, 4612, . . . ) coupled to memory 4614 (e.g., DRAM) (also referred to herein as "host component memory 4614"). Acceleration component 4606 includes HBM acceleration component 4616, which includes an acceleration component die 4618 and a memory stack 4620 disposed on an interposer 4622. Alternatively, HBM acceleration component 4616 may be implemented using a 3D acceleration and memory component, such as 3D acceleration and memory component 4502 of FIGS. 45A-45C.

Server unit component 4602 optionally may include memory 4624 coupled to local acceleration component 4606. In an implementation, memory 4624 is external to (i.e., not included in the same integrated circuit package) local acceleration component 4606 and includes a low bandwidth memory, such as DIMMS 4626. As used herein, a "low bandwidth memory" is a memory having a bandwidth less than about 50 GB/sec. In other implementations, memory 4624 also may include a high bandwidth, high power memory technology, such as HMC 4628. As used herein, a high bandwidth, high power memory" is a memory having a memory bandwidth greater than about 50 GB/sec and a power efficiency of less than about 20 MB/sec/mW.

Thus, server unit component 4602 includes acceleration component 4606 with high bandwidth, low power memory (memory stack 4620). In a hybrid implementation, server unit component 4602 includes acceleration component 4606 with both high bandwidth, low power memory (memory stack 4620) and low bandwidth memory (DIMMS 4626). In another hybrid implementation, server unit component 4602 includes acceleration component 4606 with both high bandwidth, low power memory (memory stack 4620), low bandwidth memory (DIMMS 4626), and high bandwidth, high power memory (HMC 4628).

In an implementation, host component memory 4614, memory stack 4620, and optional other memory 4624 share the same memory space. Alternatively, host component memory 4614, memory stack 4620, and optional other memory 4624 may each have separate memory spaces.

In an embodiment, server unit component 4602 also includes memory management component 4630 coupled to host component memory 4614, memory stack 4620, DIMMS 4626 and HMC 4628. Memory management component may be implemented by host component 4614 (e.g., as part of the operating system running on one or more of CPUs (4610, 4612, ...)), by acceleration component 4606a (e.g., by a controller implemented on local acceleration component 4606), bye queue manager component 3802 (FIG. 38), etc., or some combination thereof. In an implementation, memory management component 4626 is configured to allocate data to high bandwidth memory (memory stack 4620) and low bandwidth memory (DIMMS memory 4626) based on the bandwidth requirements of the data.

Figure 47:
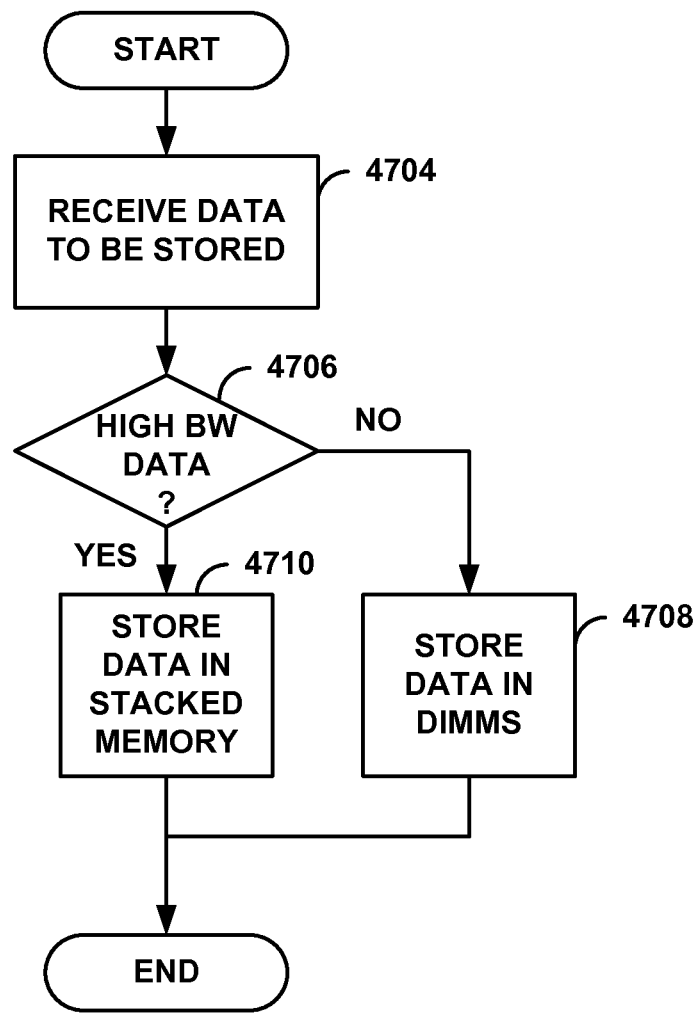
FIG. 47 is a flowchart that shows an operation of the memory management component of FIG. 46.

For example, FIG. 47 illustrates an example operation of a memory management component 4702, such as memory management component 4630, for allocating data to high bandwidth memory or low bandwidth memory based on the bandwidth needs of the data. In block 4704, memory management component 4630 receives data to be stored in memory. In block 4706, memory management component 4630 determines bandwidth requirements for the data. For example, a flag associated with the data may indicate that the data are high bandwidth or low bandwidth data. Alternatively, memory management component 4630 may determine bandwidth requirements for the data based on the nature of the data or the source of the data.

If memory management component 4630 determines that the data are low bandwidth data, in block 4708 memory management component 4630 stores the data in low bandwidth memory (e.g., DIMMS 4626 in FIG. 46). If memory management component 4630 determines that the data are high bandwidth data, in block 4710 memory management component 4630 stores the data in stacked memory (e.g., memory stack 4620 in FIG. 46).

In another implementation, memory management component 4626 is configured to allocate data to high bandwidth, low power memory (memory stack 4620), low bandwidth memory (DIMMS memory 4626) and high bandwidth, high power memory (HMC 4628) based on the bandwidth requirements of the data and power requirements of server unit component 4602.

Figure 48:
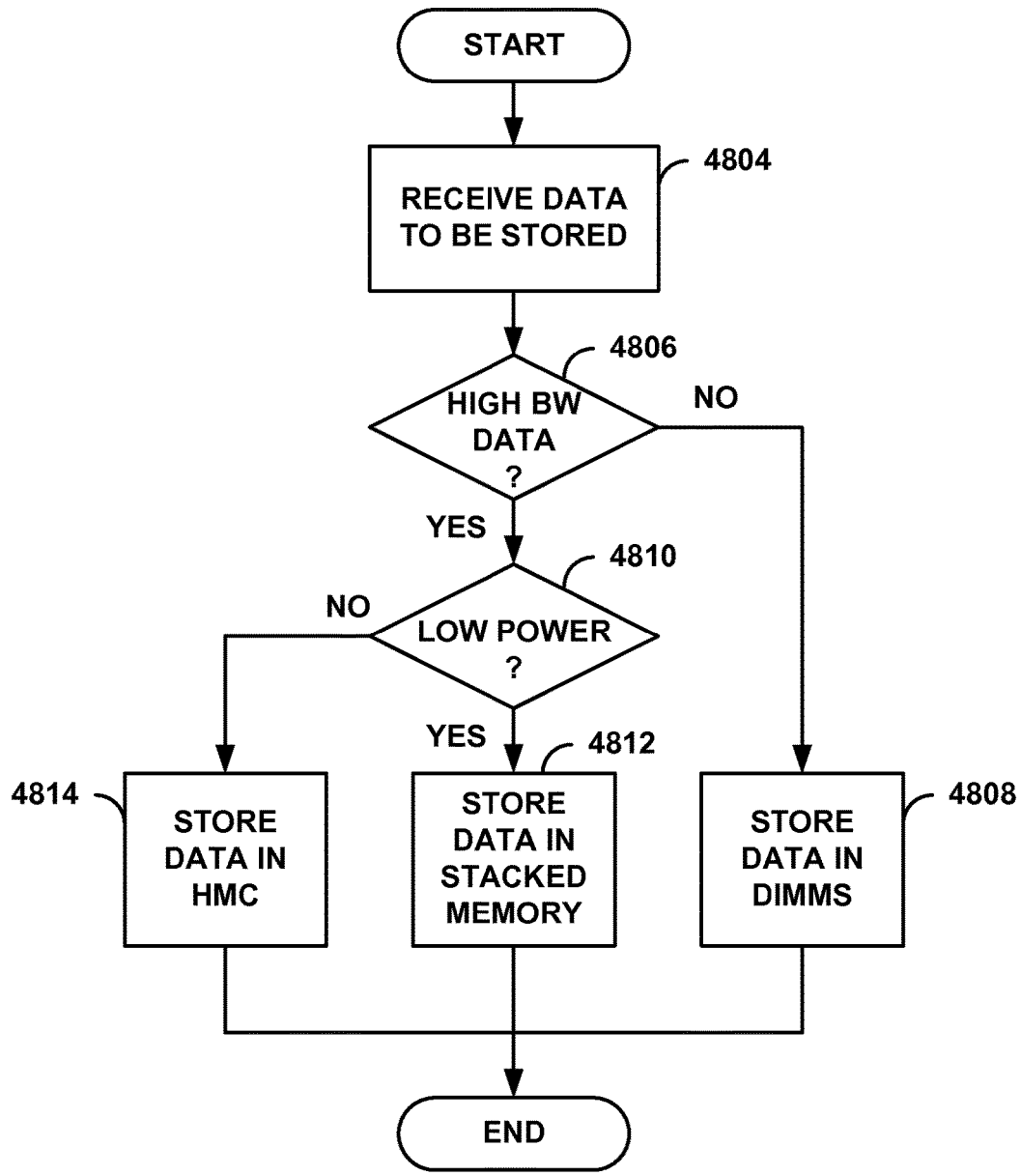
FIG. 48 is a flowchart that shows another operation of the memory management component of FIG. 46.

For example, FIG. 48 illustrates an example operation of a memory management component 4802, such as memory management component 4630, for allocating data to high bandwidth memory or low bandwidth memory based on the bandwidth needs of the data. In block 4804, memory management component 4630 receives data to be stored in memory. In block 4806, memory management component 4630 determines bandwidth requirements for the data. For example, a flag associated with the data may indicate that the data are high bandwidth or low bandwidth data. Alternatively, memory management component 4630 may determine bandwidth requirements for the data based on the nature of the data or the source of the data.

If memory management component 4630 determines that the data are low bandwidth data, in block 4808 memory management component 4630 stores the data in low bandwidth memory (e.g., DIMMS 4626 in FIG. 46). If memory management component 4630 determines that the data are high bandwidth data, in block 4810 memory management component 4630 determines if the data should be stored in low power memory or high power memory. If memory management component 4630 determines that the data should be stored in low power memory, in block 4812 memory management component 4630 stores the data in stacked memory (e.g., memory stack 4620 in FIG. 46). If memory management component 4630 determines that the data should be stored in high power memory, in block 4814 memory management component 4630 stores the data in HMC (e.g., HMC 4628 in FIG. 46).

Acceleration components that include high bandwidth, low power memory using die stacking techniques, such as HBM acceleration component 4302 of FIGS. 43A-43C, HBM acceleration component 4402 of FIG. 44, and 3D acceleration and memory component 4502 of FIGS. 45A-45C may be used to host High BW Services, such as key value stores, machine learning applications, neural networks, rendering applications, physics simulations, and other bandwidth-intensive services.

Figure 49:
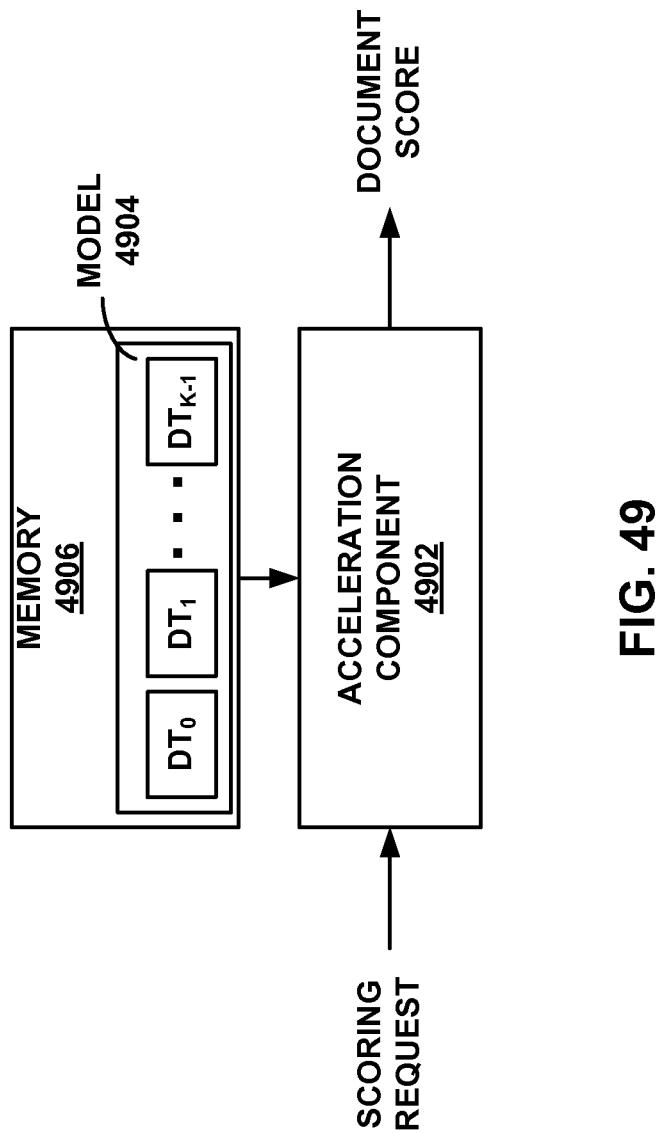
FIG. 49 shows an implementation of an acceleration component configured to perform a machine learning classification service.

One example of such a High BW Service that may be implemented on an acceleration component that includes high bandwidth, low power memory using die stacking techniques is machine learning classification using decision trees. For example, a machine learning classification service may be implemented on an acceleration component and used to assign a ranking score to a pairing of a query and a document, and may use decision trees to determine the ranking score. FIG. 49 is a block diagram of an implementation of an acceleration component 4902 configured to receive a document scoring request (e.g., from a host component) and perform document ranking based on a model 4904 of K decision trees $DT_0, DT_1, \ldots, DT_{K-1}$ stored in memory 4906 and loaded into acceleration component memory (e.g., block RAM (not shown)) on acceleration component 4902. The document scoring request includes input values for the decision trees. In an implementation, the document scoring request input values are feature values (such as described above in connection with FIG. 36) and FFE values (such as described above in connection with FIG. 42) associated with a document being scored.

Figure 50:
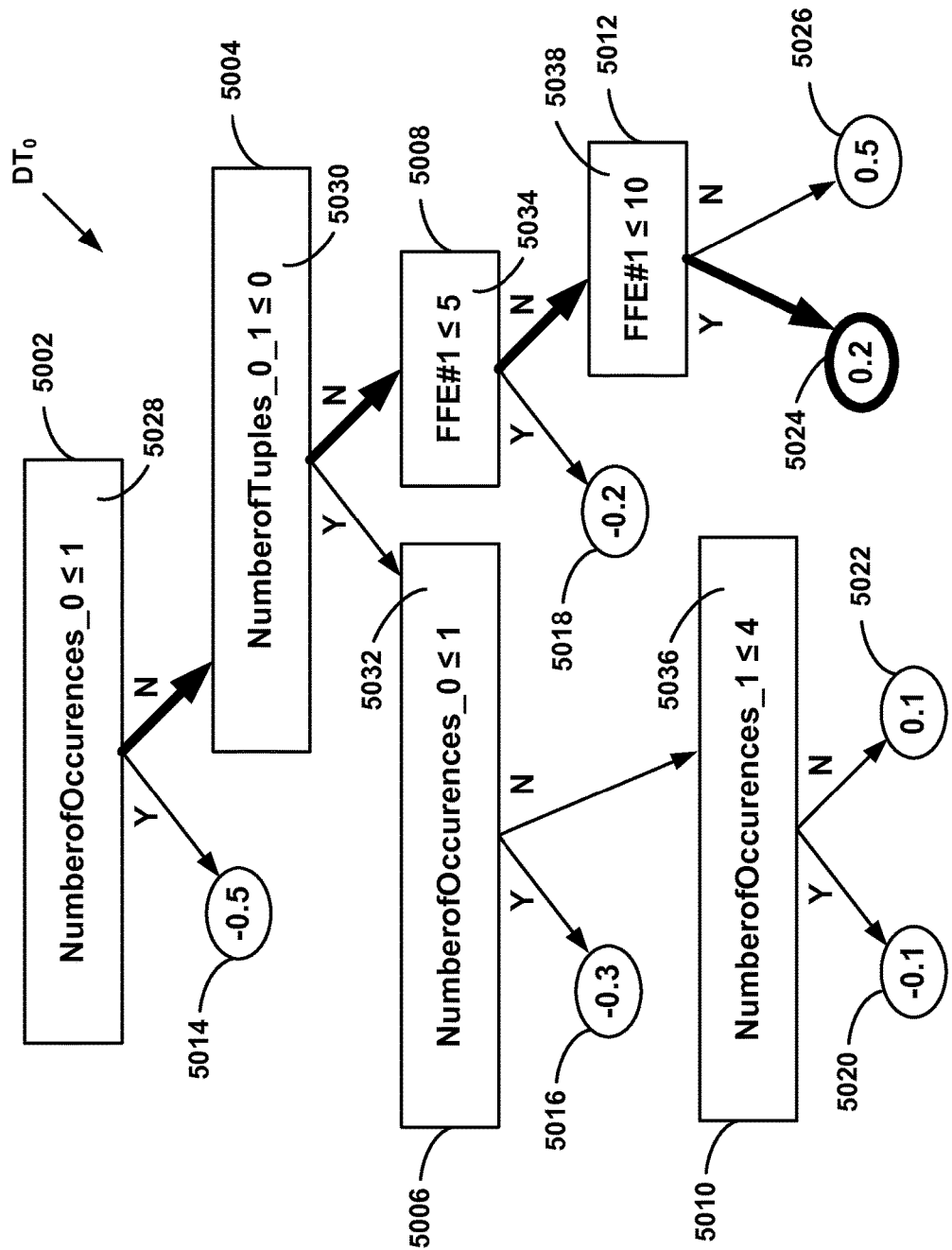
FIG. 50 shows an example decision tree for machine learning classification.

Each decision tree includes decision tree data associated with the tree, such as tree topology, number of nodes, features/FFE at each node, constants at each node, and values at each leaf. The input values to each decision tree are values of the features/FFE in the decision tree. FIG. 50 illustrates an example implementation of a decision tree (e.g., $DT_0$) of model 4904. $DT_0$ includes the topology depicted in FIG. 50, including five nodes (5002, 5004, 5006, 5008, 5010, 5012) and seven leaves (5014, 5016, 5018, 5020, 5022, 5024 and 5026).

Node 5002 includes the feature NumberofOccurrences_0 and the constant 1. Node 5004 includes the feature NumberofTupples_0_1 and the constant 0. Node 5006 includes the feature NumberofOccurrences_0 and the constant 1. Node 5008 includes the FFE FFE#1 and the constant 5. Node 5010 includes the feature NumberofOccurrences_1 and the constant 4. Node 5012 includes the FFE FFE#1 and the constant 10. Leaves 5014, 5016, 5018, 5020, 5022, 5024 and 5026 have values −0.5, −0.3, −0.2, −0.1, 0.1, 0.2 and 0.5, respectively.

The input values to decision tree $DT_0$ are values of the features/FFE in the decision tree. In the example of FIG. 50, the features/FFE in $DT_0$ are NumberofOccurrences_0, NumberofTupples_0_1, NumberofOccurrences_1 and FFE#1. Using the value in FIG. 42, example input values for decision tree $DT_0$ are NumberofOccurences_0=7, NumberofTuples_0_1=1, NumberofOccurences_1=4, and FFE#1=9

At each node, the input feature/FFE value is compared to the constant at the node, and the comparison result leads to the next node or a leaf. In the illustrated example, of FIG. 50, with the input values listed above, the decision tree follows the path highlighted in bold, and results in a value 0.2. As described above, model 4904 includes K trees. After all K trees are evaluated, the results of each tree are summed to produce a score for the document.

Referring again to FIG. 49, in an implementation, acceleration component 4902 retrieves model 4904 from memory 4906, and loads decision tree data for the K trees into acceleration component memory on acceleration component 4902. The aggregate amount of acceleration component memory on acceleration component 4902 available for storing tree data is limited. For example, acceleration component 4902 may have an aggregate amount of between about 4 MB and about 6 MB of acceleration component memory. Thus, the aggregate amount of acceleration component memory in acceleration component 4902 limits the amount of decision tree data that may be stored in acceleration component 4902.

Some models include a very large number K of trees and include a total amount of decision tree data greater than the aggregate amount of acceleration component memory in an acceleration component. One way to address this issue is to implement a model on more than one acceleration component. However, this requires additional hardware, resources, and power, and is not practically scalable with very large models.

An acceleration component that includes high bandwidth, low power memory using die stacking techniques, such as HBM acceleration component 4302 of FIGS. 43A-43C, HBM acceleration component 4402 of FIG. 44, and 3D acceleration and memory component 4502 of FIGS. 45A-45C may be used to implement a model that includes a total amount (a first amount) of decision tree data greater than the aggregate amount (a second amount) of acceleration component memory on the acceleration component.

Figure 51:
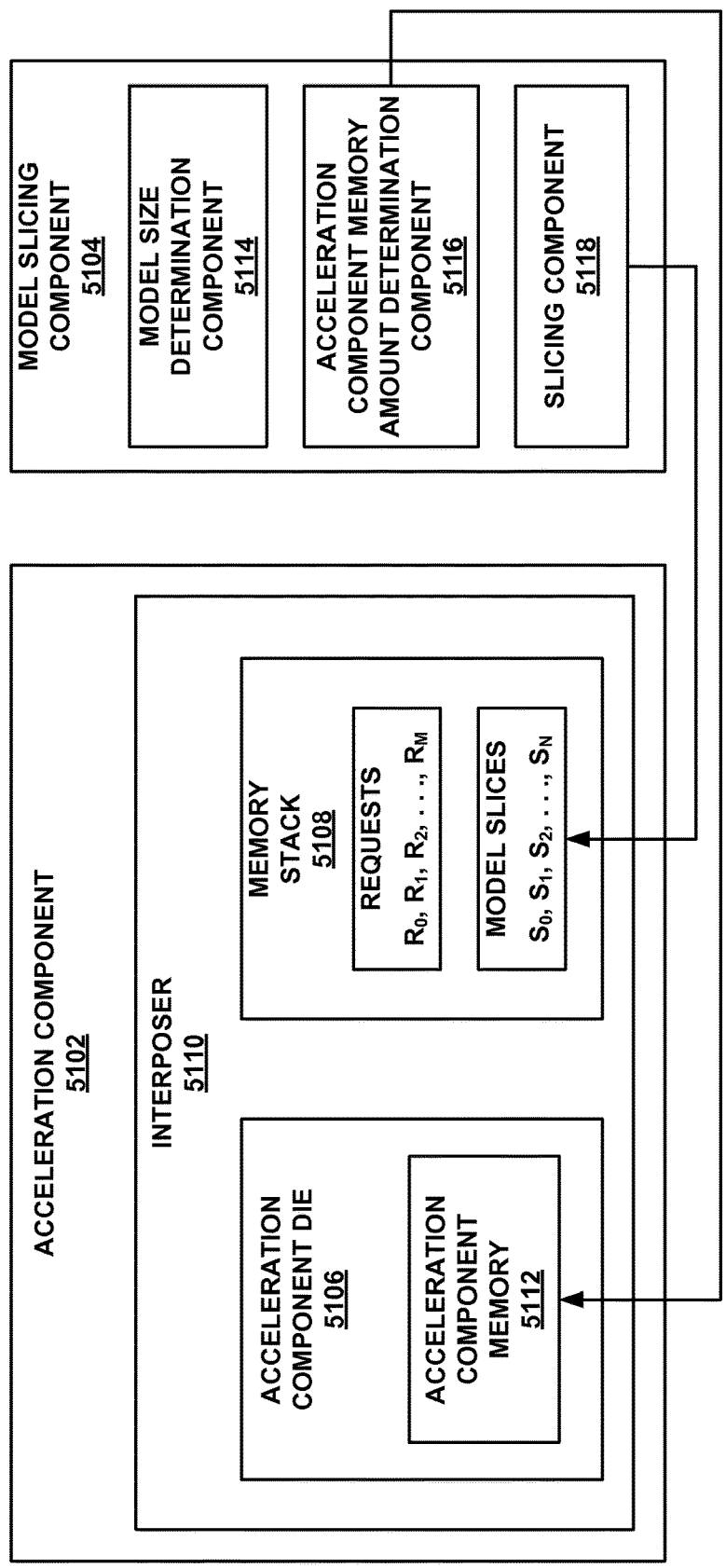
FIG. 51 shows an implementation of an acceleration component and a model slicing component.

FIG. 51 illustrates an implementation of an acceleration component 5102 and a model slicing component 5104 that implement a model (e.g., model 4904 of FIG. 49) that includes a total amount of decision tree data greater than aggregate amount of acceleration component memory on acceleration component 5102. Acceleration component 5102 includes an acceleration component die 5106 and a memory stack 5108 disposed on an interposer 5110. Acceleration component die 5106 includes acceleration component memory 5112 (e.g., block RAM) having an aggregate amount of memory. In an embodiment, acceleration component memory 5112 has an aggregate amount of 4 MB. Other aggregate amounts may be used.

Model 4904 has a total amount of decision tree data (e.g., 40 MB) greater than the aggregate amount of acceleration component memory 5112. Memory stack 5108 is an HBM (e.g., a memory bandwidth of about 200 GB/sec) and has a capacity of between about 0.5 GB to about 4 GB, although other memory bandwidths and memory capacities may be used.

Figure 52:
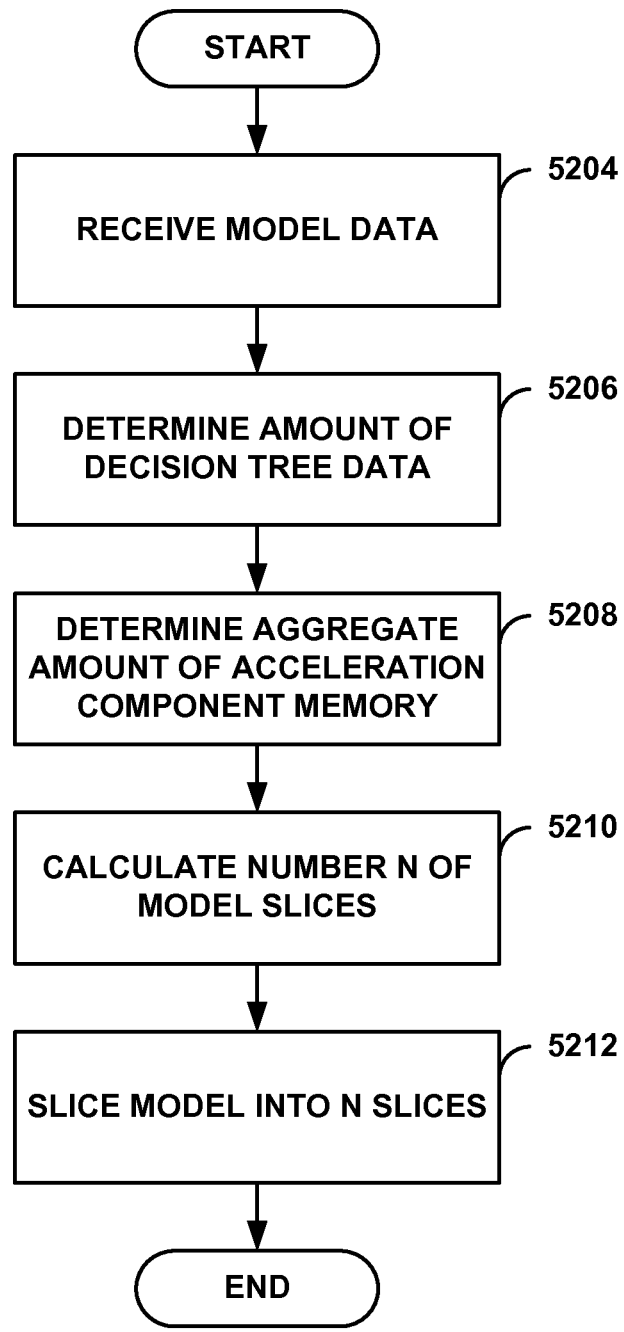
FIG. 52 is a flowchart that shows an operation of the model slicing component of FIG. 51.

Model slicing component 5104 includes a model amount determination component 5114, an acceleration component memory amount determination component 5116, and a slicing component 5118. FIG. 52 is a process 5202 that shows one manner of operation of model slicing component 5104 of FIG. 51.

In block 5204, model slicing component 5104 receives model data (e.g., decision tree data for the decision trees included in the model). In block 5206, model size determination component 5114 determines the total amount of decision tree data in the received model. In block 5208, acceleration component memory amount determination component 5116 determines the aggregate amount of acceleration component memory 5112. In block 5210, model slicing component 5104 calculates the number N of model slices based on the total amount of decision tree data determined in block 5206 and the aggregate amount of acceleration component memory determined in block 5208.

For example, if acceleration component memory 5112 has an aggregate amount of 4 MB, and model 4904 has K=30,000 trees that include a total amount of 40 MB of decision tree data, model slicing component 5104 determines that N=40 MB/4 MB=10. In block 5210, slicing component 5118 slices the model into N model slices $S_0, S_1, S_2, \ldots, S_{N-1}$, and stores the N model slices in memory stack 5108. Each of model slices $S_0, S_1, S_2, \ldots, S_{N-1}$ has a third amount of decision tree data less than or equal to the aggregate amount (e.g., 4 MB) of acceleration component memory 5112.

Each of model slices $S_0, S_1, S_2, \ldots, S_{N-1}$ includes a subset of the K decision trees $DT_0, DT_1, \ldots, DT_{K-1}$ of model 4904, but all model slices $S_0, S_1, S_2, \ldots, S_{N-1}$ need not include the same number of decision trees. For example, model slice $S_0$ may include 2700 decision trees, model slice $S_1$ may include 3400 decision trees, and so on. In an implementation, each of model slices $S_0, S_1, S_2, \ldots, S_{N-1}$ includes an amount of decision tree data less than or equal to the aggregate amount of acceleration component memory. For example, model slice $S_0$ may include 3.85 MB of decision tree data, model slice $S_1$ may include 3.97 MB of decision tree data, and so on.

Because memory stack 5108 has a high memory bandwidth, each of model slices $S_0, S_1, S_2, \ldots, S_{10}$ can be loaded from memory stack 5108 to acceleration component die 5106 in a very short time period. For example, if memory stack 5108 has a memory bandwidth of 200 GB/sec, and each of model slices $S_0, S_1, S_2, \ldots, S_{10}$ has an amount of decision tree data of 4 MB or less, each of model slices $S_0$, $S_1, S_2, \ldots, S_{10}$ can be loaded from memory stack 5108 to acceleration component memory 5112 in 20 μsec or less.

Figure 53:
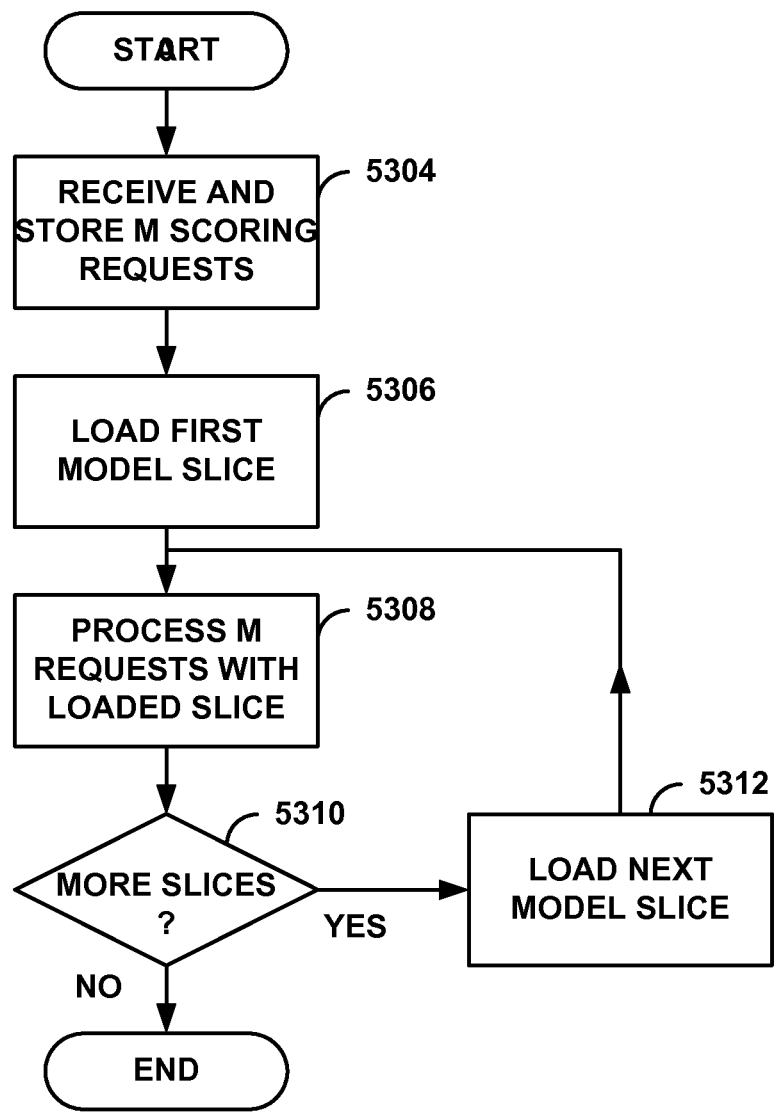
FIG. 53 is a flowchart that shows another operation of the model slicing component of FIG. 51.

FIG. 53 is a process 5302 that shows one manner of operation of acceleration component 5102 of FIG. 51. In block 5304, acceleration component 5102 receives and buffers M buffered scoring requests $R_0, R_1, R_2, \ldots, R_M$ in memory stack 5108. Each of scoring requests $R_0, R_1, R_2, \ldots, R_M$ includes a set of input values for the decision trees in model slices $S_0, S_1, S_2, \ldots, S_{10}$. In block 5306, acceleration component 5102 copies a first model slice (e.g., $S_0$) from memory stack 5108 to acceleration component memory 5112. In block 5308, acceleration component 5102 processes the M scoring requests $R_0, R_1, R_2, \ldots, R_M$ using the loaded model slice $S_0$ (e.g., by copying each set of input values for each of the M scoring requests $R_0, R_1, R_2, \ldots, R_M$ from memory stack 5108 to acceleration component memory 5112, populating the decision trees in model slice $S_0$ with the sets of input values and walking the tree.

In block 5310, acceleration component 5102 determines if more model slices are available in memory stack 5108. If more requests are available, in block 5310 acceleration component 5102 copies a next model slice (e.g., $S_1$) from memory stack 5108 to acceleration component memory 5112, and the process flow returns to block 5308. Conversely, if no more requests are available in memory stack 5108, process 5302 ends. Persons of ordinary skill in the art will understand that process 5302 may be repeated for a next collection of M scoring requests.

Figure 54:
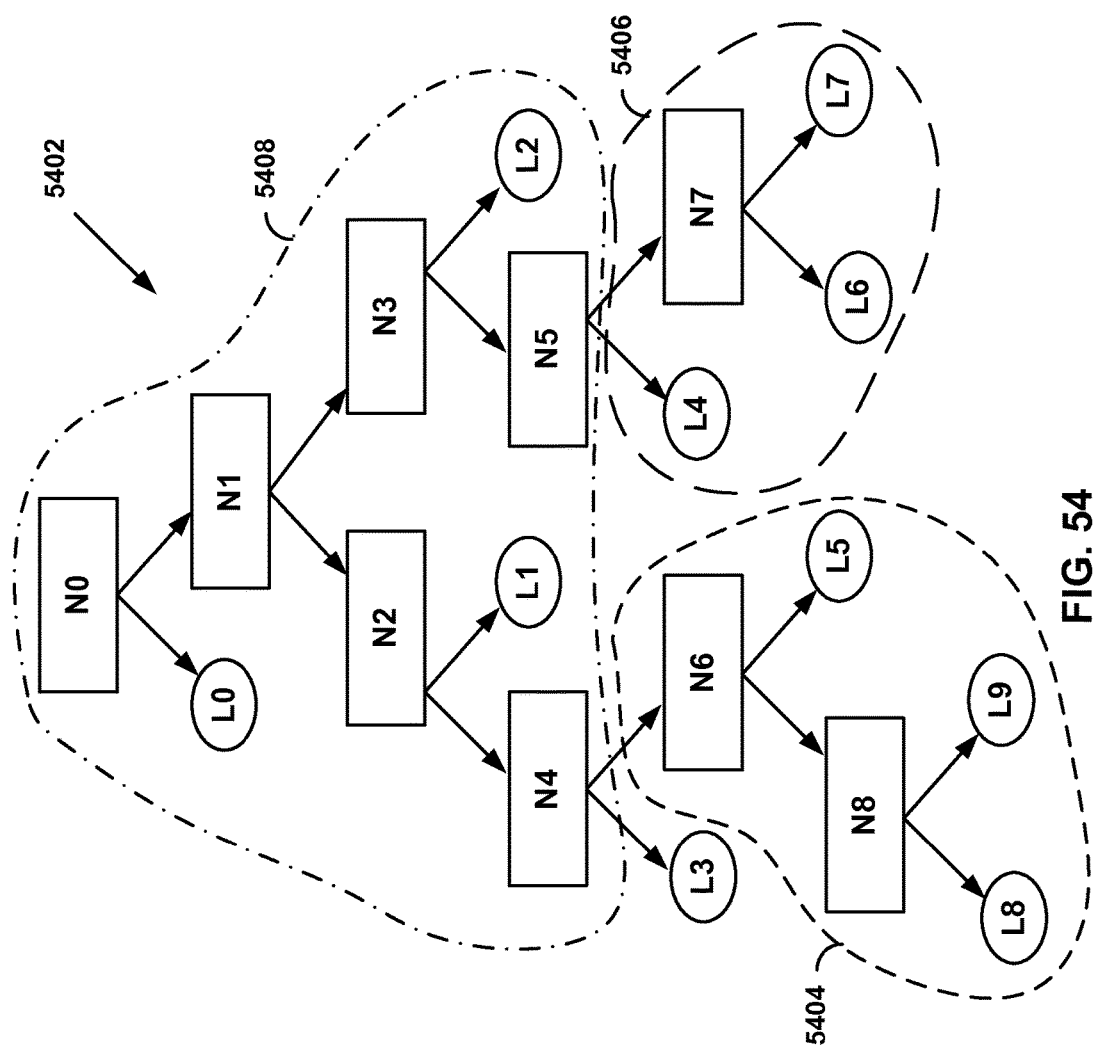
FIG. 54 shows an example decision tree including a top portion and lower portions.

FIG. 54 shows an example decision tree 5402 that includes nine nodes N0, N1, . . . , N8 and ten leaves L0, L1, . . . , L9. Although the first node N0 is always evaluated, the probability that nodes further down the tree are evaluated is lower. For example, there is a 50% probability of evaluating node N1, a 25% probability of evaluating either of nodes N2 and N3, and so on. The probability of evaluating portion 5404 or portion 5406 of decision tree 5402 is just 6.25%. Thus, rather than loading an entire decision tree into an acceleration component, many portions of which are likely to never be evaluated, a first (top) portion of a decision tree is loaded into an acceleration component and evaluated, and only those portions that are actually needed may be subsequently loaded based on the results of evaluating the first portion.

For example, if portion 5408 is loaded into an acceleration component, portion 5404 is loaded into the acceleration component only if node N4 (or node N2) of top portion 5408 is evaluated, and portion 5406 is loaded into the acceleration component only if node N5 (or node N3) of top portion 5408 is evaluated. By applying this principle to all decision trees in a model, models with extremely large numbers of trees may be evaluated by an acceleration component by loading top portions of all trees of the model into the acceleration component, processing a request (e.g., $R_0$) with each of the top portions, loading a next set of lower portions of each tree only as needed based on the processing of the top portions, processing the request with each of the lower portions, and repeating until all trees have been evaluated.

Another example of a High BW Service that may be implemented on an acceleration component that includes high bandwidth, low power memory using die stacking techniques is a deep neural network (DNN). DNNs have been shown to achieve state-of-the-art accuracy on human recognition tasks such as image and speech recognition. The performance of today's state-of-the-art DNN algorithms is highly bottlenecked by the capabilities of commodity hardware.

Figure 55:
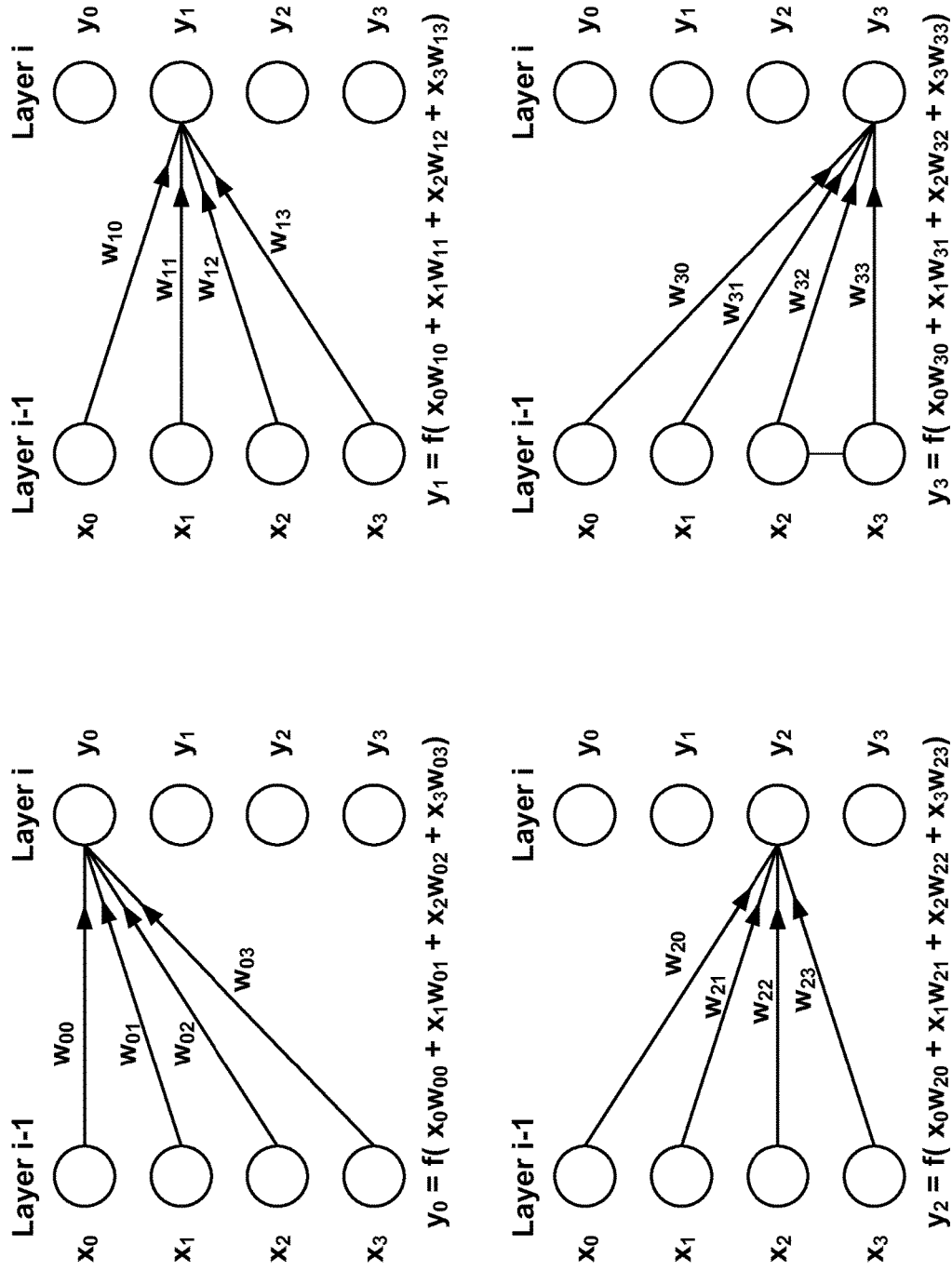
FIG. 55 shows a graphical illustration of a deep neural network.

FIG. 55 illustrates an example DNN 5502, which includes multiple layers (e.g., Layer i−1 and Layer i) of neurons (depicted graphically as circles) with connections between the neurons. Each neuron is characterized by a set of input edges (connected to neurons of a predecessor layer) with adaptive weights ($w_{00}, w_{01}, \ldots$), which are numerical parameters that are tuned by a learning algorithm. The term "deep learning" typically refers to the training of DNNs containing a large number of layers.

One implementation of DNN training uses a backpropagation algorithm, in which the weights of a DNN are updated in an iterative fashion using labeled training data. A goal of backpropagation is to employ a method of gradient descent to minimize an error function with respect to all weights in the network. Using gradient descent, all weights in the DNN are incrementally updated using gradients that are calculated for each neuron.

This process is repeated iteratively using a large quantity of pre-labeled input data (representing known data) until the DNN converges on a set of trained weights that can be used for prediction (e.g., when the model is deployed). For large models, backpropagation is highly time consuming when implemented in software (e.g., taking weeks or months to converge). Thus, DNNs are an example of a High BW Service that may be implemented on an acceleration component that includes high bandwidth, low power memory using die stacking techniques.

The process of DNN training using backpropagation can be divided into multiple phases: (1) forward propagation of one or more input activations through the DNN to generate output activations (a prediction); (2) computing gradients for each of the neurons in the DNN, via back-propagation of "errors" from the output layer back to the input layer; (3) using gradients to update the weights at each neuron; and (4) repeating steps (1) through (3) until the weights converge.

In gradient descent, several choices are available for selecting a number of inputs to use per iteration. A first method, batch gradient descent, uses all available training data (e.g., pre-labeled images) in each iteration between weight updates. This method is typically very expensive and not used in practice. A second method, stochastic gradient descent, represents another extreme by selecting one random example from the corpus between weight updates. A third method, mini-batch gradient descent, uses a random subset of the corpus to perform gradient computation, followed by a single weight update.

In practice, mini-batch gradient descent strikes a good balance between training accuracy and training time. Furthermore, mini-batching facilitates implementation of available parallelism in hardware, by allowing gradients for different inputs to be computed in parallel (without a serial dependence on weight updates). In some implementations, values of 256 have been found to be effective for achieving good accuracy while keeping the training times manageable. The remainder of this description will assume mini-batch gradient descent for training.

FIG. 55 illustrates an implementation of forward propagation of a single training input through a single layer. In this example, the input activations are represented by a 4-tuple vector $[x_0, x_1, x_2, x_3]^T$ in Layer i−1. Every neuron in Layer i processes the input vector of Layer i−1 using an activation function and generates output activations of Layer i. Typically, the activation function is a weighted sum of products, taking the input activation of each neuron and scaling it by a tunable weight parameter. The dot product is further transformed by a non-linear differentiable function such as hyperbolic tangent, sigmoid or other non-linear differentiable function.

In the implementation depicted in FIG. 53, the output activations $y_0$, $y_1$, $y_2$, $y_3$ of Layer i are expressed as:

$$y_0 = f(x_0 w_{00} + x_1 w_{01} + x_2 w_{02} + x_3 w_{03})$$

$$y_1 = f(x_0 w_{10} + x_1 w_{11} + x_2 w_{12} + x_3 w_{13})$$

$$y_2 = f(x_0 w_{20} + x_1 w_{21} + x_2 w_{22} + x_3 w_{23})$$

$$y_3 = f(x_0 w_{30} + x_1 w_{31} + x_2 w_{32} + x_3 w_{33})$$

Forward propagation can be expressed mathematically as follows: the output activations of Layer i (before non-linearization) equal a matrix of weights for Layer i multiplied by a vector of input activations from Layer i−1:

$$\begin{pmatrix} w_{00} & \cdots & w_{03} \\ \vdots & \ddots & \vdots \\ w_{30} & \cdots & w_{33} \end{pmatrix} \begin{pmatrix} x_0 \\ \vdots \\ x_3 \end{pmatrix} = \begin{pmatrix} y_0 \\ \vdots \\ y_3 \end{pmatrix}$$

Thus, the bulk of computation is in computing the dot products. In mini-batch gradient descent, multiple input activation vectors can be processed per iteration of forward propagation. In this case, the mathematical expression shown above generalizes to matrix-matrix multiplication followed by the non-linear transformation.

After forward propagation, the result is a set of output activations in the final output layer. In backpropagation, these output activations are used to compute output "errors" that are propagated backwards through the network, to compute the gradients at each neuron. An example implementation of backpropagation is depicted in FIG. 56.

Figure 56:
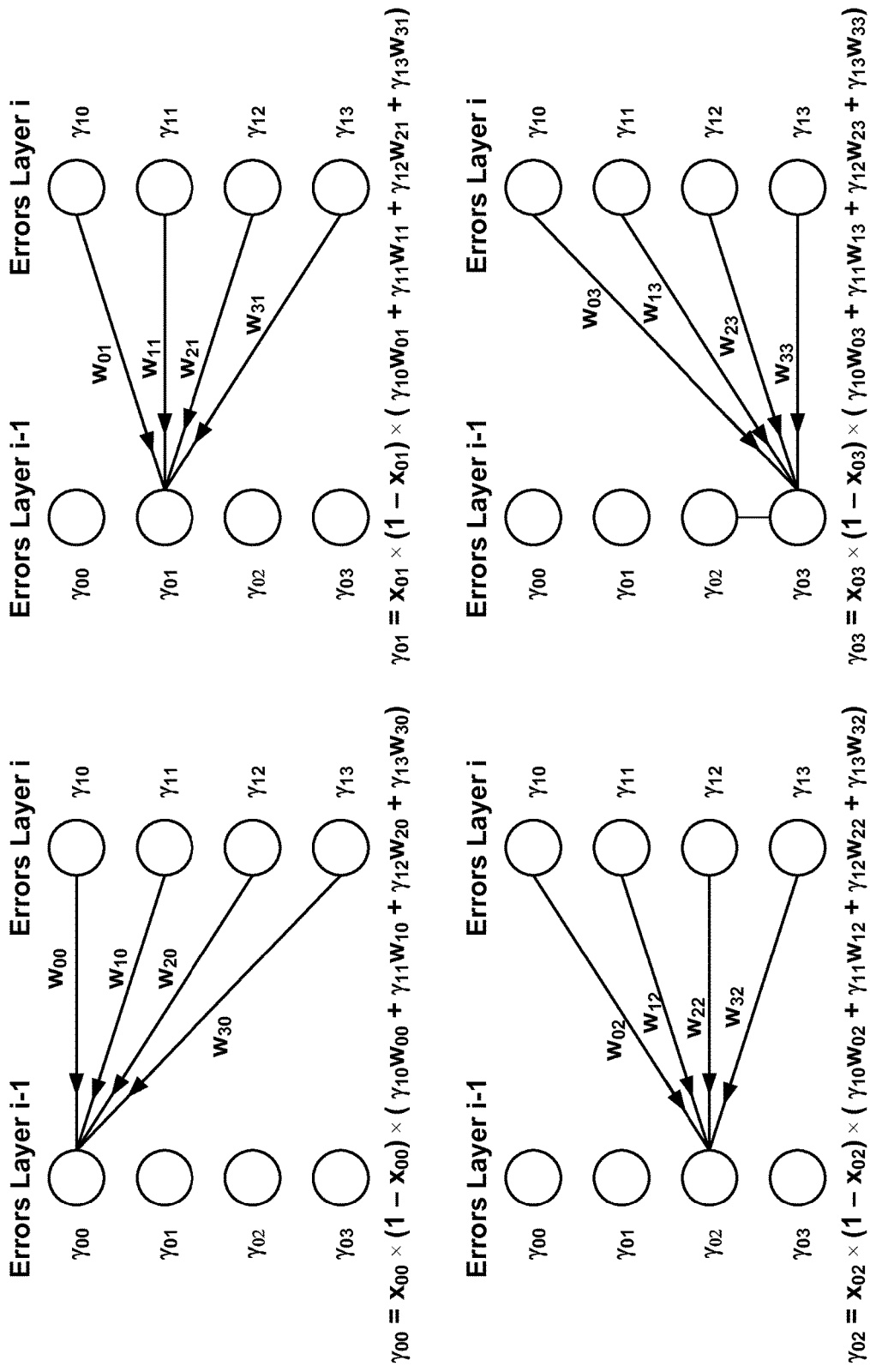
FIG. 56 shows a graphical illustration of backpropagation of a deep neural network.

As illustrated in FIG. 56, errors propagate backwards in a similar fashion to forward propagation. One difference is that the error function takes as input the weighted sum of products and the original input activation used in a derivative term, as follows:

$$\gamma_{00} = h'(x_{00}) \times \text{WeightedSum of Errors(Layer } i\text{)}$$

$$\gamma_{01} = h'(x_{01}) \times \text{WeightedSum of Errors(Layer } i\text{)}$$

$$\gamma_{02} = h'(x_{02}) \times \text{WeightedSum of Errors(Layer } i\text{)}$$

$$\gamma_{03} = h'(x_{03}) \times \text{WeightedSum of Errors(Layer } i\text{)}$$

where h'( ) is a derivative function.

For example, if the non-linear differentiable function in the forward propagation is the sigmoid function, the errors at Layer i−1 may be expressed as:

$$\gamma_{00} = x_{00} \times (1-x) \times (\gamma_{10} w_{00} + \gamma_{11} w_{10} + \gamma_{12} w_{20} + \gamma_{13} w_{30})$$

$$\gamma_{01} = x_{01} \times (1-x_{01}) \times (\gamma_{10} w_{01} + \gamma_{11} w_{11} + \gamma_{12} w_{21} + \gamma_{13} w_{31})$$

$$\gamma_{02} = x_{02} \times (1-x_{02}) \times (\gamma_{10} w_{02} + \gamma_{11} w_{12} + \gamma_{12} w_{22} + \gamma_{13} w_{32})$$

$$\gamma_{03} = x_{03} \times (1-x_{03}) \times (\gamma_{10} w_{03} + \gamma_{11} w_{13} + \gamma_{12} w_{23} + \gamma_{13} w_{33})$$

Backpropagation can be expressed mathematically as follows:

$$\begin{pmatrix} w_{00} & \cdots & w_{30} \\ \vdots & \ddots & \vdots \\ w_{03} & \cdots & w_{33} \end{pmatrix} \begin{pmatrix} \gamma_{10} \\ \vdots \\ \gamma_{13} \end{pmatrix} = \begin{pmatrix} e_{00} \\ \vdots \\ e_{03} \end{pmatrix}$$

That is, a transposed weight matrix (Layer i) multiplied by an input error vector (Layer i) equals an output error vector (Layer i−1) (before multiplying by the derivative).

Backpropagation can thus be similarly expressed as a matrix-vector multiplication that takes in a transposed weight matrix multiplied against a vector of errors, and scaled by the original activations computed during forward propagation. As mentioned earlier, the use of mini-batching generalizes this operation to matrix-matrix multiplication.

Once the errors are computed for each neuron, each neuron's weights are updated. In gradient descent, the weight update is given by:

$$w'_{ij} = w_{ij} - \mu \gamma_{ij} x_{ij}$$

where μ is a parameter that represents the learning rate of the DNN.

As described above, forward propagation and backpropagation stages require substantial use of matrix-matrix and matrix-vector multiplication operators. In an implementation, forward propagation and backpropagation stages of a DNN, are implemented on an acceleration component that includes high bandwidth, low power memory using die stacking techniques, such as described above.

Figure 57:
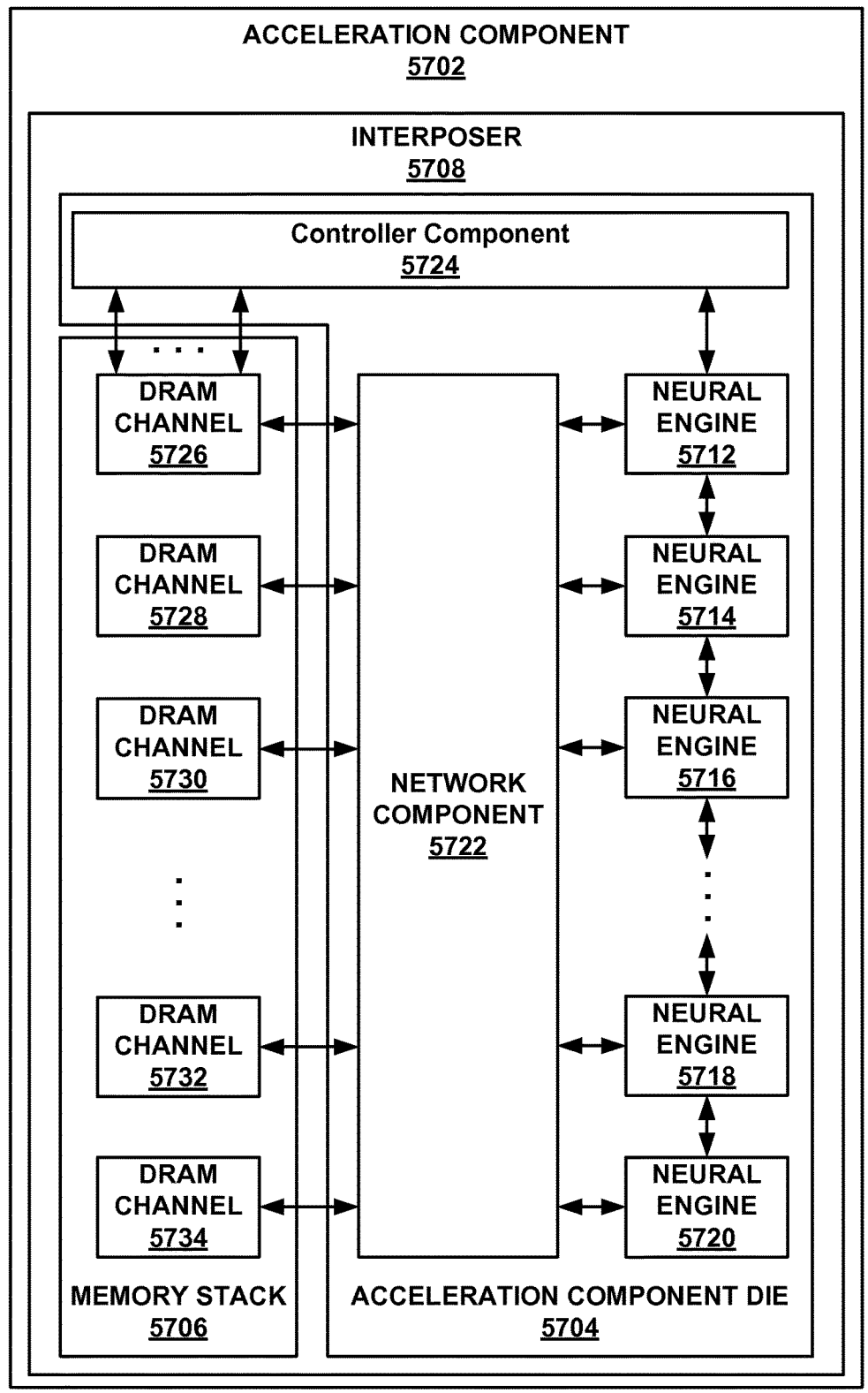
FIG. 57 shows an implementation of an acceleration component configured to perform forward propagation and backpropagation stages of a deep neural network.

FIG. 57 illustrates an implementation of an acceleration component 5702 configured to perform forward propagation and backpropagation stages of a DNN. Acceleration component 5702 includes an acceleration component die 5706 and a memory stack 5708 disposed on an interposer 5710.

Acceleration component die 5706 includes a parallel array of neural engines (5712, 5714, 5716, . . . , 5718, 5720) coupled to a network component 5722 and a controller component 5724. As described in more detail below, each of neural engines (5712, 5714, 5716, . . . , 5718, 5720) includes logic to implement forward propagation and backpropagation stages. In an implementation, each of neural engines (5712, 5714, 5716, . . . , 5718, 5720) includes logic to compute dot-products, derivatives, errors and non-linear functions (e.g., sigmoid, hyperbolic tangent, etc.).

In either forward propagation or backpropagation, acceleration component 5702 processes one layer (e.g., Layer i−1, Layer i, . . . ) of the DNN at a time. Controller component 5704 processes commands from a host component, which allows parameters such as the number of neurons or weights per neuron to be configured at run-time. Controller component 5704 also issues commands to neural engines (5712, 5714, 5716, . . . , 5718, 5720) to trigger the start of a layer computation, and to request computation results.

The weight matrices required to perform a layer computation often dwarf the available amount of acceleration component memory (e.g., block RAM). For example, in an example deep learning model targeting ImageNet-22K, up to 250 MB of weights may be used in the output layer alone.

To handle this in hardware, high bandwidth, low power memory stack 5706 includes a parallel array of DRAM channels (5726, 5728, 5730, . . . 5732, 5734) to provide access to high-bandwidth memory that can be used to store the weight matrices, the activations, and the errors. The weight matrices, activations, and errors are streamed from these parallel channels to the parallel neural engines (5712, 5714, 5716, . . . , 5718, 5720) using network component 5722, which may implement a crossbar or 2-D mesh network, or other similar network.

Figure 58:
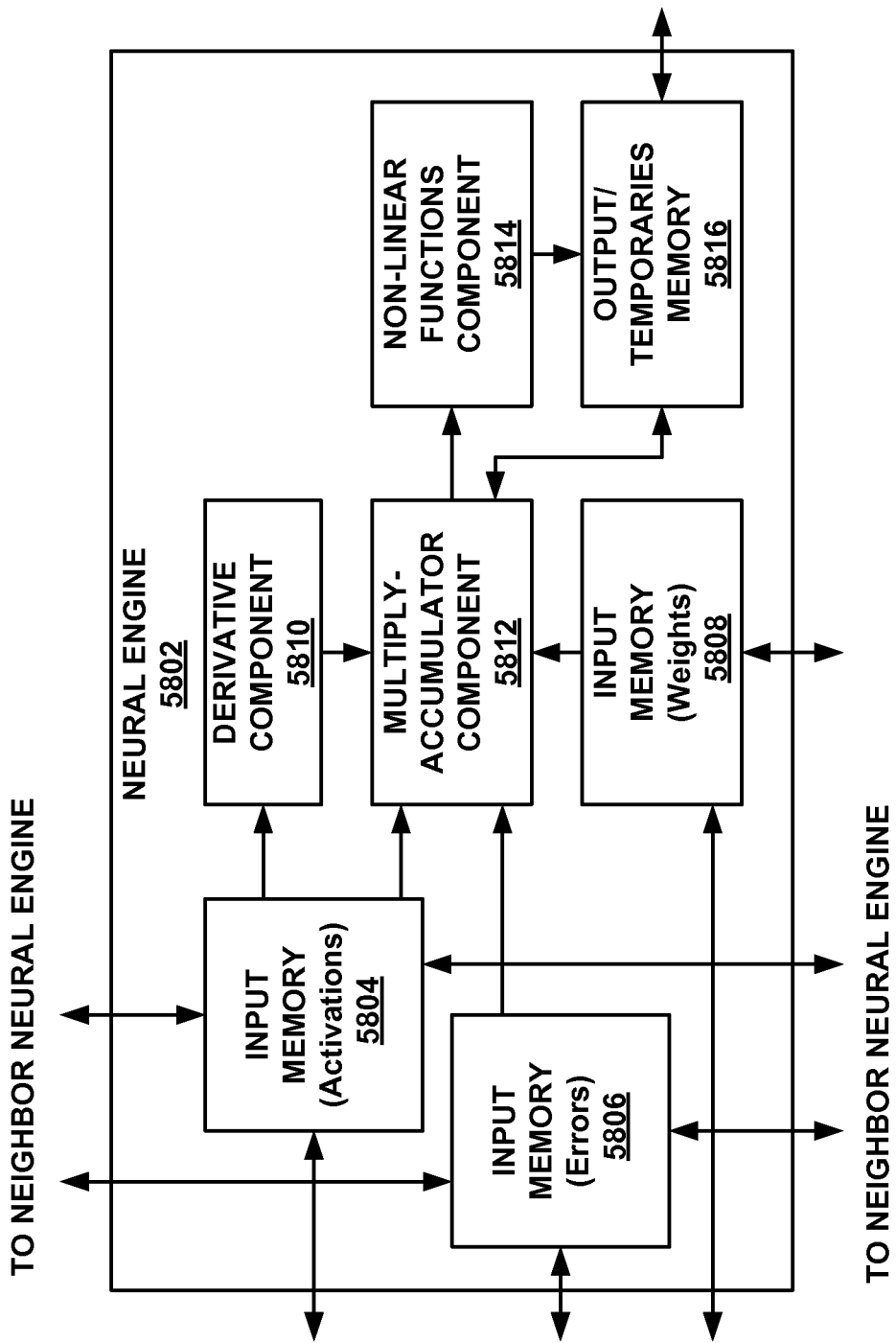
FIG. 58 shows an implementation of a neural engine in the acceleration component of FIG. 57.

FIG. 58 shows an implementation of a neural engine 5802, which includes a first memory 5804, a second memory 5806, a third memory 5808, a derivative component 5810, a multiply-accumulate component 5812, a non-linear functions component 5814 and a fourth memory 5816. First memory 5804, second memory 5806, third memory 5808 and fourth memory 5816 are block RAMs or other similar memory. First memory 5804 is used to buffer input activations data, second memory 5806 is used to buffer errors data (during backpropagation), third memory 5808 is used to buffer weights data, and fourth memory 5816 is used to buffer output and temporaries data.

Referring again to FIG. 57, to perform either forward propagation or backpropagation, controller component 5704 issues commands to neural engines (5712, 5714, 5716, . . . , 5718, 5720) to stream a subset of the input activations, errors, and weights from DRAM channels (5726, 5728, 5730, . . . 5732, 5734) into storage elements (5804, 5806, 5808) of the parallel neural engines (5712, 5714, 5716, . . . , 5718, 5720).

Controller component 5704 may use a variety of strategies for buffering and parallelization. In an implementations, controller component 5704 tiles the matrix multiplication independently across multiple neural engines (5712, 5714, 5716, . . . , 5718, 5720). Each of neural engines (5712, 5714, 5716, . . . , 5718, 5720) reads in a subset of the weight matrix, the input activations and errors, and perform a local matrix-matrix computation independent of other neural engines (5712, 5714, 5716, . . . , 5718, 5720).

In another implementation, controller component 5704 operates neural engines (5712, 5714, 5716, . . . , 5718, 5720) in a synchronous fashion on a single tile of the matrix. In this implementation, the weights are distributed and pinned across multiple neural engines (5712, 5714, 5716, . . . , 5718, 5720). However, the inputs/activations are exchanged in a shift-register-like fashion as they are consumed. Without wanting to be bound by any particular theory, it is believed that this implementation may maximize the amount of weight matrix re-use.

ILLUSTRATIVE ASPECTS OF THE TECHNOLOGY

The following summary provides a non-exhaustive list of illustrative aspects of the technology set forth herein.

According to a first aspect, a method is provided for processing on an acceleration component a machine learning classification model. The machine learning classification model includes a plurality of decision trees, the decision trees including a first amount of decision tree data. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The method includes slicing the model into a plurality of model slices, each of the model slices having a third amount of decision tree data less than or equal to the second amount of memory, storing the plurality of model slices on the memory stack, and for each of the model slices, copying the model slice to the acceleration component memory, and processing the model slice using a set of input data on the acceleration component to produce a slice result.

According to a second aspect, the acceleration component includes one or more of a field-programmable gate array device, a massively parallel processor array device, a graphics processing unit, and an application-specific integrated circuit.

According to a third aspect, the memory stack includes one or more memory die.

According to a fourth aspect, the acceleration component further includes an interposer, and the acceleration component die and the memory stack are disposed on the interposer.

According to a fifth aspect, the memory stack is disposed above the acceleration component die.

According to a sixth aspect, the method further includes storing a plurality sets of input data on the memory stack, and for each of the model slices, copying the model slice to the acceleration component memory, and processing the model slice using each of the plurality of sets of input data on the acceleration component.

According to a seventh aspect, the method further includes summing the slice results for each of the slices.

According to an eighth aspect, providing an acceleration component further includes providing the an acceleration component in a server unit component in a data center server.

According to a ninth aspect, a system for processing a machine learning classification model is provided. The machine learning classification model includes a plurality of decision trees, the decision trees including a first amount of decision tree data. The system includes an acceleration component and a model slicing component. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The model slicing component is configured to slice the model into a plurality of model slices, each of the model slices having a third amount of decision tree data less than or equal to the second amount of memory, and store the plurality of model slices on the memory stack. For each of the model slices, the acceleration component is configured to copy the model slice to the acceleration component memory and is configured to process the model slice using a set of input data on the acceleration component to produce a slice result.

According to a tenth aspect the acceleration component includes one or more of a field-programmable gate array device, a massively parallel processor array device, a graphics processing unit, and an application-specific integrated circuit.

According to an eleventh aspect, the memory stack includes one or more memory die.

According to a twelfth aspect, the acceleration component further includes an interposer, and the acceleration component die and the memory stack are disposed on the interposer.

According to a thirteenth aspect, the memory stack is disposed above the acceleration component die.

According to a fourteenth aspect, the acceleration component is configured to store a plurality sets of input data on the memory stack, and for each of the model slices, copy the model slice to the acceleration component memory, and process the model slice using each of the plurality of sets of input data on the acceleration component.

According to a fifteenth aspect, the acceleration component is configured to sum the slice results for each of the slices.

According to a sixteenth aspect, the system further includes a server unit component including the acceleration component, wherein the server unit component includes a data center.

According to a seventeenth aspect, a method for processing on an acceleration component a machine learning classification model is provided. The machine learning classification model includes a plurality of decision trees, the decision trees including a first amount of decision tree data. The acceleration component includes an acceleration component die and a memory stack disposed in an integrated circuit package. The memory die includes an acceleration component memory having a second amount of memory less than the first amount of decision tree data. The memory stack includes a memory bandwidth greater than about 50 GB/sec and a power efficiency of greater than about 20 MB/sec/mW. The method includes storing the plurality of decision trees on the memory stack, and for each of the decision trees copying a first portion of the decision tree to the acceleration component memory, processing the first portion using a set of input data on the acceleration component, and copying a second portion of decision tree to the acceleration component memory based on a result of processing the first portion of the decision tree.

According to an eighteenth aspect, the first portion of each decision tree includes a top portion of the decision tree.

According to a nineteenth aspect, the acceleration component includes one or more of a field-programmable gate array device, a massively parallel processor array device, a graphics processing unit, and an application-specific integrated circuit.

According to a twentieth aspect, the acceleration component further includes an interposer, and the acceleration component die and the memory stack are disposed on the interposer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for processing on an acceleration component a machine learning classification model comprising a plurality of decision trees, the decision trees comprising a first amount of decision tree data, the acceleration component comprising an acceleration component die and a memory stack disposed in an integrated circuit package, the memory stack comprising an acceleration component memory having a second amount of memory less than the first amount of decision tree data, the memory stack comprising a memory bandwidth greater than 50 GB/sec and a power efficiency of greater than 20 MB/sec/mW, the method comprising:
slicing the model into a plurality of model slices, each of the model slices having a third amount of decision tree data less than or equal to the second amount of memory;
storing the plurality of model slices on the memory stack;
copying a first model slice to the acceleration component memory;
processing the first model slice using a set of input data on the acceleration component to produce a first slice result;
selecting, based at least in part on the first slice result, a second model slice; and
repeating the copying and the processing for the second model slice;
wherein the selecting of the second model slice results in a third model slice not being processed.

2. The method of claim 1, wherein the acceleration component comprises one or more of a field-programmable gate array device, a massively parallel processor array device, a graphics processing unit, and an application-specific integrated circuit.

3. The method of claim 1, wherein the memory stack comprises multiple memory die.

4. The method of claim 1, wherein the acceleration component further comprises an interposer, and the acceleration component die and the memory stack are disposed on the interposer.

5. The method of claim 1, wherein the memory stack is disposed above the acceleration component die.

6. The method of claim 1, wherein the processing the first model slice using the set of input data comprises processing the first model slice using each of a plurality of sets of input data stored on the memory stack.

7. The method of claim 1, further comprising summing the slice results for each of the slices.

8. The method of claim 1, wherein the acceleration component is part of a server unit that also comprises one or more central processing units and a network controller coupled to both the acceleration component and the one or more central processing units.

9. A system for processing a machine learning classification model comprising a plurality of decision trees, the decision trees comprising a first amount of decision tree data, the system comprising:
an acceleration component die;
a memory stack disposed with the acceleration component die in an integrated circuit package, the memory stack comprising an acceleration component memory having a second amount of memory less than the first amount of decision tree data, the memory stack comprising a memory bandwidth greater than 50 GB/sec and a power efficiency of greater than 20 MB/sec/mW; and
a computer readable storage medium comprising computer-executable instructions, which, when executed, slice the model into a plurality of model slices, each of the model slices having a third amount of decision tree data less than or equal to the second amount of memory, and store the plurality of model slices on the memory stack,
wherein for each of the model slices, the acceleration component die comprises circuitry that is configured to copy a first model slice to the acceleration component memory, process the first model slice using a set of input data on the acceleration component die to produce a first slice result, select, based at least in part on the first slice result, a second model slice, and repeat the copying and the processing for the second model slice, the selecting of the second model slice resulting in a third model slice not being processed.

10. The system of claim 9, wherein the acceleration component die comprises one or more of a field-programmable gate array device, a massively parallel processor array device, a graphics processing unit, and an application-specific integrated circuit.

11. The system of claim 9, wherein the memory stack comprises multiple memory die.

12. The system of claim 9, wherein the acceleration component die and the memory stack are disposed on an interposer.

13. The system of claim 9, wherein the memory stack is disposed above the acceleration component die.

14. The system of claim 9, wherein the processing the first model slice using the set of input data comprises
processing the first model slice using each of a plurality of sets of input data stored on the memory stack.

15. The system of claim 9, wherein the acceleration component die is configured to sum the slice results for each of the slices.

16. The system of claim 9, further comprising a server unit component comprising the integrated circuit package as well as one or more central processing units and a network interface controller coupled to both the integrated circuit package and the one or more central processing units.

17. A method for processing on an acceleration component a machine learning classification model comprising a decision tree comprising a first amount of decision tree data, the acceleration component comprising an acceleration component die and a memory stack disposed in an integrated circuit package, the memory stack comprising an acceleration component memory having a second amount of memory less than the first amount of decision tree data, the memory stack comprising a memory bandwidth greater than 50 GB/sec and a power efficiency of greater than 20 MB/sec/mW, the method comprising:

storing the decision trees on the memory stack;
copying a first portion of the decision tree to the acceleration component memory;
processing the first portion using a set of input data on the acceleration component to produce a first portion result;
selecting, based at least in part on the first portion result, a second portion of the decision tree; and
repeating the copying and the processing for the second portion of the decision tree;
wherein the selecting the second portion of the decision tree results in a third portion of the decision tree not being processed.

18. The method of claim 17, wherein the first portion of the decision tree comprises a top portion of the decision tree.

19. The method of claim 17, wherein the acceleration component comprises one or more of a field-programmable gate array device, a massively parallel processor array device, a graphics processing unit, and an application-specific integrated circuit.

20. The method of claim 17, wherein the acceleration component further comprises an interposer, and the acceleration component die and the memory stack are disposed on the interposer.

* * * * *